(12) United States Patent
Hausauer et al.

(10) Patent No.: US 12,483,387 B2
(45) Date of Patent: *Nov. 25, 2025

(54) COMPUTER AND NETWORK INTERFACE CONTROLLER SECURELY OFFLOADING ENCRYPTION KEYS AND ENCRYPTION PROCESSING TO THE NETWORK INTERFACE CONTROLLER

(71) Applicant: DreamBig Semiconductor, Inc., San Jose, CA (US)

(72) Inventors: Brian Hausauer, Austin, TX (US); Renato Recio, Austin, TX (US)

(73) Assignee: DreamBig Semiconductor, Inc., San Jose, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 18/328,465

(22) Filed: Jun. 2, 2023

(65) Prior Publication Data

US 2023/0403136 A1 Dec. 14, 2023

Related U.S. Application Data

(60) Provisional application No. 63/366,283, filed on Jun. 13, 2022.

(51) Int. Cl.
*H04L 9/08* (2006.01)
*G06F 13/10* (2006.01)
(Continued)

(52) U.S. Cl.
CPC .......... *H04L 9/0819* (2013.01); *G06F 13/102* (2013.01); *H04L 9/0825* (2013.01);
(Continued)

(58) Field of Classification Search
CPC ... H04L 9/0819; H04L 9/0825; H04L 9/0866; H04L 9/0894; H04L 9/14; H04L 9/3268;
(Continued)

(56) References Cited

U.S. PATENT DOCUMENTS 7,624,269 B2  11/2009  Appenzeller
7,631,182 B1  12/2009  Droux et al.
(Continued)

OTHER PUBLICATIONS

David Kaplan, Jeremy Powell, Tom Woller, "AMD Memory Encryption," Oct. 18, 2021, Advanced Micro Devices, developer.amd.com/wordpress/media/2013/12/AMD_Memory_Encryption_Whitepaper_v9-Public.pdf.
(Continued)

*Primary Examiner* — Mohammed Waliullah
(74) *Attorney, Agent, or Firm* — Keith Lutsch PC

(57) ABSTRACT

Encryption operations are securely offloaded to a network interface controller (NIC). Encryption keys are securely transferred from a virtual machine (VM) to the NIC and data is securely transferred from encrypted VM memory to secure buffers in the NIC. The NIC handles the encryption and decryption operations in hardware, greatly increasing encryption performance while not reducing security. This is especially useful in cloud server environments, so the cloud service provider does not have access to the encryption keys or the unencrypted data. The offloaded operations are performed with numerous different communication protocols, including RDMA, QUIC, IPsec underlay and WireGuard.

18 Claims, 31 Drawing Sheets

(51) Int. Cl.
| | |
|---|---|
| *H04L 9/14* | (2006.01) |
| *H04L 9/32* | (2006.01) |
| *H04L 9/40* | (2022.01) |
| *H04L 49/901* | (2022.01) |

(52) U.S. Cl.
CPC .......... *H04L 9/0827* (2013.01); *H04L 9/0866* (2013.01); *H04L 9/0894* (2013.01); *H04L 9/14* (2013.01); *H04L 9/3268* (2013.01); *H04L 49/901* (2013.01); *H04L 63/0272* (2013.01); *H04L 63/0428* (2013.01); *H04L 63/0485* (2013.01); *H04L 63/164* (2013.01)

(58) Field of Classification Search
CPC . H04L 49/901; H04L 63/0428; H04L 9/0827; H04L 63/0272; H04L 63/0485; H04L 63/164; G06F 13/102
See application file for complete search history.

(56) References Cited

U.S. PATENT DOCUMENTS

| | | | |
|---|---|---|---|
| 11,251,942 | B2 | 2/2022 | Li et al. |
| 11,740,919 | B2 | 8/2023 | Ballard et al. |
| 11,765,142 | B1* | 9/2023 | Recio ............... H04L 45/74 713/160 |
| 12,244,670 | B2 | 3/2025 | Liss et al. |
| 12,284,115 | B2 | 4/2025 | Horowitz et al. |
| 2018/0262468 | A1* | 9/2018 | Kumar ............... G06F 9/45558 |
| 2019/0229903 | A1 | 7/2019 | Balasubramanian |
| 2020/0026656 | A1 | 1/2020 | Liao |
| 2020/0059485 | A1 | 2/2020 | Ergin et al. |
| 2021/0083857 | A1 | 3/2021 | Bergeron |
| 2021/0150074 | A1* | 5/2021 | Niell ............... G06F 21/602 |
| 2021/0157935 | A1* | 5/2021 | Sood ............... G06F 12/1408 |
| 2021/0226935 | A1 | 7/2021 | Mundt |
| 2021/0359935 | A1 | 11/2021 | Peterson |
| 2022/0103536 | A1* | 3/2022 | Kida ............... H04L 9/0825 |
| 2022/0179961 | A1 | 6/2022 | Yao |
| 2023/0006981 | A1 | 1/2023 | Syrivelis et al. |
| 2024/0048541 | A1* | 2/2024 | Recio ............... H04L 9/0819 |

OTHER PUBLICATIONS

PCI-SIG, "Component Measurement and Authentication (CMA) Draft PCI-SIG Engineering Change," Apr. 3, 2020.
PCI-SIG, "Data Object Exchange (DOE) PCI-SIG Engineering Change," Mar. 12, 2020.
DMTF, "Security Protocol and Data Model (SPDM) Specification DSP0274," Jun. 23, 2022.
DMTF, "Secured Messages using SPDM Specification DSP0277," Sep. 18, 2020.
PCI-SIG, "Integrity and Data Encryption (IDE) PCI-SIG Engineering Change," Nov. 19, 2020.
PCI-SIG, "Tee Device Interface Security Protocol (TDISP) Draft PCI-SIG Engineering Change," Mar. 13, 2022.
Synopsys, "IDE Security IP Module for PCIe 6.0," Feb. 22, 2022, web.archive.org/web/20220222212524/https://www.synopsys.com/dw/ipdir.php?ds=security-pcie6-ide&cmp=soc_corp_nct_tw_02212022_im_pcie6.0-ide_sip_NA.
Intel Corp., "Intel Trust Domain Extensions," Aug. 2021, cdrdv2.intel.com/v1/dl/getContent/690419.
David Harriman, "Integrity and Data Encryption (IDE) ECN Deep Dive," PCI-SIG, Aug. 25, 2020, pcisig.com/sites/default/files/files/PCIe%20Security%20Webinar_Aug%202020_PDF.pdf.
J. Iyengar, M. Thompson, "Rfc 9000 QUIC: A UDP-Based Multiplexed and Secure Transport," Internet Engineering Task Force (IETF), May 2021.
PCT/US 23/67873 International Search Report, Oct. 6, 2023.
PCT/US 23/67876 Written Opinion, Oct. 6, 2023.
A. Singhvi, A. Akella, D. Gibson, T. F Wenisch, M. Wong-Chan, S. Clark, M. M. K. Martin, M. McLaren, P. Chandra, R. Cauble, H. Mohamed Gamal Wassel, B. Montazeri, S. L Sabato, J. Scherpelz, A. M Vahdat, "1RMA: Re-envisioning Remote Memory Access for Multi-tenant Datacenters," SIGCOMM '20: Proceedings of the Annual conference of the ACM Special Interest Group on Data Communication on the applications, technologies, architectures, and protocols for computer communication, Jul. 2020, pp. 708-721.
M. Thompson, S. Turner, "RFC 9001 Using TLS to Secure QUIC," Internet Engineering Task Force (IETF), May 2021.
Jason A. Donenfeld, "WireGuard: Next Generation Kernel Network Tunnel," Proceedings of the Network and Distributed System Security Symposium, NDSS 2017, Feb. 27, 2017, www.ndss-symposium.org/wp-content/uploads/2017/09/ndss2017_04A-3_Donenfeld_paper.pdf.
Arjun Singhvi, Aditya Akella, Dan Gibson, Thomas F Wenisch, Monica Wong-Chan, Sean Clark, Milo M. K. Martin, Moray McLaren, Prashant Chandra, Rob Cauble, Hassan Mohamed Gamal Wassel, Behnam Montazeri, Simon L Sabato, Joel Scherpelz, Amin M Vahdat, "1RMA: Re-envisioning Remote Memory Access for Multi-tenant Datacenters," SIGCOMM '20: Proceedings of the Annual conference of the ACM Special Interest Group on Data Communication on the applications, technologies, Aug. 2020.
Luther Martin, "How derived keys can ease encryption key management," TechBeacon, Jul. 30, 2018, techbeacon.com/security/how-derived-keys-can-ease-encryption-key-management.
Jason A. Donenfeld, "WireGuard: Next Generation Kernel Network Tunnel," Wireguard.com, Jun. 1, 2020, www.wireguard.com/papers/wireguard.pdf.
Advance Micro Devices, "AMD SEV-SNP: Strengthening VM Isolation with Integrity Protection and More," Jan. 2020, www.amd.com/system/files/TechDocs/SEV-SNP-strengthening-vm-isolation-with-integrity-protection-and-more.pdf.
Intel Corp., "Software Enabling for Intel® TDX in Support of TEE-I/O," Sep. 2022, cdrdv2-public.intel.com/742542/software-enabling-for-tdx-tee-io-fixed.pdf.
C. Kaufman, P. Hoffman, Y. Nir, P. Eronen, T. Kivinen; "RFC7296 Internet Key Exchange Protocol Version 2 (IKEv2);" Oct. 2014; Internet Engineering Task Force.
Google, "Announcing PSP's cryptographic hardware offload at scale is now open source," May 19, 2022, cloud.google.com/blog/products/identity-security/announcing-psp-security-protocol-is-now-open-source.
Google, "PSP Architecture Specification," Nov. 17, 2022, raw.githubusercontent.com/google/psp/main/doc/PSP_Arch_Spec.pdf.

* cited by examiner

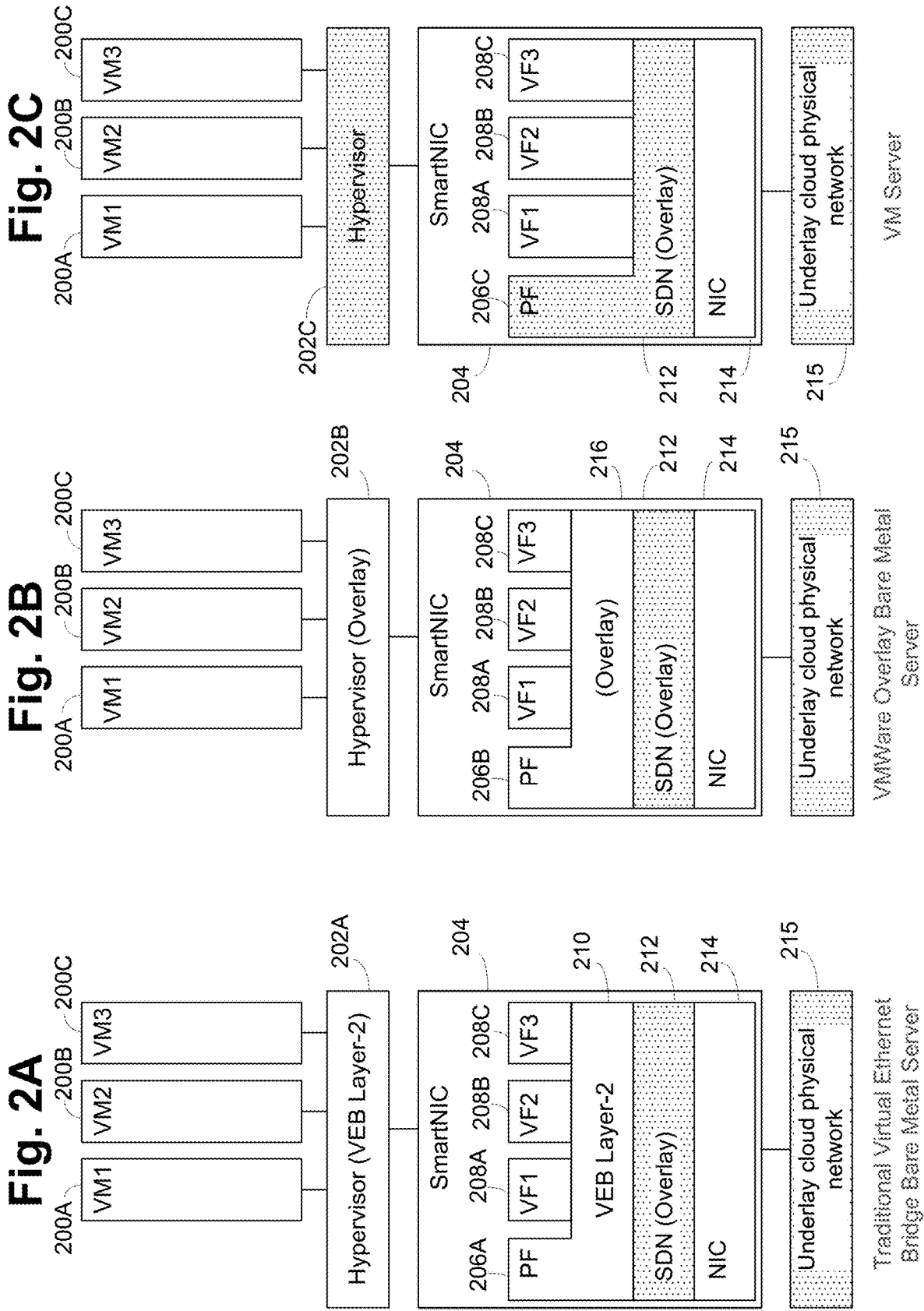

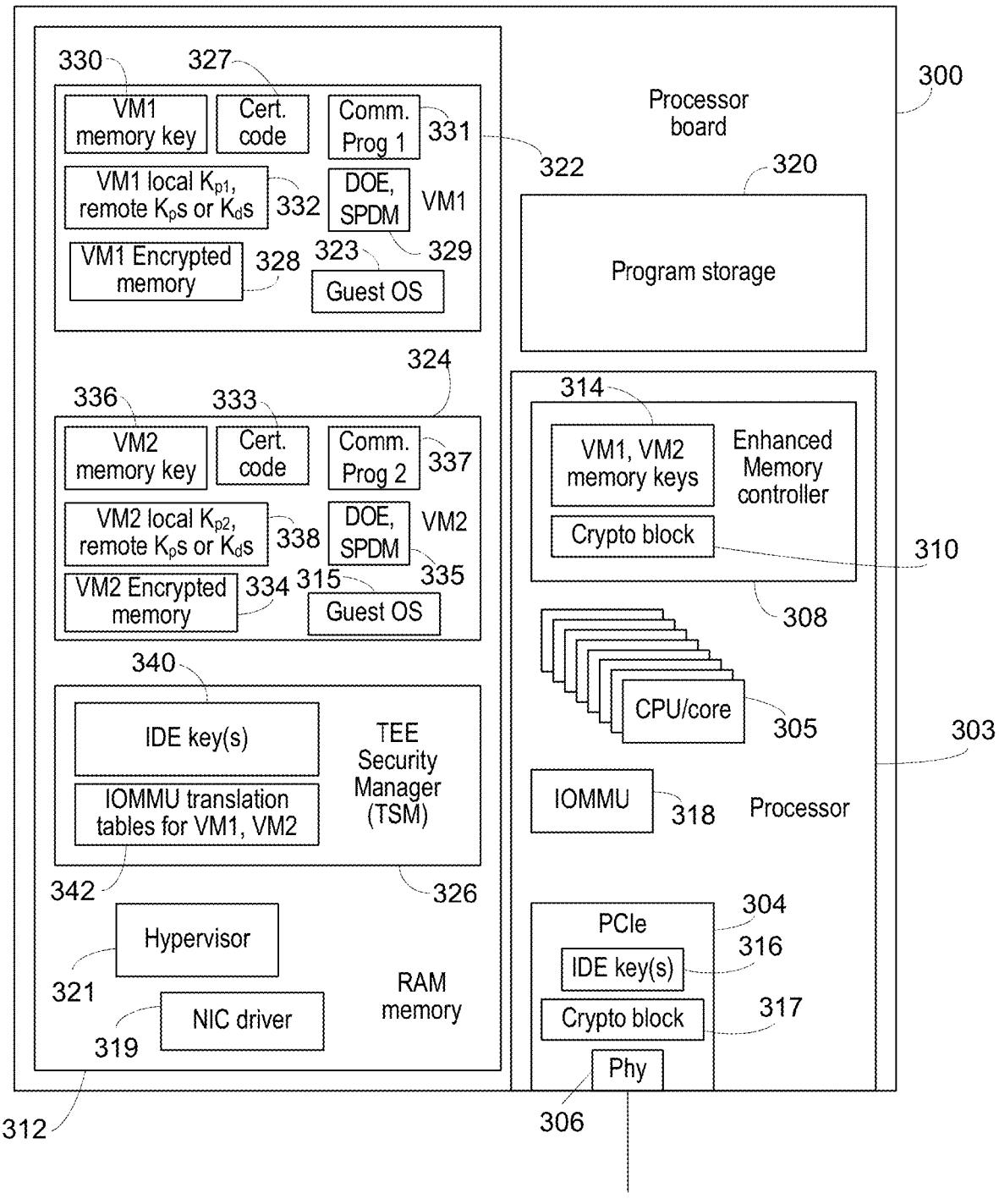
Fig. 3A1

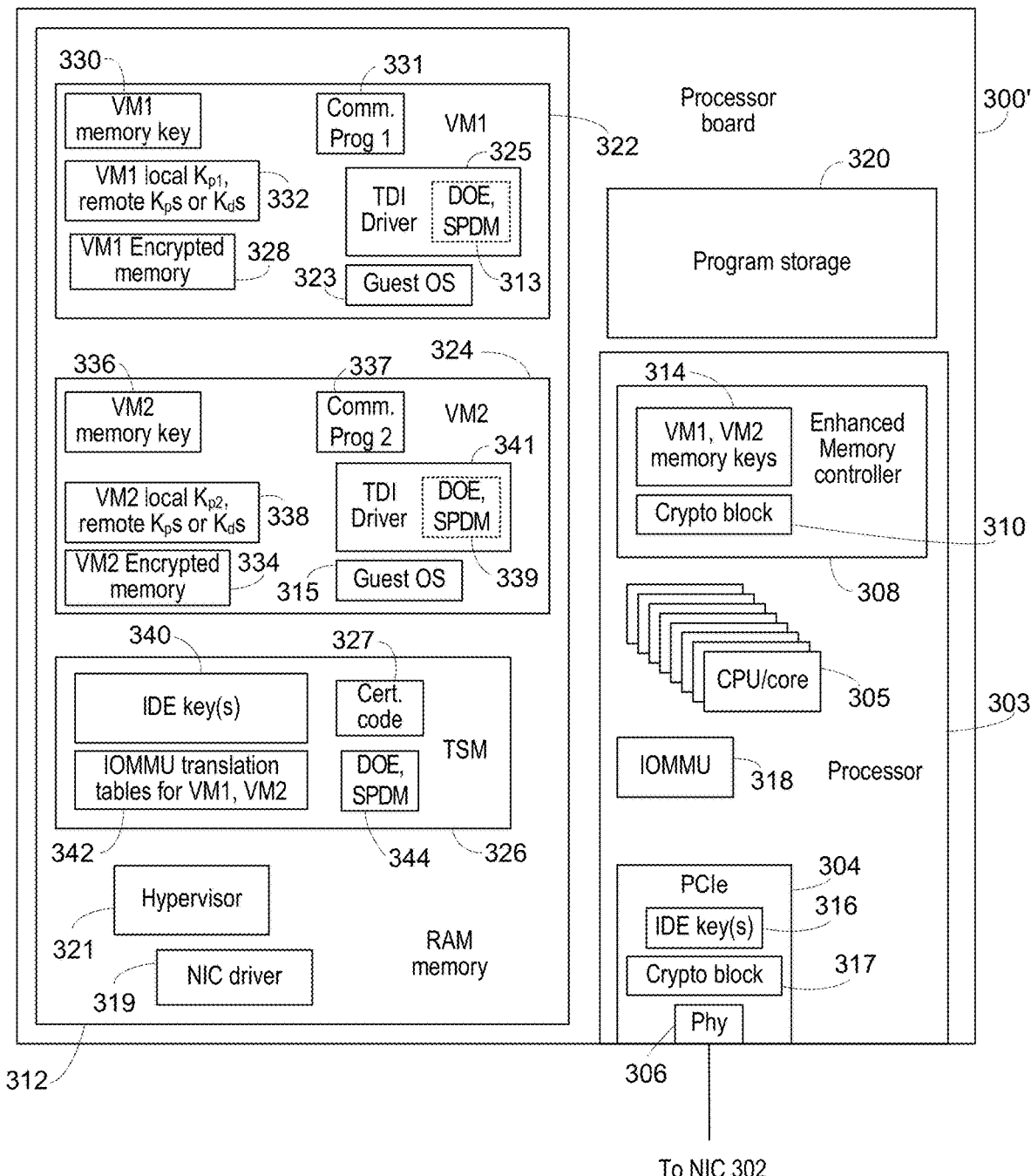
Fig. 3A2

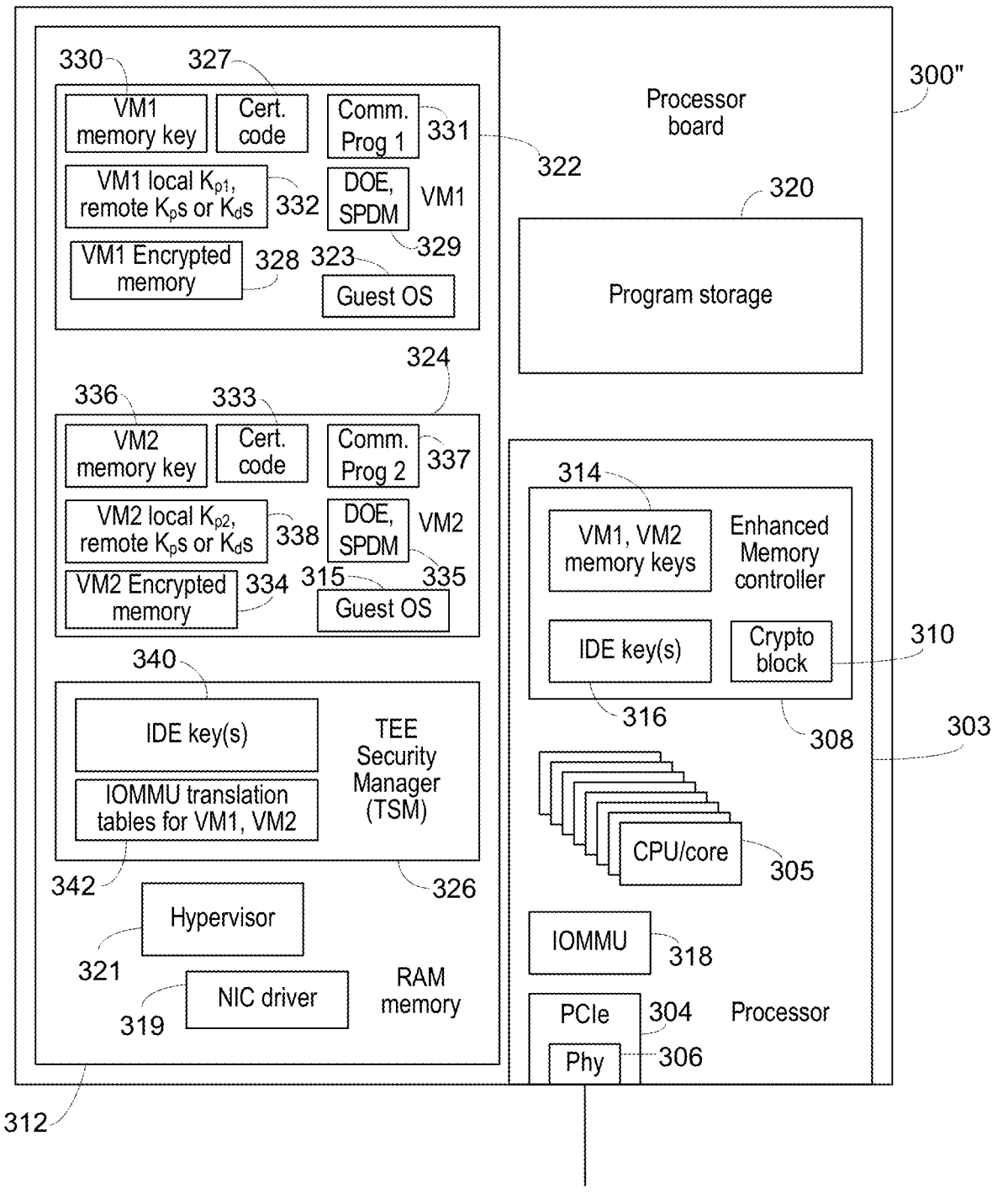
Fig. 3A3

Fig. 3B1
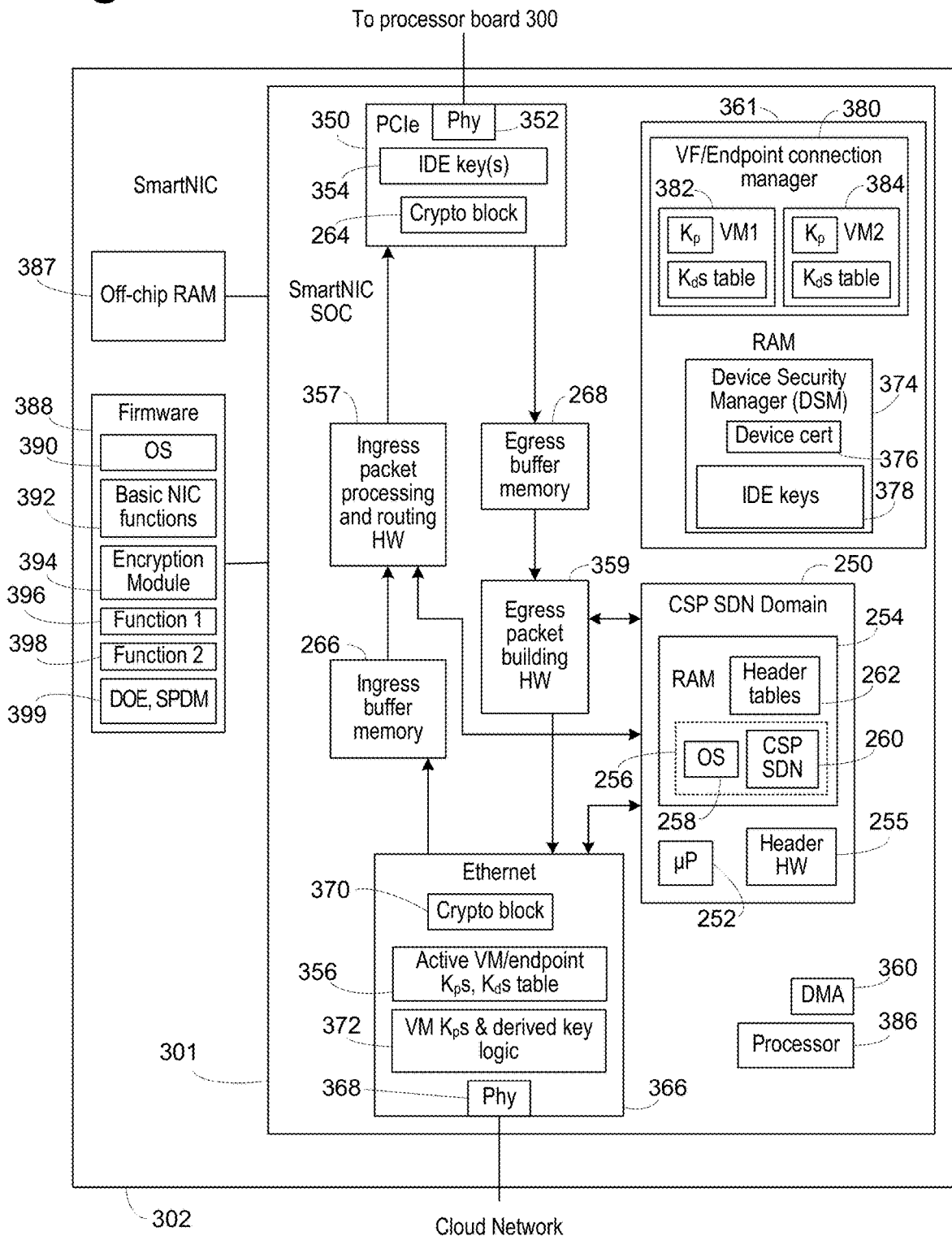

Fig. 3B2
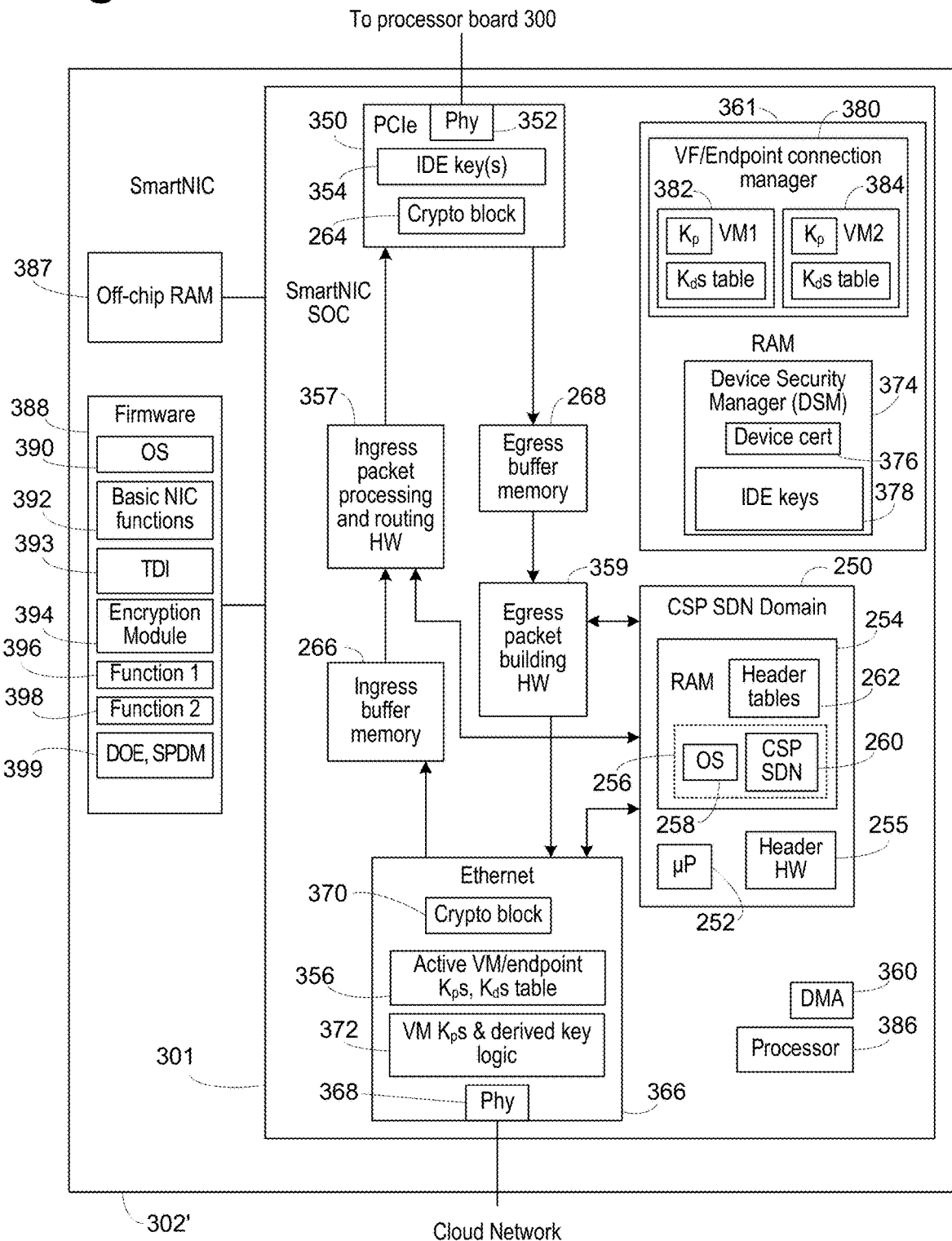

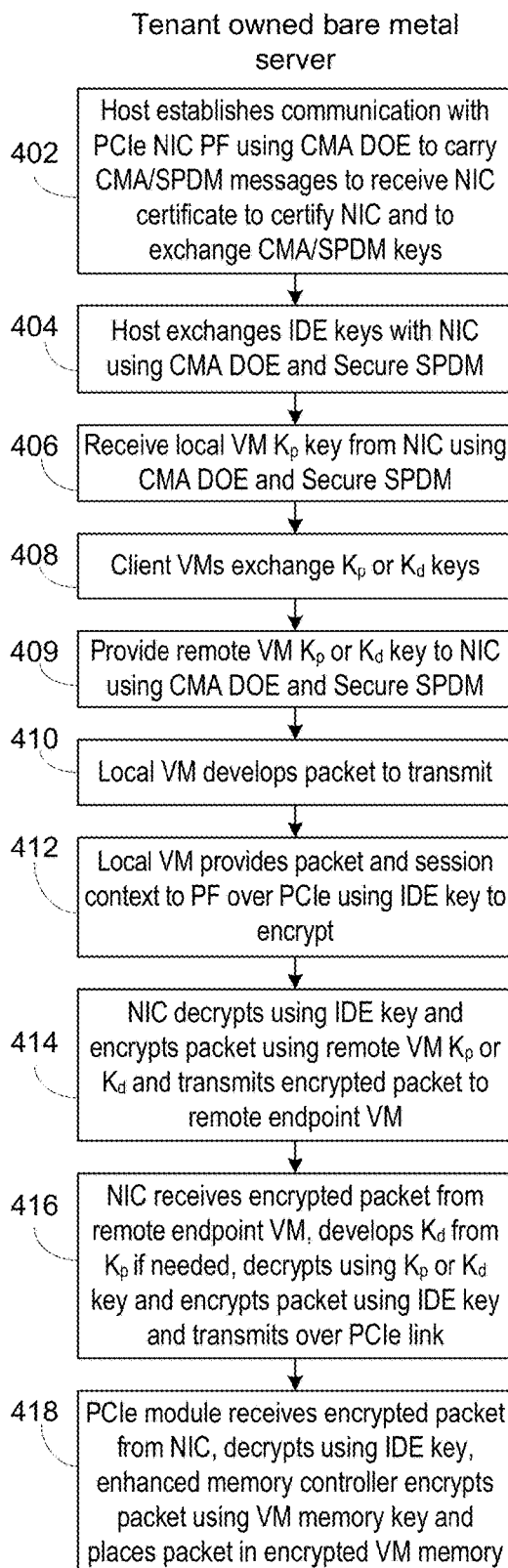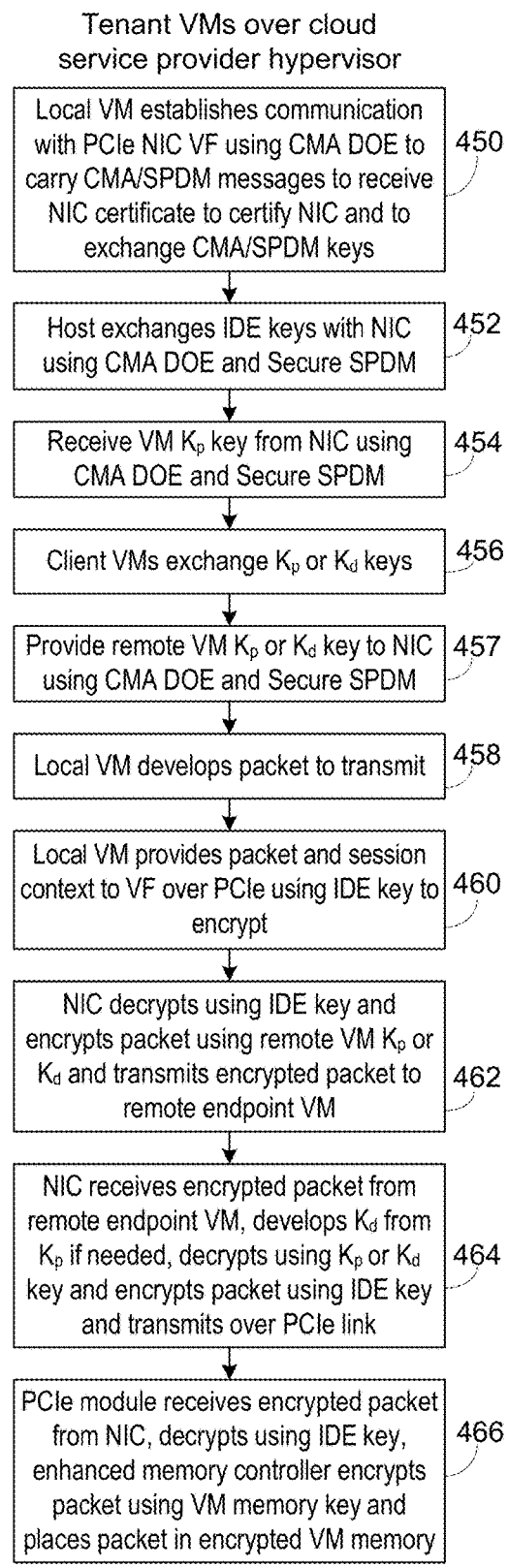
Fig. 4A1
Fig. 4B1

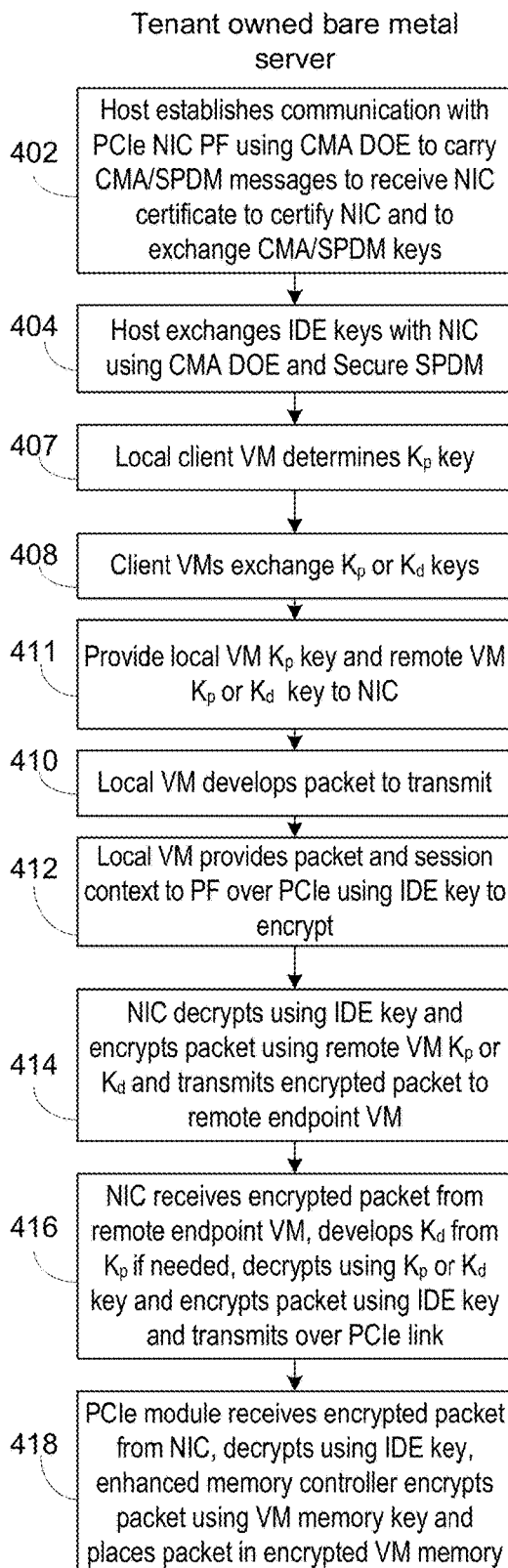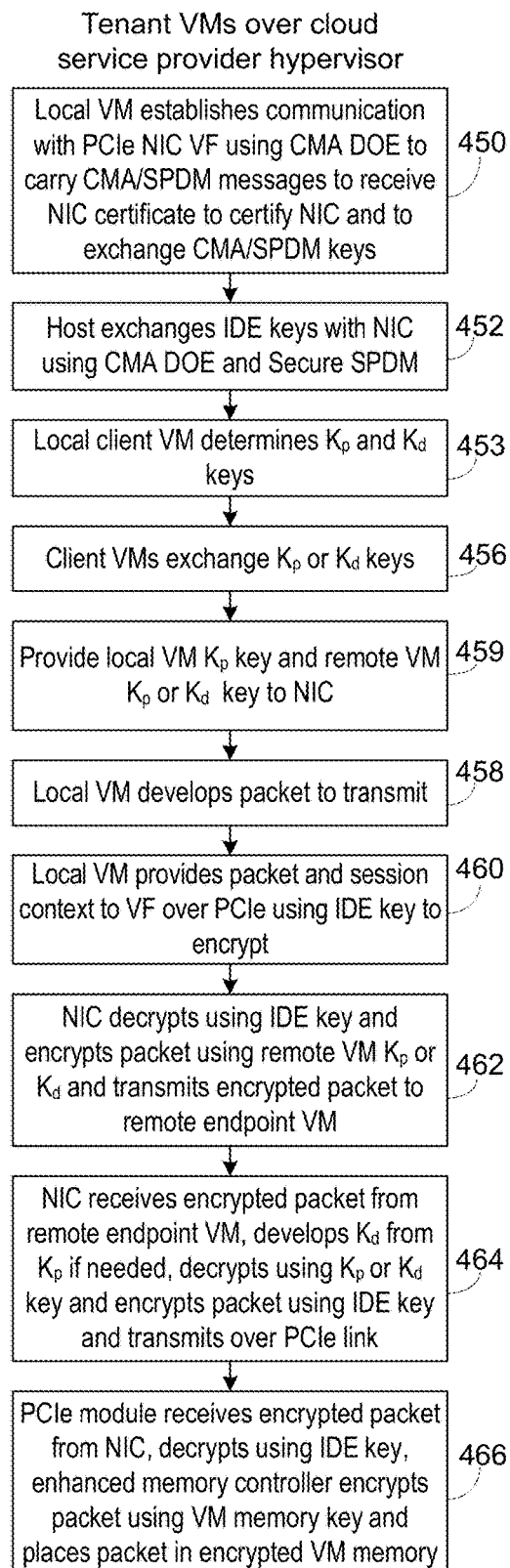
Fig. 4A2
Fig. 4B2

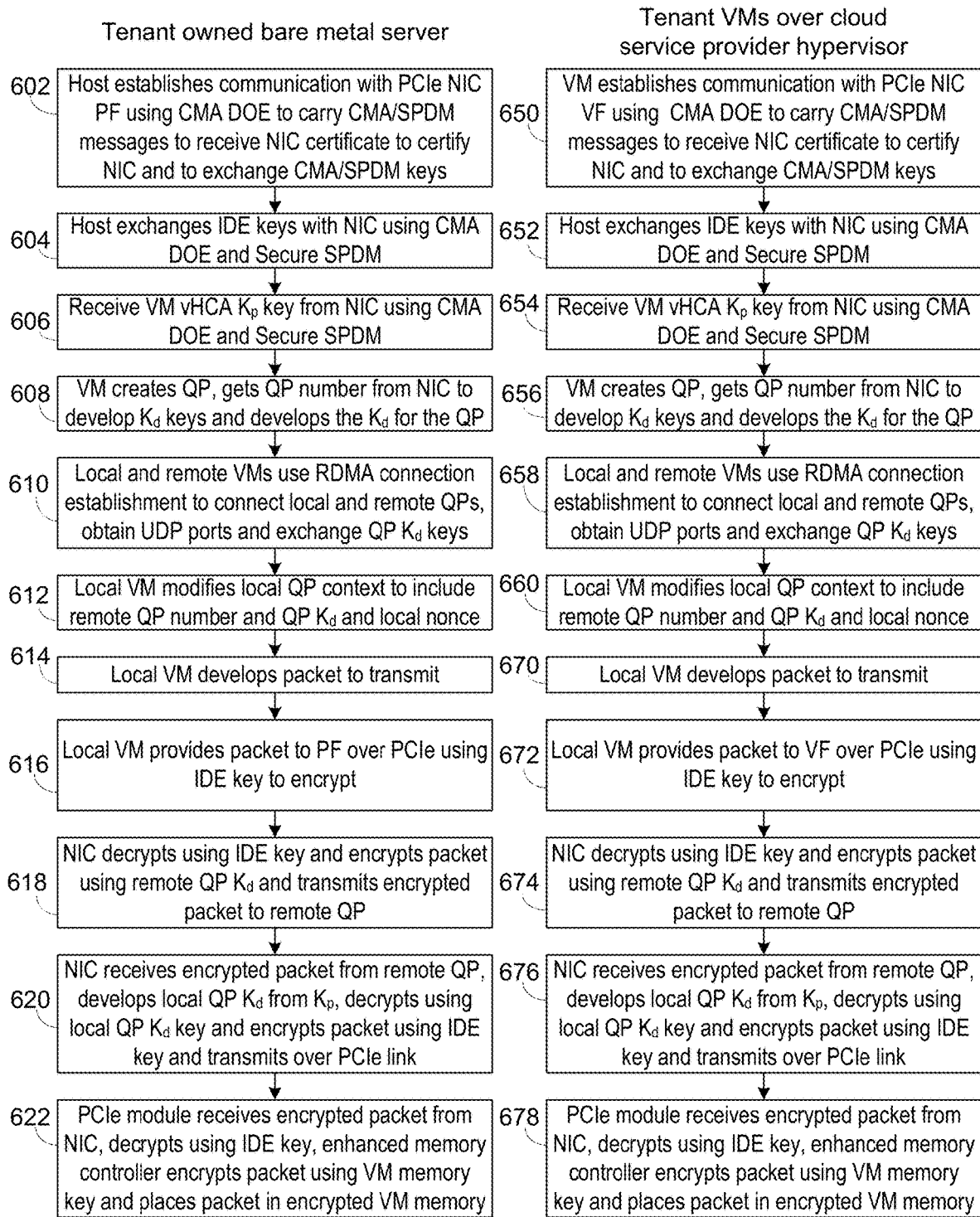

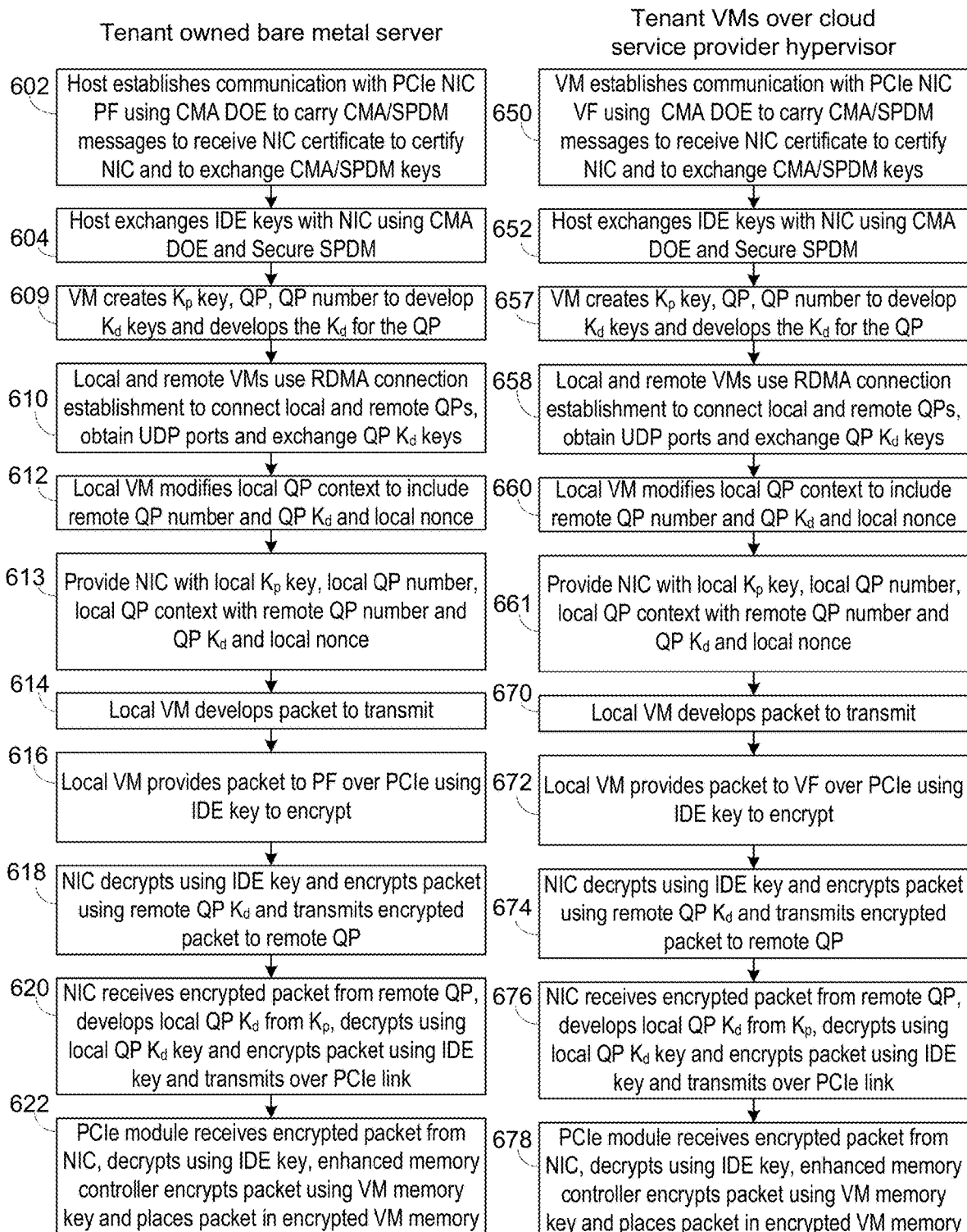

| Type | | CSP | NIC (handles ESP) | VM |
|---|---|---|---|---|
| VM Controlled Underlay IPsec | Creator | | SPI, Sequence Numbers, anti-replay check | Key, lifetime, rekeying window, anti-replay check window size, nonce, shared secret Diffie-Hellman |
| | Reader | Key lifetime, rekeying window, packet statistics (e.g. discards), anti-replay window size | | SPI, Sequence Numbers |
| VM Controlled Underlay IPsec with scalable keys | Creator | | SPI, Sequence Numbers, anti-replay check, $K_d$ | $K_p$, lifetime, rekeying window, anti-replay check window size, nonce, shared secret Diffie-Hellman |
| | Reader | Key lifetime, rekeying window, packet statistics (e.g. discards), anti-replay window size | | SPI, Kd, Sequence |

Fig. 8A1

| Type | | CSP | NIC (handles ESP) | VM |
|---|---|---|---|---|
| VM Controlled Underlay IPsec | Creator | | Sequence Numbers, anti-replay check | SPI, key, lifetime, rekeying window, anti-replay check window size, nonce, shared secret Diffie-Hellman |
| | Reader | Key lifetime, rekeying window, packet statistics (e.g. discards), anti-replay window size | | SPI, Sequence Numbers |
| VM Controlled Underlay IPsec with scalable keys | Creator | | Sequence Numbers, anti-replay check, $K_d$ | SPI, $K_p$, $K_d$, lifetime, rekeying window, anti-replay check window size, nonce, shared secret Diffie-Hellman |
| | Reader | Key lifetime, rekeying window, packet statistics (e.g. discards), anti-replay window size | | SPI, Kd, Sequence |

Fig. 8A2

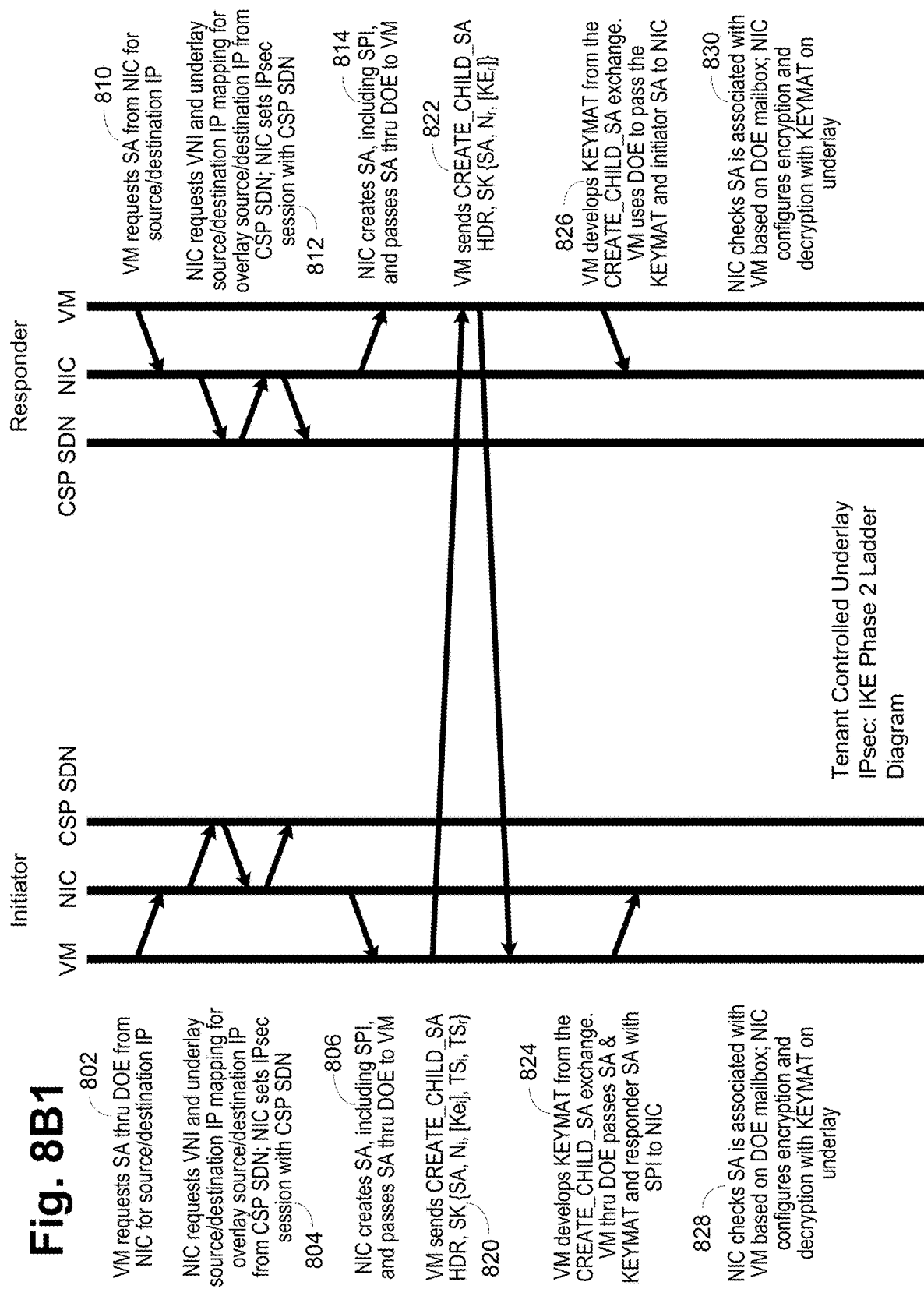

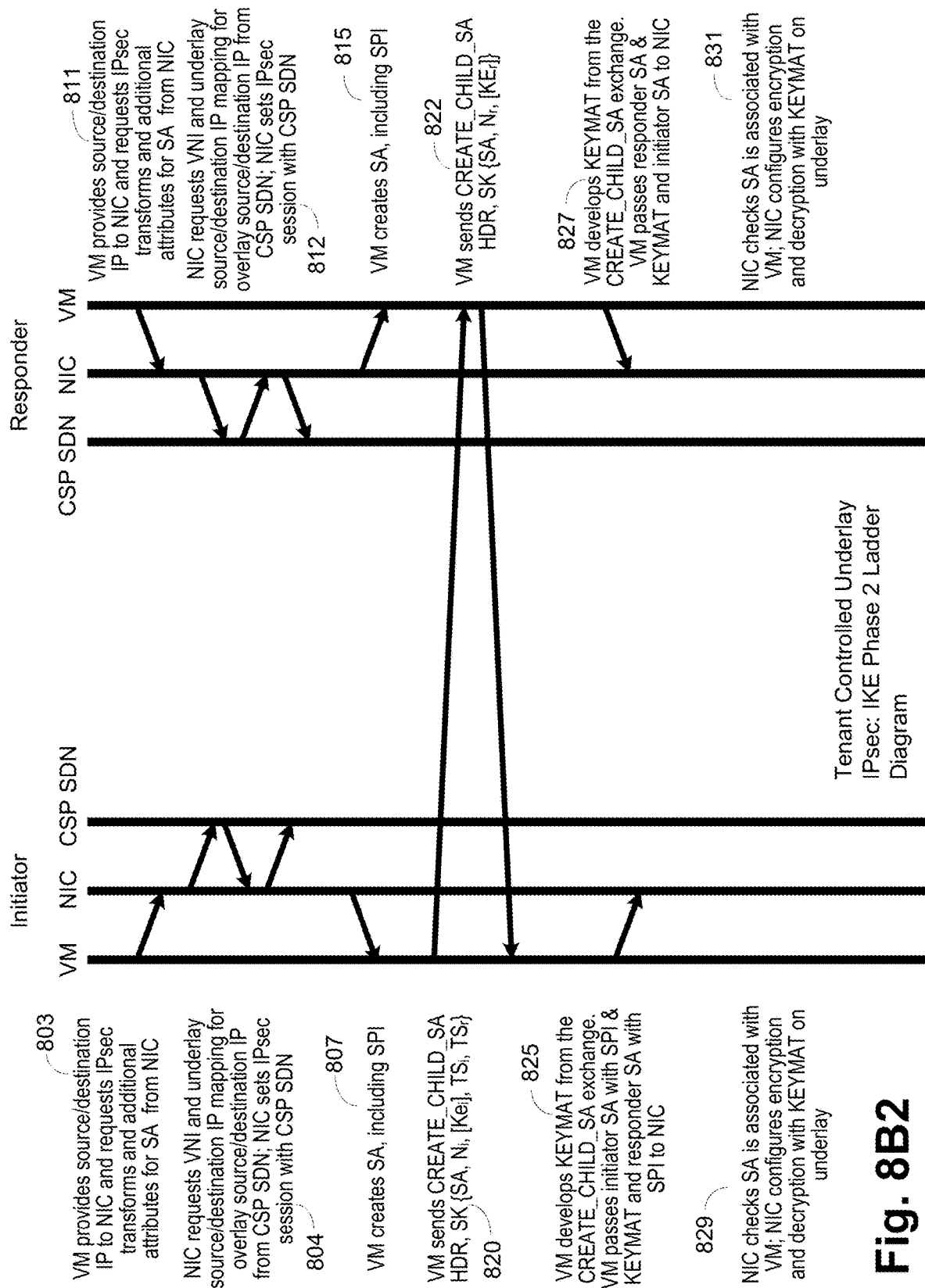
Fig. 8B2

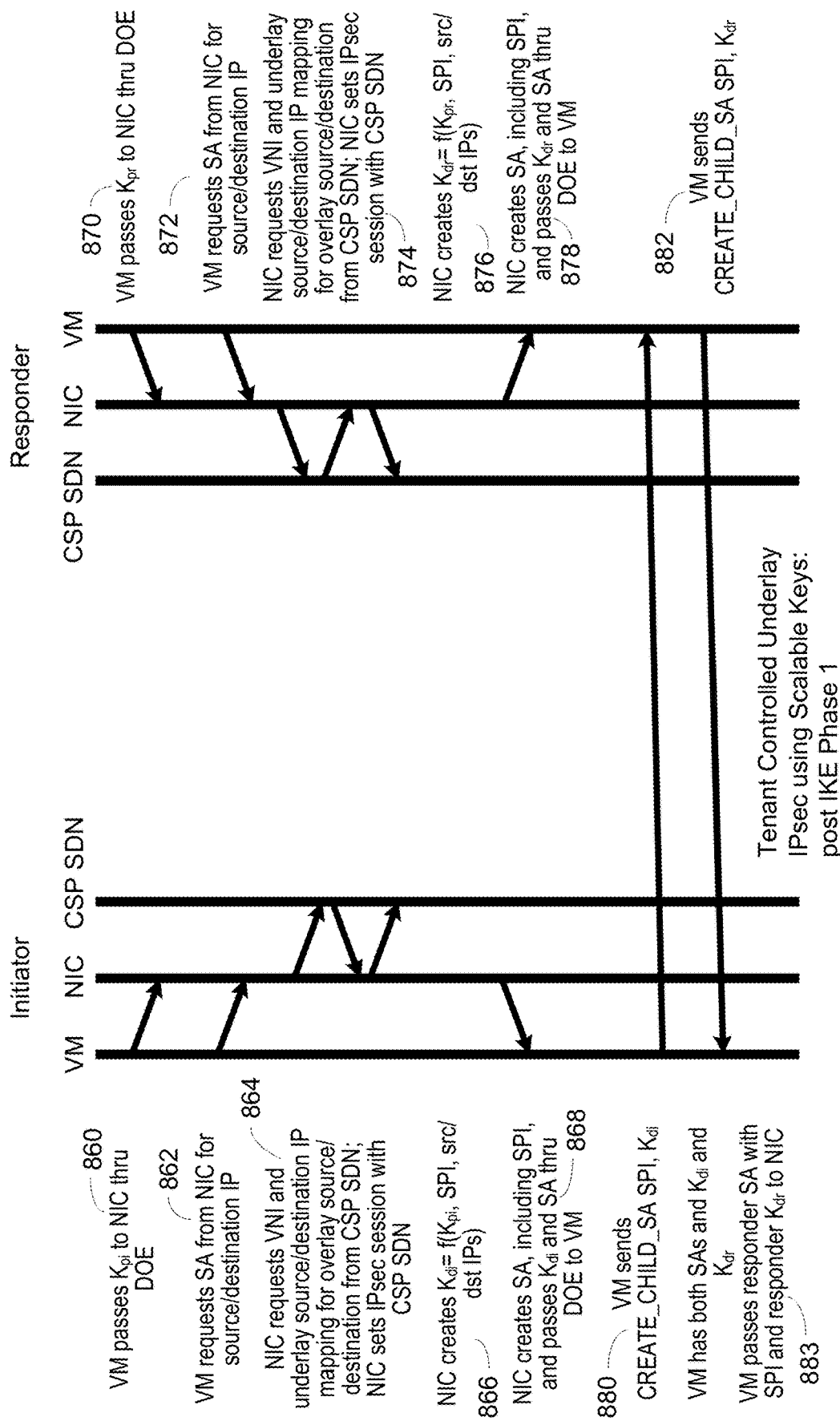
Fig. 8D1

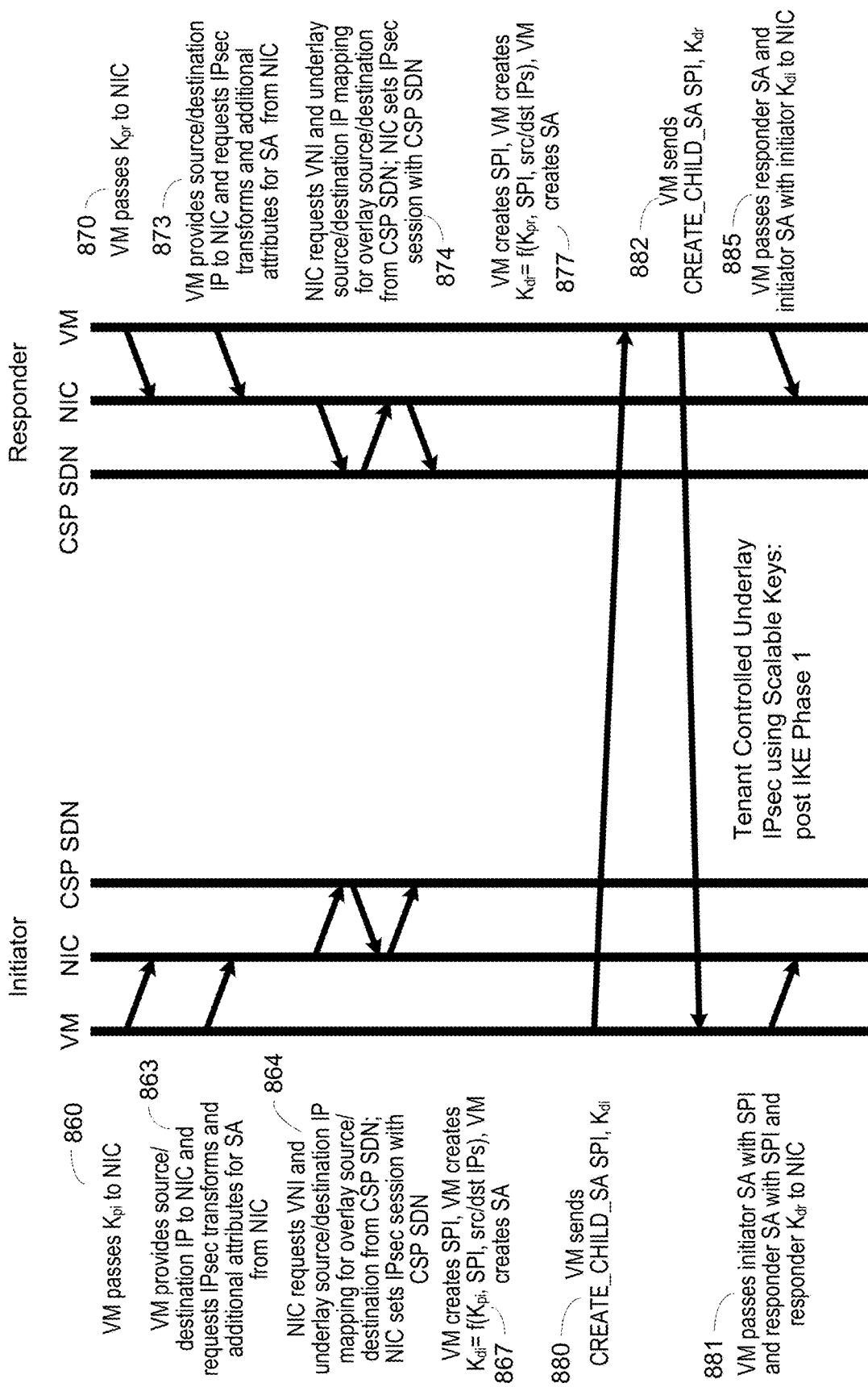
Fig. 8D2

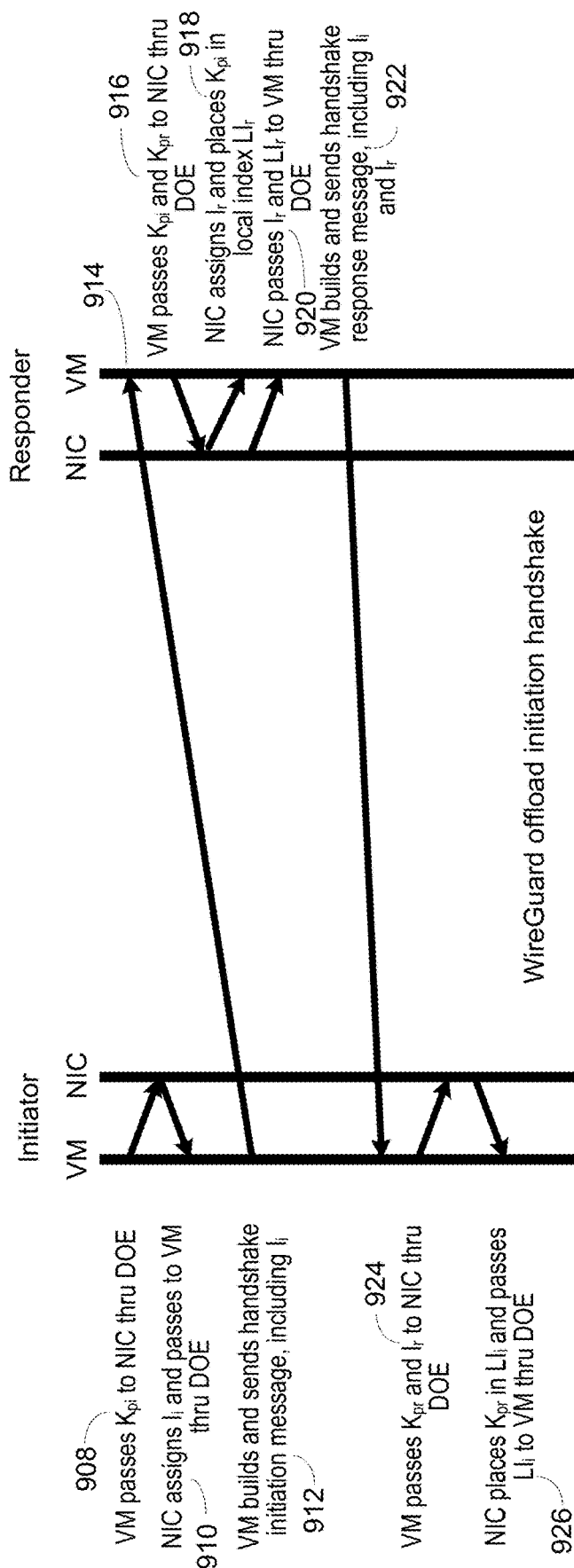
Fig. 9A1

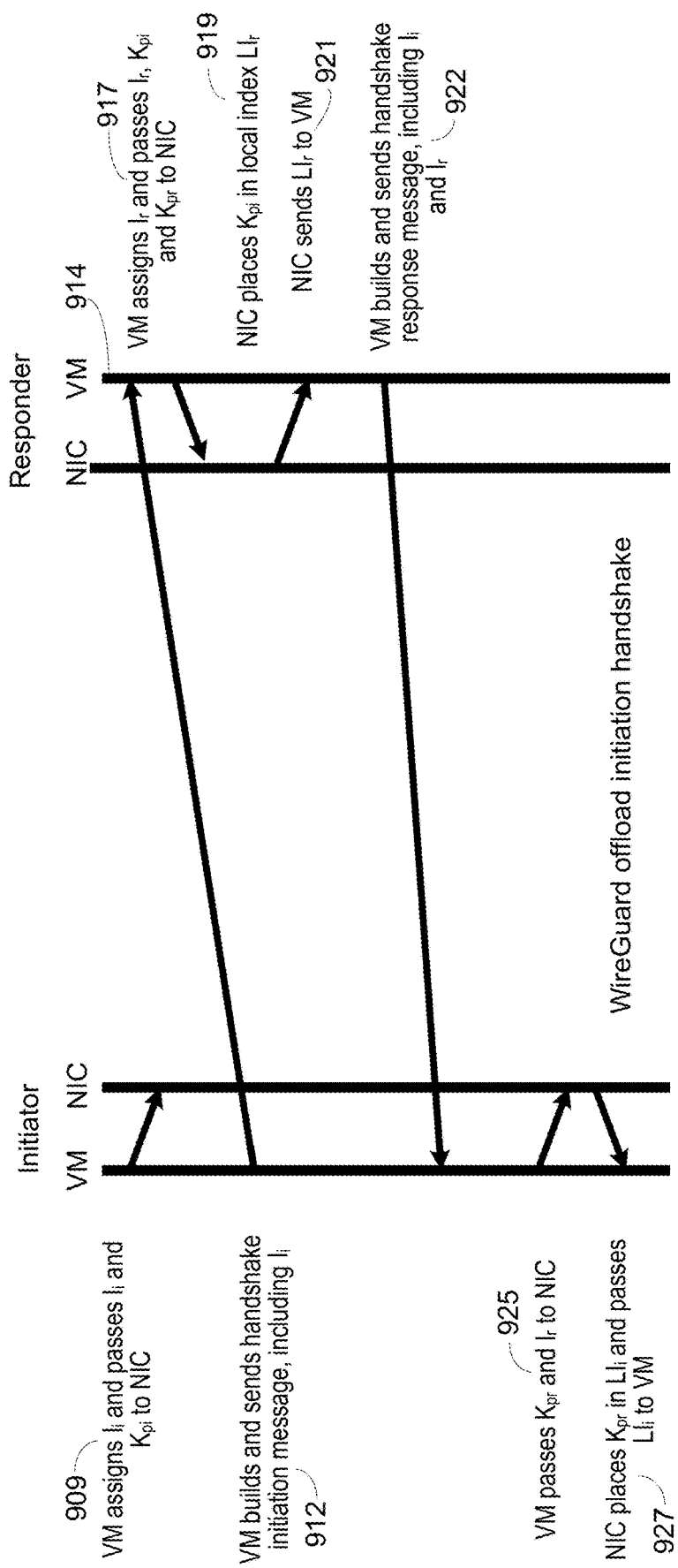
Fig. 9A2

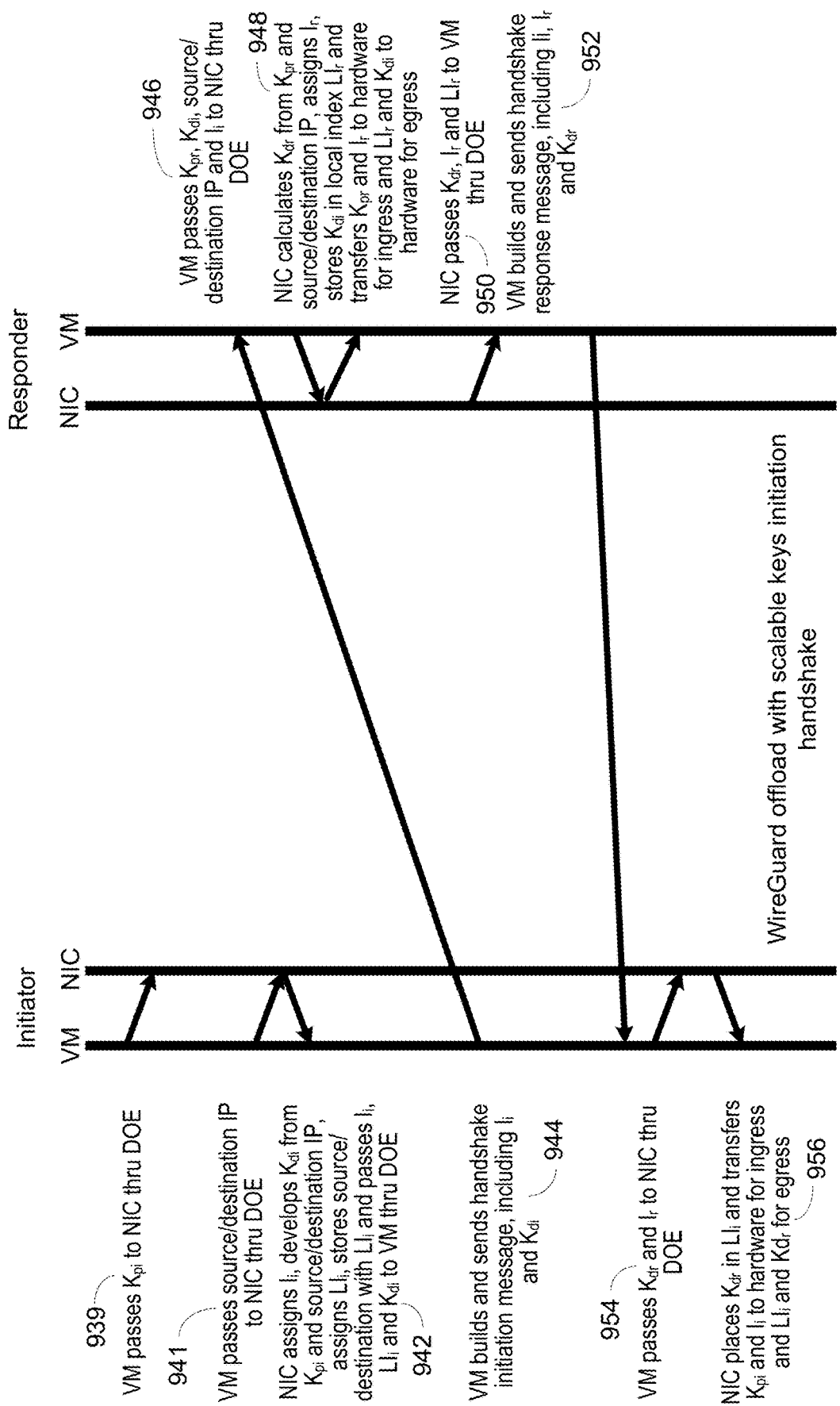

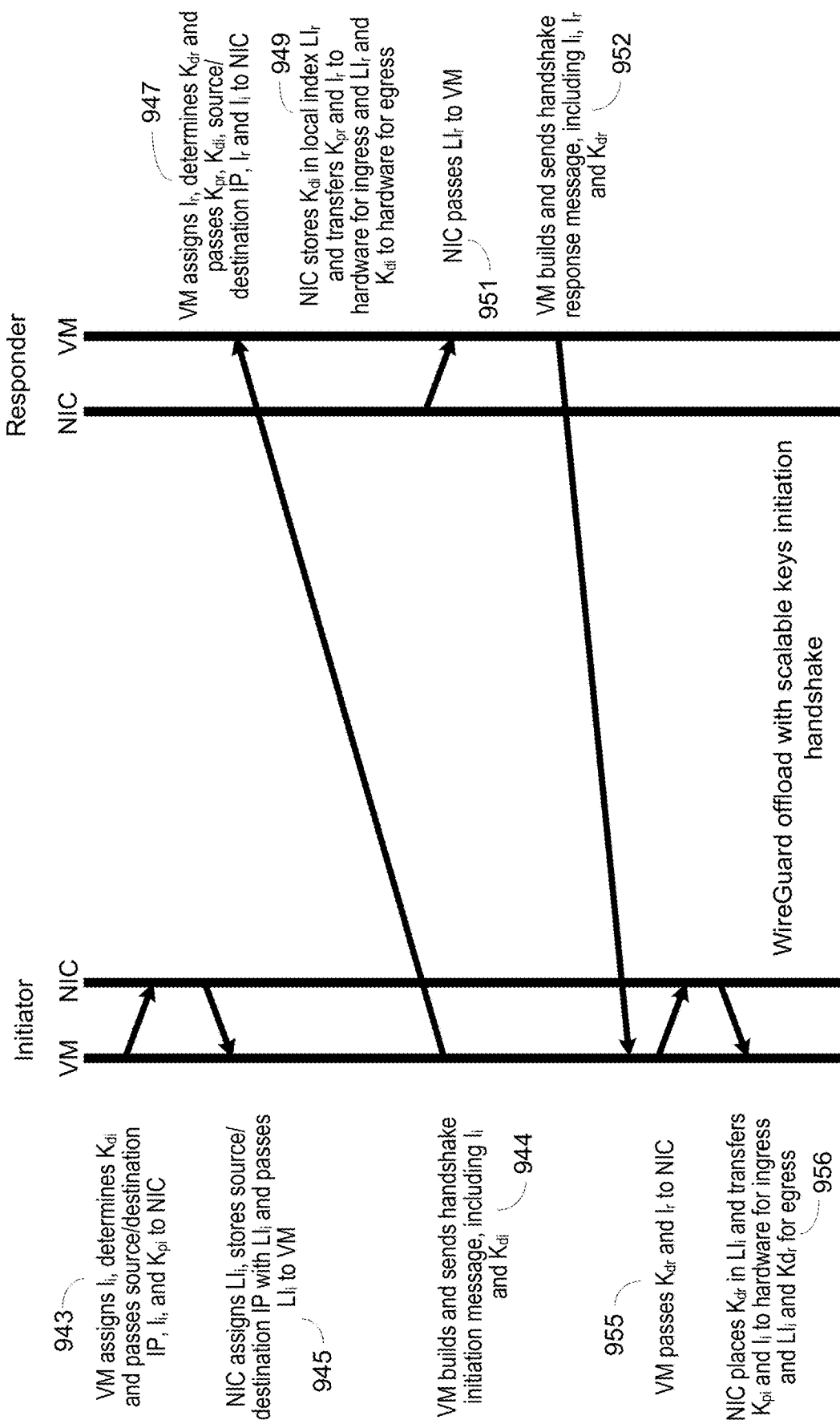
Fig. 9C2

COMPUTER AND NETWORK INTERFACE CONTROLLER SECURELY OFFLOADING ENCRYPTION KEYS AND ENCRYPTION PROCESSING TO THE NETWORK INTERFACE CONTROLLER

CROSS-REFERENCE

This application claims priority to U.S. Provisional Application Ser. No. 63/366,283, filed Jun. 13, 2022, the contents of which are incorporated herein in their entirety by reference.

RELATED CASES

This application is related to application Ser. No. 18/328,516, entitled "Computer and Network Interface Controller Offloading Encryption Processing to the Network Interface Controller and Using Derived Encryption Keys;" application Ser. No. 18/328,538, entitled "Computer and Network Interface Controller Securely Offloading Encryption Keys and RDMA Encryption Processing to the Network Interface Controller;" application Ser. No. 18/328,562, entitled "Computer and Network Interface Controller Securely Offloading Encryption Keys and QUIC Encryption Processing to the Network Interface Controller;" application Ser. No. 18/328,579, entitled "Computer and Network Interface Controller Securely Offloading Encryption Keys and Underlay IPsec Encryption Processing to the Network Interface Controller;" and application Ser. No. 18/328,596, entitled "Computer and Network Interface Controller Securely Offloading Encryption Keys and WireGuard Encryption Processing to the Network Interface Controller," all filed concurrently herewith and all hereby incorporated by reference.

TECHNICAL FIELD

This disclosure relates generally to offloading of encryption tasks on data streams to a smart network interface controller (NIC).

BACKGROUND

Modern computing is increasingly being performed in very large data centers. In some cases, the computer is a dedicated unit referred to as a bare-metal machine, where the bare-metal machine is dedicated to a single tenant, and the tenant is allowed complete control of the bare-metal machine, including the ability to install any operating system, hypervisor and application software. In most cases the computing environment is a series of virtual machines (VMs) operating on a hypervisor on shared hardware. In both cases, the networking infrastructure is provided by a cloud service provider (CSP). In cases of shared machines, the hypervisor is also provided by the cloud service provider. Because of the connections and items owned by the cloud service provider, various users are concerned about data protection in a cloud server environment. To that end, for those users the data is always encrypted in the VM and during transmission over the network. One problem with encryption is ownership of the encryption keys. If the encryption keys are maintained in the virtual machine, the user always has control and the cloud service provider does not. In the existing cases this means that the encryption has to be done in software, which is very slow. Only by transferring knowledge of the encryption keys to the cloud service provider can hardware offloading of the encryption process occur. But because the keys are now known to the cloud service provider, the privacy and secrecy of the data is potentially compromised. It would be desirable to have a high-speed hardware encryption process that still maintains the keys and secrecy of the particular virtual machine or user.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings:

FIGS. 2A, 2B and 2C illustrate block diagrams of the computing environment in a traditional bare-metal server, a VMware overlaid bare-metal server and a VM server as provided by a cloud service provider.

FIG. 3A1-3A3 are example block diagrams of processor boards of a server present in a cloud service provider environment according to the present invention.

FIGS. 3B1 and 3B2 are example block diagrams of a network interface card (NIC) of a server present in a cloud service provider environment according to the present invention.

FIGS. 4A1 and 4A2 are example flowcharts of operations of a tenant owned bare-metal server to offload encryption keys and encryption processing to a NIC but maintain privacy of the keys according to the present invention.

FIGS. 4B1 and 4B2 are example flowcharts of operations in a shared server to offload encryption keys and encryption processing to a NIC but maintain privacy of the keys according to the present invention.

FIGS. 6A1 and 6A2 are example flowcharts of RDMA operations in a tenant owned bare-metal server where the encryption keys and encryption processing are offloaded to a NIC in the cloud service but maintain privacy of the keys according to the present invention.

FIGS. 6B1 and 6B2 are example flowcharts of RDMA operations with a virtual machine in a shared server in a cloud server provider environment but maintain privacy of the keys according to the present invention.

FIGS. 8A1 and 8A2 are tables illustrating data and task ownership and access in encryption offloading to the NIC for VM Controlled Underlay IPSEC and VM Controlled Underlay IPSEC with scalable keys.

FIGS. 8B1 and 8B2 are example ladder diagrams illustrating IKE phase 2 of a tenant owned underlay IPsec environment which maintains privacy of the keys according to the present invention.

FIGS. 8D1 and 8D2 are example ladder diagrams of post IKE phase 1 operations to exchange encryption keys in a tenant owned underlay IPsec environment with scalable keys according to the present invention.

FIGS. 9A1 and 9A2 are example ladder diagrams illustrating offloaded WireGuard initiation handshakes with single encryption keys which maintains privacy of the keys according to the present invention.

FIGS. 9C1 and 9C2 are example ladder diagrams illustrating offloaded WireGuard initiation handshakes using scalable keys which maintains privacy of the keys according to the present invention.

DETAILED DESCRIPTION OF THE EXAMPLES

Figure 1:
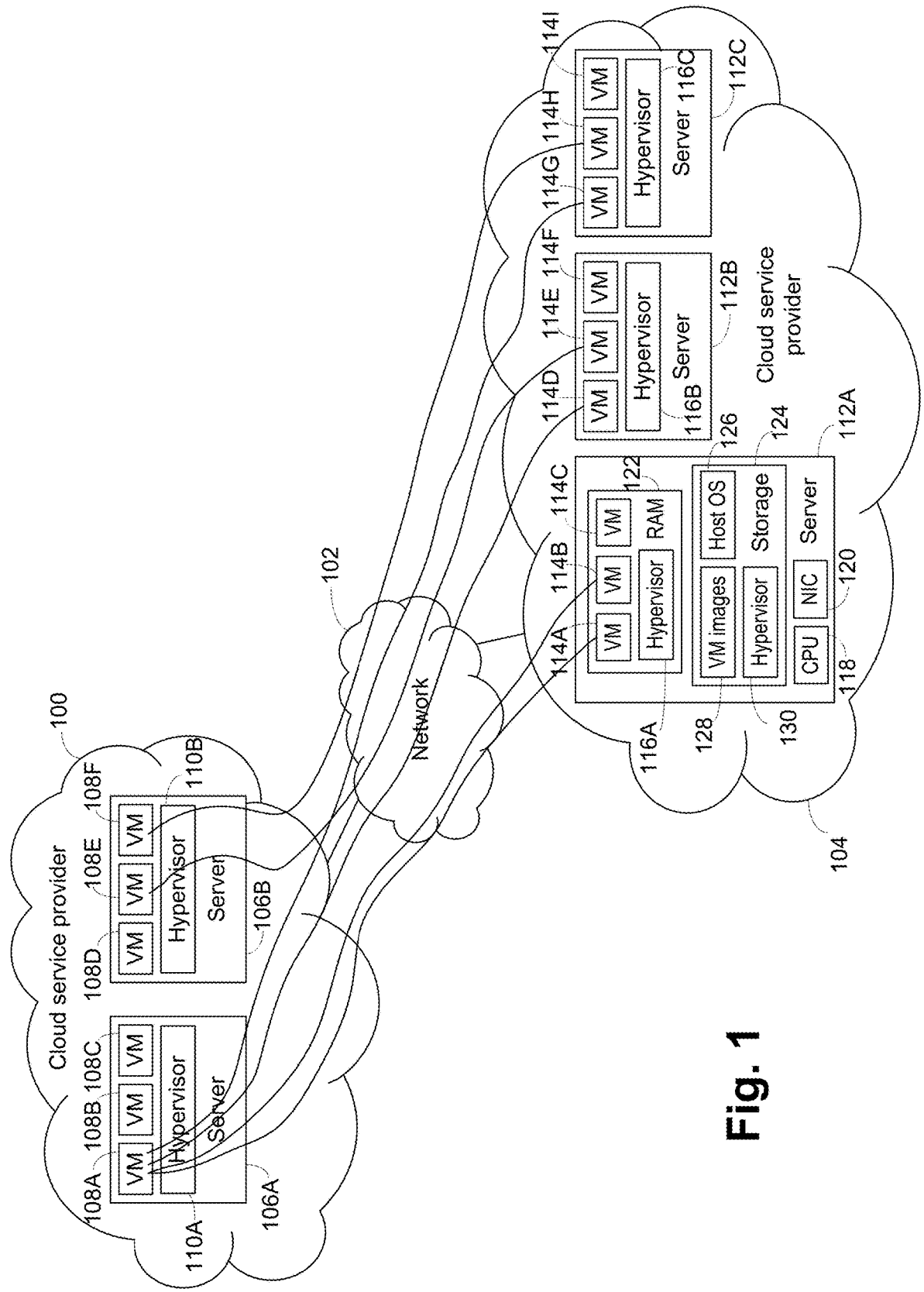
FIG. 1 is a block diagram of a cloud service provider environment where virtual machines at one cloud service provider location connect to various virtual machines in another cloud service provider location.

Referring now to FIG. 1, a cloud service provider environment is illustrated. A first cloud service provider 100 is connected through a network 102, such as the Internet, to a second cloud service provider 104. The first cloud service provider 100 is illustrated as having first and second servers 106A and 106B. Each server 106A, 106B includes three virtual machines (VM) 108, with server 106A including VMs 108A-108C and server 106B including VMs 108D-108F, and a hypervisor 110A, 110B. The second cloud service provider 104 is illustrated as having three servers 112A, 112B and 112C. Each server 112A-112C includes three virtual machines 114, with server 112A including VMs 114A-114C, server 112B including VMs 114D-114F and server 112C including VMs 114G-114I; and a hypervisor 116A-116C. More detail is provided of server 112A as exemplary of the servers 106A, 106B, 112B and 112C. The server 112A includes a processing unit 118, a NIC 120, RAM 122 and non-transitory storage 124. The RAM 122 includes the operating virtual machines 114A-114C and the operating hypervisor 116. The non-transitory storage 124 includes stored versions of the host operating system 126, the virtual machine images 128 and the stored version of the hypervisor 130.

While VMs are used as the example environments in this description, it is understood that containers or other similar items operate similarly, so that VM is used in this description to represent any of VMs, containers or similar entities. In the case of containers, the hypervisor is replaced by the container software, such as Docker®, so that the server 112A would have the container software replace the hypervisor 116A, and containers replace the VM images 128 and VMs 114A-114C.

The servers 106A and 106B are connected inside the first cloud service provider 100 by a network which allows connectivity to the network 102 and to the second cloud service provider 104. Similarly, the servers 112A, 112B and 112C are connected by a network in the second cloud service provider 104 to allow access to the network 102 and the first cloud service provider 100.

FIG. 1 is illustrative of the complex environment of the VMs. A VM 108A in the server 106A is connected to VM 114A and VM 114B in the server 112A, VM 114D in the server 112B and VM 114G in the server 112C. VM 108E in the server 106B is connected to a VM 114E in the server 112B. VM 108F in the server 106B is connected to VM 114H in the server 112C. Thus, VM 108A is connected to four different VMs in three different servers, while servers 112B and 112C each have two VMs connected to two different servers. This is a very simple example for explanation purposes. In common environments, there are hundreds of VMs running on a single server and individual VMs are connected to thousands of remote VMs on thousands of servers.

FIG. 2A illustrates a server environment using a virtual Ethernet bridge on a bare-metal server. Three VMs 200A, 200B and 200C are operating over a hypervisor 202A. The hypervisor 202A is operating in virtual Ethernet bridge (VEB) mode. A NIC 204 presents a physical function (PF) 206A and three virtual functions (VFs) 208A, 208B and 208C. The PF 206A is connected to a VEB layer-2 210. The VEB layer-2 210 communicates with an overlay software defined network (SDN) layer 212 which is provided by the cloud service provider (CSP), shown by the shading of the SDN layer 212. The SDN overlay layer 212 operates over the NIC 214, which in turn is connected to the underlay cloud physical network 215.

FIG. 2B illustrates a second bare-metal server environment but in this case using a VMware® overlay. The hypervisor 202B is operating in overlay mode. The PF 206B is operating in an overlay environment 216.

FIG. 2C illustrates a shared server environment, where the hypervisor 202C is provided by the CSP. The virtual machines 200A-C connected to the CSP hypervisor 202C. The hypervisor 202C interacts with the NIC 204. The PF 206C is controlled by the hypervisor 202C and is illustrated in shaded form to indicate control and access by the CSP. In the case of FIG. 2C, the PF 206C directly connects to the SDN overlay layer 212.

As can be seen in the illustrations of FIGS. 2A, 2B and 2C, the CSP has at least one layer in the communications protocol in each of the cases, such as the SDN overlay 212 and the underlay cloud physical network 215. In the shared server case of FIG. 2C, the CSP also provides the hypervisor 202C and has significant control and access to all materials in the server. All of this means that the CSP has access to all data flowing in the cloud network. To protect the privacy of any data of the various VMs, encryption must be performed at some level. The most secure, but also the slowest, is to have software in the VM perform the encryption and decryption. Doing the encryption in the VM allows the VM to maintain the encryption keys, so that the data is never visible to the CSP and the CSP cannot decrypt any packets. The primary way to increase speed of the encryption is to perform encryption and decryption in hardware in the NIC.

But to do this in the current environment requires that the CSP have access to the keys to provide to the NIC. That provision of keys means that the CSP has access to the unencrypted data, which is not desirable. The tradeoff is then maintain security by performing the encryption in software in the VM or do the encryption quickly with the CSP having the keys. Examples according to the present invention perform the encryption and decryption in hardware in the NIC but deny the CSP access to the keys.

Modern CPUs can encrypt the VM memory, which is good for protection from other VMs on the same server. However, to transfer a packet over the network, the data must be placed in shared memory space of the hypervisor. If the encryption is to be performed by the NIC, this means that the data is in unencrypted form in shared memory. This is a further challenge in performing high speed encryption, as this allows a much larger opportunity for leakage of the data. This second security risk leads back to the slow operation of performing the encryption in software, even if the CSP does not have access to the NIC encryption keys. Examples according to the present invention maintain data encryption from the secure area of the VM encrypted memory to a secure area in the NIC. Therefore, examples according to the present invention can maintain the data in secure format from the initiator or host VM memory to the responder or client VM memory.

FIGS. 3A1 and 3B1 illustrate a processor board 300 and a NIC 302 used in a cloud service environment according to the present invention. The processor board 300 includes one or more of processors 303 to perform the computing. Each processor 303 includes CPUs or cores 305, a PCIe module 304 which includes a phy 306 to allow the processor 303 to communicate with peripherals such as the NIC 302. The processor 303 includes an enhanced memory controller 308. The enhanced memory controller 308 includes a crypto block 310 to perform encryption and decryption of data resident in the RAM memory 312. The enhanced memory controller 308 further stores virtual machine memory keys 314 to be used by the crypto block 310 during data transfers. An IOMMU 318 is present to monitor and control I/O operations between the NIC 302 and the encrypted VM memory of the processor board 300. The PCIe module 304 stores the IDE keys 316 and includes a crypto block 317 for encrypting and decrypting transfers over the PCIe link to the NIC 302 using the IDE keys 316. While the enhanced memory controller 308 crypto block 310 and the PCIe module 304 crypto block 317 are illustrated as separate units, they could be combined into a single unit but in any case form a crypto engine for the processor 303.

Processor board 300 includes program storage 320, such as that illustrated in non-transitory storage 124. The RAM memory 312 includes the operating hypervisor 321, NIC driver 319, separated and isolated VM1 322 and VM2 324 and a trusted execution environment (TEE) security manager (TSM) 326, such as the one described in the TEE Device Interface Security Protocol (TDISP) issued by PCI SIG™. VM1 322 includes an area of encrypted memory 328 and a memory key 330 used to encrypt memory data transfers to the encrypted memory 328 and to decrypt data transfers from the encrypted memory 328. VM1 322 further includes network encryption keys 332, which include a local encryption key $K_{p1}$, which is the primary encryption key for VM1 322, and a series of client encryption keys $K_p$ primary keys and/or $K_d$ keys derived from a $K_p$ key provided by the remote or responder client software that is communicating with the VM1 322. VM1 322 also includes a DOE and SPDM module 329 for communication with the NIC 302 as described below and communication program 1 331 for communication with the remote endpoint according to the desired protocol. VM1 322 further includes certificate code 327 to receive a certificate 376 from the NIC 302 to verify and authenticate the NIC 302. VM1 further includes a guest operating system 323.

Similarly, VM2 324 includes encrypted memory 334, memory key 336, primary encryption key $K_{p2}$, network encryption keys 338, DOE and SPDM module 335, communication program 2 337, certificate code 333 and guest operating system 315.

The TSM 326 includes IDE keys 340 used to encrypt packet communications over a PCIe link with the NIC 302. The TSM 326 further includes IOMMU translation tables 342 to be used with VM1 322 and VM2 324 so that the enhanced memory controller 308 can use the IDE keys 340 for each memory block in each VM being accessed. In some examples, the TSM 326 functions may be executed in a trusted security co-processor, with only the IDE keys 340 and IOMMU translation tables 342 contained in the TSM 326 in the RAM memory 312. In some examples, a reverse mapping table (RMP) may be used instead of the IOMMU translation tables, the acting in much the same manner as the IOMMU. The IOMMU 318, IOMMU translation tables 342 and enhanced memory controller 308 cooperate so that DMA transfers with the NIC 302 are encrypted. For memory read operations where a DMA controller 360 in the NIC 302 is requesting data, the enhanced memory controller 308 decrypts the contents of the VM1 encrypted memory 328 and VM2 encrypted memory 334 when reading the data from the memory, provides the contents to the PCIe module 304, which then encrypts the data using the IDE key for transmission over the PCIe link to the NIC 302. For memory write operations where the DMA controller 360 provides data to the VM1 or VM2, the PCIe module 304 decrypts the packet received over the PCIe link with the IDE key and provides the packet to the enhanced memory controller 308, which encrypts the data with the proper VM1 or VM2 memory key. By encrypting any data transfers over a PCIe link or the memory bus, external devices cannot be connected to the processor board 300, the RAM memory 312 or the PCIe link to the NIC 302 to obtain the unencrypted contents or packet. The internal hardware paths inside processor 303 are considered sufficiently secure so that unencrypted data transfers can occur inside the processor 303, those internal hardware paths not externally accessible.

FIG. 3A2 illustrates an example processor board 300' using the Trusted Device Interface (TDI) concepts of the TEE Device Interface Security Protocol (TDISP) issued by PCI SIG™, as exemplified in FIG. 11-2, for communications between the respective VMs and the NIC 302'. The TSM 326 has been modified to perform the NIC certification operations, so the certificate code 327 is now resident in the TSM 326 and has been removed from VM1 322 and VM2 324. Similarly, the TSM 326 has been modified to perform the DOE and SPDM operations and to set up the IDE keys and encryption of the PCI link. A DOE and SPDM module 344 is provided in the TSM 326 and the DOE and SPDM modules 329 and 335 have been removed from the VM1 322 and VM2 324.

VM1 322 now includes a TDI driver 325 to perform management functions of the relevant VF portions of the NIC 302'. The TDI driver 325 communicates with the communication program 331 to allow the communication program 331 to provide NIC operation commands for forwarding by the TDI driver 325. The TDI driver 325 may optionally include a DOE and SPDM module 313 if the VM1 322 wishes to utilize DOE/SPDM operations for transfer of secret keys to the respective VF in the NIC 302'. Otherwise, the secret keys can be passed using MMIO commands over the PCIe link, the PCIe link being secured by IDE encryption. VM2 324 similarly now includes a TDI driver 341 and optional DOE and SPDM module 339, with the TDI driver 341 in communication with the communication program 337.

FIG. 3A3 illustrates an example processor board 300" where the contents or packets are encrypted over the internal hardware paths inside the processor 303. The IDE keys 316 are stored in the enhanced memory controller 308 instead of the PCIe module 304. The enhanced memory controller 308 performs encryption and decryption of memory data and the encryption and decryption of data transferred through the PCIe module 304. For memory read operations where a DMA controller 360 in the NIC 302 is requesting data, the enhanced memory controller 308 decrypts the contents of the VM1 encrypted memory 328 and VM2 encrypted memory 334 when reading the data from the memory, and then encrypts the data using the IDE key for transmission over the PCIe link to the NIC 302. For memory write operations where the DMA controller 360 provides data to the VM1 or VM2, the enhanced memory controller 308 decrypts the packet received over the PCIe link with the IDE key and encrypts the data with the proper VM1 or VM2 memory key. By having the enhanced memory controller 308 perform the needed PCIe encryptions and decryptions instead of the crypto block 317 in the PCIe module 304, the data is never available in unencrypted form outside of the secure enhanced memory controller 308 hardware.

The NIC 302 includes a SmartNIC system on a chip (SOC) 301, off-chip RAM 387, and SmartNIC firmware 388. While shown as a single chip, the SOC 301 can also be multiple interconnected chips that operate together. The SOC 301 includes a PCIe module 350 which includes a phy 352. The PCIe module 350 further includes a copy of the IDE keys 354. The IDE keys 354 are used with a crypto block 264 in the PCIe module 350. A DMA controller 360 is provided in the SOC 301 to perform automated transfers between the processor board 300 and the NIC 302 and inside the NIC 302. An egress buffer memory 268 and ingress packet processing and routing hardware 357 are connected to the PCIe module 350. While shown as separate egress and ingress buffer memories, this is a logical illustration and the egress buffer memory 268 and ingress buffer memory 266 can be contained in a single memory. The crypto block 264 decrypts packets received over the PCIe link and stores the decrypted packet in the egress buffer memory 268. The crypto block 264 encrypts packets before the packets are sent over the PCIe link. The ingress packet processing and routing hardware 357 is connected to ingress buffer memory 266, which receives decrypted packets from an Ethernet module 366 on the SOC 301. The ingress packet processing and routing hardware 357 strips received packets of underlay headers and provides metadata used to route the packet to the proper PF or VF. The egress buffer memory 268 is connected to egress packet building hardware 359, which builds packets provided to the Ethernet module 366. The Ethernet module 366 includes a crypto block 370, a cache of active remote client encryption keys $K_p$s and $K_d$s table 356 to be used for encryption, and copies of the VM primary keys $K_p$ to be used in combination with derived key logic 372. The crypto block 370 uses the appropriate encryption $K_p$s and $K_d$s from the table 356 to encrypt packets received from the egress packet building hardware 359 and provided to a phy 368 connected to the cloud network. The crypto block 370 uses the VM primary keys $K_p$, and relevant information in a received packet to develop the derived key $K_d$ for the appropriate endpoint, to decrypt packets received through the phy 368 from the cloud network.

While the packets received from the VMs include Ethernet headers, those headers are the inner or overlay headers of the packets, which headers cannot be used to route the packets through the cloud network. A CSP SDN domain module 250 is connected to the egress packet building hardware 359 to handle addition of the outer or underlay header used by the cloud network to route the packet. The CSP SDN domain 250 provides the SDN layer 212 of FIGS. 2A-2C. The CSP SDN domain 250 includes a processor 252, RAM 254 and header hardware 255. CSP SDN software 256 is loaded into the RAM 254. The CSP SDN software 256 includes an operating system 258 and a CSP SDN module 260, which performs the software/firmware functions necessary to develop the proper headers. The CSP SDN software 256 is obtained from program storage 320 by the NIC driver 319 and loaded into the CSP SDN domain 250. In some alternatives, the CSP SDN software 256 is stored in a separate nonvolatile memory connected to the CSP SDN domain 250, so that the CSP SDN software is firmware. The RAM 254 includes various header tables 262 used by the header hardware 255 to determine the proper outer headers. The header hardware 255 acts as a match/action block, matching on header values and performing a resultant action. While the header tables are illustrated as being contained in RAM 254, the header tables 262 may also be stored in the off-chip RAM 387 to reduce the size of the RAM 254. The CSP SDN domain 250 can also directly receive packets from the Ethernet module 366 and provide packets to the Ethernet module 366 for communication with the cloud network for management operations. The CSP SDN domain 250 cannot access the ingress buffer memory 266 or the egress buffer memory 268. The CSP SDN module 260 is provided by the CSP vendor or developed in conjunction with or according to the requirements of the CSP vendor. The CSP SDN domain 250 is analogous to relevant portions of CSP-provided hardware, such as the Nitro™ controller for VPC provided by Amazon Web Services® or the Azure® Stack HCI and Network Controller in Microsoft® Azure with northbound and southbound APIs.

In operation, the egress packet building hardware 359 obtains a packet header from the egress buffer memory 268 and provides the header to the CSP SDN domain 250 to allow the CSP SDN domain 250 to develop and return the proper outer header to the egress packet building hardware 359. The egress packet building hardware 359 then obtains the packet payload, assembles the complete packet and provides the complete packet to the Ethernet module 366 for encryption and transmission to the cloud network.

In ingress operation, the decrypted packet is provided to the ingress packet processing and routing hardware 357. The ingress packet processing and routing hardware 357 analyzes the decrypted packet to check validity. The ingress packet processing and routing hardware 357 provides the packet header to the CSP SDN domain 250. The CSP SDN domain 250, using the header hardware 255, uses the virtual network identifier (VNI) or virtual subnet identifier (VSID) and underlay header values to determine the appropriate PF or VF and which header values are to be removed to have only the overlay headers remain. The CSP SDN domain 250 returns a decapped header and PF or VF metadata to the ingress packet processing and routing hardware 357. The ingress packet processing and routing hardware 357 reassembles the packet with the shortened header and then performs sequence number and integrity values checking. The ingress packet processing and routing hardware 357 then uses the PF or VF metadata for internal queuing information; and places the decrypted packet in the proper output queue in the PCIe module 350, where the packet is encrypted using the IDE key and placed on the PCIe link. This detailed description of the handling may be omitted in other locations in this description for simplicity but occurs in all cases of receiving an ingress packet.

As with the processor board 300 of FIG. 3A1, while the packet is stored in unencrypted form in the ingress buffer memory 266 and the egress buffer memory 268, the ingress buffer memory 266 and the egress buffer memory 268 cannot be accessed externally of the NIC 302 or by the CSP SDN domain 250 and so are considered sufficiently secure. While the Ethernet module 366 crypto block 370 and the PCIe module 350 crypto block 264 are illustrated as separate units, they could be combined into a single unit but in any case form a crypto engine for the SOC 301.

As mentioned above, a single server may have thousands to hundreds of thousands of connections between VMs on the server and remote VMs. These connections can also be called sessions and the encryption keys used can be called session encryption keys. This means that there are thousands to hundreds of thousands of encryption keys to associate with packets for encryption and decryption. However, a NIC has limited space in hardware for packet detection operations. A NIC cannot maintain hundreds of thousands of keys in hardware. This would then limit the value of offloading packet encryption and decryption to the NIC, as many NICs would be needed in such cases. To simplify encryption tasks on ingress, the derived key logic 372 utilizes an identity value for the particular remote client that is contained in a received packet in combination with the VM primary $K_p$ to develop a derived key $K_d$ which is utilized by the remote endpoint to encrypt communication. As the derived keys $K_d$ are derived from the primary keys $K_p$, of which there is a much lower number, the number of VMs on the server, the derived key logic 372 is able to utilize the identity value available in the ingress packet to determine the proper $K_p$ and develop the particular derived key $K_d$ dynamically. This greatly reduces the number of encryption keys required to be stored in the NIC 302.

The NIC 302 further includes a device security manager (DSM) 374, which is a companion to the TSM 326 on the processor board 300. The DSM 374 includes a certificate 376 of the NIC 302 and manages the IDE keys 378. A virtual function/endpoint connection manager 380 is present in the NIC 302 to maintain the $K_p$ and $K_d$s used with each particular VM secure and isolated. To this end, the VM1 block 382 contains the VM1 primary $K_{p1}$ and the primary keys $K_p$s or derived keys $K_d$s provided by the remote VMs being utilized by VM1. The VM2 block 384 contains the primary key $K_{p2}$ for VM2 and the primary keys $K_p$s or derived keys $K_d$s table for VM2. These key values are provided to the Ethernet module 366 and PCIe module 350 to allow proper decryption and encryption of packets to occur. The connection manager 380 maintains the primary and derived keys of each VM secure from access except for use in communications related to that VM, such as transmission or reception of packets to or from the VM.

The VM1 block 382, VM2 block 384, DSM 374 and VF/endpoint connection manager 380 are contained in on-chip RAM 361, though the VM1 block 382, VM2 block 384 and other VM blocks can be stored in the off-chip RAM 387 if the VM1 block 382, VM2 block 384 and other VM blocks are secured so that the VM1 block 382, VM2 block 384 and other VM blocks are not accessible externally of the NIC 302 or by the CSP SDN domain 250. The ingress buffer memory 266 and the egress buffer memory 268 may be contained in the on-chip RAM 361 or may be dedicated memory areas in the SOC 301.

The NIC 302 is configured so that each of the VFs associated with secure VMs are also secure, and the memories and tables of the VFs are not accessible by other VFs or by the CSP. Each VF is thus a secure environment for handling the secure VM data.

The SOC 301 includes a microprocessor 386 to perform processing operations as controlled by firmware 388, a type of non-transitory storage, which includes operating system 390, basic NIC function modules 392, encryption module software 394, function 1 module 396, function 2 module 398 and a DOE and SPDM module 399. The function 1 module 396 and function 2 module 398 are the modules which include the firmware used for the particular encryption protocol being utilized by a given virtual machine with the remote endpoint. Examples of these protocols which are described in more detail below are RDMA, QUIC, IPsec and WireGuard. Other protocols, including proprietary protocols, can also be used. The function modules 396 and 398 cooperate with the communication program 1 331 and communication program 2 337 in VM1 and VM2. An instantiation of a function module 396 or 398 operating with a given VM, such as VM1, does not have access to the VM blocks or VM-specific data of other VMs, such as VM2 block 384 or other VM2-specific data. The DOE and SPDM module 399 cooperates with the DOE and SPDM modules 329 and 335 in VM1 and VM2 to securely transfer messages between the NIC 302 and the VMs 1 and 2.

While the CSP SDN domain 250 is shown as having a separate processor 252, RAM 254 and CSP SDN software 256, in some examples the processor 386 and on-chip RAM 361 can be used, provided that the execution of the programs from the CSP SDN software 256 are isolated from the programs in firmware 388 in operation, the RAM 254 is isolated from the remainder of the on-chip RAM 361 and the programs from the CSP SDN software 256 cannot access the ingress buffer memory 266 or egress buffer memory 268 or any of the packet in the PCIe module 350 or Ethernet module 366. Thus, the physical separation illustrated in FIG. 3B1 becomes a logical separation of the processor, RAM and firmware in the integrated examples. The header hardware 255 remains and is accessible only by programs from the CSP SDN software 256. The tradeoff is program development time versus silicon cost for the processor 252, and RAM 254.

FIG. 3B2 illustrates NIC 302'. NIC 302' differs from NIC 302 by having a TDI module 393 to cooperate with the TDI drivers 325 and 341 to allow management operations of the relevant VF to be performed. These management operations can include transfer of secret keys and other encryption-related data between the relevant VM and the NIC 302'.

FIG. 4A1 illustrates the basic operations according to examples of the present invention for encryption offloading to the NIC in a tenant owned bare metal server environment. In step 402, the host or server establishes communications with the NIC PF using CMA DOE to carry CMA/SPDM messages to have certificate code receive the NIC certificate 376 to certify and trust the NIC 302 and then to exchange CMA/SPDM keys to establish Secure SPDM. Messages carried using Secure SPDM are encrypted in software by the DOE and SPDM modules 329, 335 and 399. Component Measurement and Authentication (CMA) is a PCI SIG specification used to provide PCIe-specific messaging for SPDM. Security Protocol and Data Model (SPDM) is a Distributed Management Task Force (DMTF™) specification that provides a message exchange framework. Secure SPDM is a DMTF specification to provide encryption of SPDM messages. The two involved devices exchange encryption keys used to encrypt and decrypt SPDM messages. Data Object Exchange (DOE) is a PCI SIG specification that defines a mechanism utilizing mailboxes to securely pass messages with a PCIe device. The NIC PF can be used in this example instead of VFs for the certification and SPDM key exchange as the hypervisor is trusted as the server is tenant owned.

In step 404, the host exchanges IDE keys used to encrypt the PCIe link using CMA DOE and Secure SPDM. Integrity and Data Encryption (IDE) is a PCI SIG specification defining a mechanism for encrypting packets or TLPs (transaction layer packets) carried over a PCIe link. Secure CMA/SPDM messaging is used to exchange keys used by each PCIe module to encrypt and decrypt the packets. The IDE specification indicates that each stream and sub-stream can have different IDE keys, which may also differ between receive and transmit, and that multiple streams can be developed between two ports but also notes that may not be needed assuming that the on-die or on-chip streams are equally secure on-die or on-chip. This description has multiple IDE keys being exchanged, one per VM, to cover the cases in the IDE specification but it is understood that some examples may only utilize a single IDE key between ports, for all streams and sub-streams between the two ports so that all VMs use the same IDE key. If only a single IDE key is used, step 404 is only performed one time and thereafter is omitted.

In step 406, the NIC 302 provides the VM primary key $K_p$ to the requesting VM using CMA DOE and Secure SPDM. In other examples according to the present invention the VM provides the primary key $K_p$ to the NIC 302. This is the primary key provided to the remote client or VM to encrypt packets flowing from the remote client to the local client or VM when simple keys are used and used to develop the derived key $K_d$ provided to the remote client when derived keys are being used. In step 408, the local and remote client VMs exchange primary keys $K_p$ or derived keys $K_d$. The derived keys are used to encrypt communications leaving the NIC and going to the other endpoint. In step 409, the local VM provides the remote VM $K_p$ or $K_d$ key to the NIC 302.

In step 410, the local VM develops a particular packet to be transmitted to the remote VM. The packet contains the desired payload and the inner or overlay header. In step 412, the local VM provides the packet and any needed session context to the PF in encrypted format over the PCIe link using the IDE key to encrypt the data.

It is understood that this description of the packet transfer from the VM to the NIC 302 is a simplification used for ease of description. The actual transfer of the packet is performed by the VM placing a command in a memory ring buffer and ringing a NIC doorbell. The NIC DMA controller 360 then obtains the command from the memory ring buffer. In examples according to the present invention, the memory ring buffer for the VM is maintained in encrypted VM memory and the transfer of the command over the PCIe link is done using the IDE keys to encrypt the command so that the command transfer is secure. Upon receiving the command, the DMA controller 360 determines the memory blocks to be transferred and places read requests for those memory blocks. These memory blocks will also be inside the VM encrypted memory. Through the action of the PCIe module 304 and the enhanced memory controller 308 the transfer of these memory blocks is also done securely, decrypting the data from the VM encrypted memory and encrypting using the IDE key for transmission over the PCIe link. The remainder of this description will utilize the simplified version to allow better clarity of the overall operation. Also for clarity, in some instances the secure transfer between a VM and PF or VF done using CMA DOE and Secure SPDM may be referred to as a transfer using DOE.

In step 414, the NIC 302 decrypts the packet using the IDE key and encrypts the packet using the remote VM primary key $K_p$ or derived key $K_d$ and then transmits the encrypted packet to the remote VM. The NIC 302 will have stored the remote VM primary key $K_p$ or derived key $K_d$ in the context tables in the NIC 302, which context tables for transmission can be located in off-chip RAM 387, and obtains the key from the context table when the packet is received from the VM.

In step 416, the NIC 302 receives an encrypted packet from the remote VM, determines source identifying information in the packet which is then used to determine the proper primary key $K_p$, develops a derived key $K_d$ from the primary key $K_p$ and the identifying information as discussed above if needed, decrypts the packet from the remote VM using the primary key $K_p$ or the developed derived key $K_d$ and then encrypts the packet using the IDE key for the particular VM and then transmits the data over the PCIe link. In step 418, the PCIe module 304 receives the encrypted packet from the NIC 302 and decrypts the packet using the IDE key and provides the decrypted packet to the enhanced memory controller 308, which, in turn, encrypts of the packet using the appropriate VM memory key and places the encrypted packet in the encrypted VM memory.

While operations have only been described for the local VM and NIC, similar operations occur at the remote VM and NIC so that data security is provided at both ends of the communication.

From this description it is clear that in one example the local VM data being transferred to the remote VM has only been in unencrypted form in the enhanced memory controller 308, the PCIe module 304 and trusted hardware paths of the processor 303 and in PCIe module 350, Ethernet module 366, trusted ingress buffer memory 266, trusted egress buffer memory 268 and trusted hardware blocks and paths in the NIC 302. In another example, the local VM data being transferred to the remote VM has only been in unencrypted form in the enhanced memory controller 308 of the processor 303 and the PCIe module 350 or Ethernet module 366 of the NIC 302. In both examples the data being transferred is only unencrypted in trusted hardware elements. The particular keys used in the various encryptions and decryptions are never available to the hypervisor 202B or SDN overlay layer 212, only to isolated and secure portions of the VM and NIC 302. This example then provides security of the data throughout the entire transmission process and yet allows encryption/decryption offloading to NIC hardware.

If the processor board 300' architecture is utilized, steps 402 and 404 are performed by the TSM 326 rather than having the host perform those operations with the PF.

FIG. 4B1 illustrates an example of encryption offloading to the NIC in the case of a tenant VM operating over a cloud service provider hypervisor, the most common configuration in cloud computing. In step 450, the local VM establishes communications with the NIC VF using CMA DOE to carry SPDM messages so that the local VM certificate code can receive the NIC certificate and certify the NIC. Then the Secure SPDM keys are exchanged using CMA DOE. In step 452, the host and the NIC exchange IDE key or keys via CMA DOE and Secure SPDM. As with step 404, if only a single IDE key is used, step 452 is only performed one time and thereafter omitted. In step 454, the local VM receives the primary key $K_p$ from the NIC 302 using CMA DOE and Secure SPDM. As noted previously, in some cases the local VM provides the primary key $K_p$ to the NIC 302 instead of receiving it. In step 456, the local and remote VMs exchange primary keys $K_p$ or derived keys $K_d$ which are to be used to transmit packets to the other VM. In step 457, the local VM provides the remote VM $K_p$ or $K_d$ key to the NIC 302.

In step 458, the local VM develops a packet to be transmitted to the remote VM. In step 460, the local VM provides the packet and session context to the VF over the PCIe link using IDE to encrypt the data. In step 462, the NIC 302 decrypts the data received over the PCIe link using the IDE key, encrypts the data using the remote VM primary key $K_p$ or derived key $K_d$ and then transmits the encrypted packet to the remote VM.

In step 464, the NIC 302 receives an encrypted packet from the remote VM, determines source identifying information in the packet which is then used to determine the proper primary key $K_p$, develops a derived key $K_d$ from the primary key $K_p$ and the identifying information as discussed above if needed, decrypts the actual packet using the primary key $K_p$ or the derived key $K_d$ and then encrypts the data using the IDE key to be transmitted over the PCIe link. In step 466, the PCIe module 304 receives the encrypted packet from the NIC 302 and decrypts the packet using the IDE key and provides the decrypted packet to the enhanced memory controller 308, which, in turn, encrypts the packet using the appropriate VM memory key and places the encrypted packet in the encrypted VM memory.

If the processor board 300' architecture is utilized, steps 450 and 452 are performed by the TSM 326 rather than having the VM perform those operations with the VF.

FIGS. 4A1 and 4B1 illustrate the NIC 302 performing various of the encryption setup operations, such as providing the primary key $K_p$. This simplifies operation of the local VM but adds complexity to the NIC 302. FIGS. 4A2 and 4B2 illustrate an example where the encryption setup operations are performed by the communication program or TDI driver in the VM, with the NIC 302' then performing primarily the data encryption operations. As the TDI driver will be specific to a given communication program or to multiple communication programs, the TDI driver is considered to be part of the communication program for the purpose of encryption setup operations. The exact allocation of encryption setup operations between the communication program and the TDI driver is a design choice. FIGS. 4A2 and 4B2 illustrate the operation of the processor board 300' and the NIC 302'. In the illustrated operation, data is transferred between the processor board 300' and the NIC 302' as memory mapped I/O (MMIO) operations encrypted over the PCIe link using IDE encryption, the TDI driver 325 or 341 cooperating with the TDI module 393. DOE and SPDM operations would be utilized if desired or with the processor board 300 and NIC 302. The local VM performing the encryption setup operations and the communication between the local VM and the NIC without the DOE and SPDM operations are independent but shown together for brevity. That is, the local VM can perform the encryption setup operations in the processor board 300 and NIC 302 combination, in which case DOE and SPDM operations are used by the local VM, or the local VM and the NIC can jointly perform the encryption setup operations in the processor board 300' and NIC 302' combination, in which case MMIO operations and encrypted data transfers over the PCIe link can be used. This independent nature is applicable in all of the examples described below. For brevity, only the steps that differ from FIGS. 4A1 and 4B1 are described.

It is understood that if the local VM is performing the encryption setup operations, that the NIC must be configured to cooperate with the local VM. It is further understood that if the local VM and the NIC are jointly performing the encryption setup operations, the local VM and the NIC must be configured to cooperate. In certain examples, each of the local VM and the NIC can be configured to operate both ways, the local VM performing encryption setup operations and the local VM and the NIC jointly performing encryption setup operations, for flexibility to operate with the local VM or the NIC operating only one way or to allow an administrator to configure each of the local VM and the NIC for cooperating desired operations.

For FIG. 4A2, in step 407, the local VM determines the primary key $K_p$, instead of receiving the primary key $K_p$ from the NIC. In step 411, the local VM provides the local primary key $K_p$ in addition to the remote VM primary key $K_p$ or derived key $K_d$ to the NIC.

For FIG. 4B2, in step 453, the local VM determines the primary key $K_p$ and the derived key $K_d$. In step 459, the local VM provides the local primary key $K_p$ in addition to the remote VM primary key $K_p$ or derived key $K_d$ to the NIC.

Figure 5:
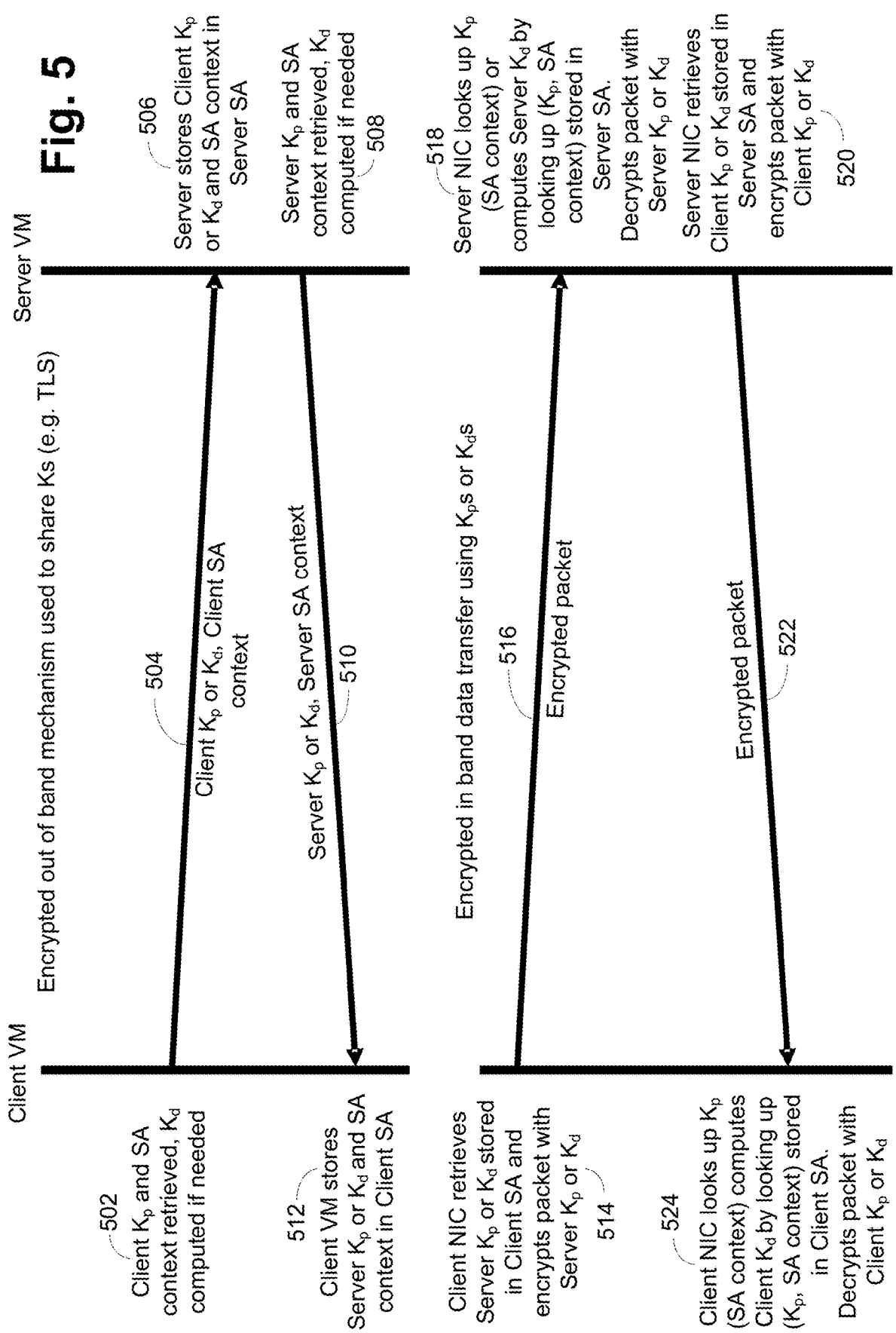
FIG. 5 is an example ladder diagram illustrating transfer of encryption keys between the client and the server VMs and encrypted data transfer between the client and server VMs according to the present invention.

FIG. 5 are ladder diagrams illustrating how the primary or derived keys are transferred between the client and server VMs and how data is encrypted between the local and remote VMs. The keys are exchanged out of band using a conventional mechanism to securely share encrypted data, such as TLS. In step 502, the client primary key $K_p$ and security association (SA) context are retrieved and the derived key $K_d$ to be used with the remote VM is computed if needed. The SA context is information that can be used by a receiving NIC in a lookup table to determine the encryption key associated with the packet source. In step 504, the client VM primary key $K_p$ or derived key $K_d$ and the client SA context are provided to the server VM. In step 506, the server VM stores the client primary key $K_p$ or derived key $K_d$ and the client SA context in a lookup table. In step 508, the server primary key $K_p$ and security association (SA) context are retrieved and the derived key $K_d$ to be used with the client VM is computed if needed. In step 510, the server VM primary key $K_p$ or derived key $K_d$ and the server SA context are provided to the client VM. In step 512, the client VM stores the server VM primary key $K_p$ or derived key $K_d$ and the server SA context.

Packets are transmitted between the client VM and the server VM in encrypted form using the encryption keys that were shared in steps 502-512. In step 514, the client NIC retrieves the server primary key $K_p$ or derived key $K_d$ stored in the SA table and the packet is encrypted with this server VM key. In step 516 the encrypted packet is transmitted to the server VM. In step 518, the NIC in the server uses identifying information in the packet, such as the SA context, to perform a lookup to retrieve the server primary key $K_p$ and the derived key $K_d$ is computed if needed. The NIC in the server then decrypts the packet with the server primary key $K_p$ or derived key $K_d$, whichever is appropriate. The packet is ultimately stored in the server VM memory. In step 520, the server NIC retrieves the client primary key $K_p$ or derived key $K_d$ and the NIC encrypts the packet. In step 522, the encrypted packet is provided to the client VM. In step 524, the NIC in the client uses identifying information in the packet, such as the SA context, to perform a lookup to retrieve the client primary key $K_p$ and the derived key $K_d$ is computed if needed. The NIC in the client then decrypts the packet with the client primary key $K_p$ or derived key $K_d$, whichever is appropriate. The packet is ultimately stored in the client VM memory.

The above description has been for a generic example of encryption offloading to the NIC. That generic description serves as a baseline to be adapted for each protocol for which packets are to be encrypted. Each protocol has slightly different mechanics that may add additional steps or slightly modify specific steps described above.

FIG. 6A1 is the first detailed example of a particular protocol, in this case RoCEv2, remote direct memory access (RDMA) over Converged Ethernet v2, in a tenant owned bare metal server. In step 602 this is a tenant owned bare-metal server example of secure RMDA offloading. Steps 602 and 604 are the same as steps 402 and 404. In step 606, the local VM resident on the host receives a vHCA primary key $K_p$ from the NIC 302 using CMA DOE and Secure SPDM. The primary key is referred to as a vHCA key as the RDMA protocol was originally developed for InfiniBand and HCAs are the I/O cards in InfiniBand. The key is a primary or master key because it is used to derive keys for each queue pair (QP) connection. In step 608, the local VM creates a QP for the RDMA exchanges and obtains a QP number from the NIC 302 to develop the derived keys $K_d$ and develops a derived key $K_d$ for this QP. In one example, the primary key $K_p$ is combined with the QP number to develop the derived key $K_d$. In step 610, the local and remote VMs use RDMA connection establishment to connect the local and remote queue pairs, exchange the UDP ports and to exchange the QP derived keys $K_d$. In step 612, the VM modifies the local QP context to include the remote QP number and derived key $K_d$ and a local nonce.

In step 614, the local VM develops a packet to transmit. The packet includes the overlay headers, the BTH and the RDMA payload. In step 616, the local VM provides the packet to the PF over PCIe using the IDE key to encrypt. In step 618, the NIC 302 decrypts the packet using the IDE key. The CSP SDN domain 250 utilizes the overlay header and providing PF or VF to determine the underlay header and VNI. The full packet with underlay header, overlay header, BTH and RDMA payload is encrypted as described below using the remote QP derived key $K_d$ and transmitted to the remote QP.

In step 620, the NIC 302 receives an encrypted packet from the remote QP, uses the packet QP number to determine the primary key $K_p$ and then to develop the QP derived key $K_d$ from the primary key $K_p$, decrypts the packet using the QP derived key $K_d$ and encrypts the packet using the IDE key and transmits the packet over the PCIe link. In step 622, the PCIe module 304 receives the encrypted packet from the NIC 302 and decrypts the packet using the IDE key and provides the decrypted packet to the enhanced memory controller 308, which, in turn, encrypts of the packet using the appropriate VM memory key and places the encrypted packet in the encrypted VM memory.

Therefore, the encryption keys have been securely provided to the NIC 302 and the data has been securely transferred from secure VM memory to the NIC 302, which holds the data securely and transmits the data in an encrypted format, so that the CSP cannot access either the encryption keys or unencrypted data.

If the processor board 300' architecture is utilized, steps 602 and 604 are performed by the TSM 326 rather than having the host perform those operations with the PF.

FIG. 6B1 is the detailed example for offloaded encryption of RDMA in a tenant VM over cloud service provider hypervisor configuration. Steps 650-678 are similar to steps 602-622 except that the local VM communicates with a VF instead of the PF. Further, if the processor board 300' architecture is utilized, steps 650 and 652 are performed by the TSM 326 rather than having the host perform those operations with the PF.

Figure 6C:
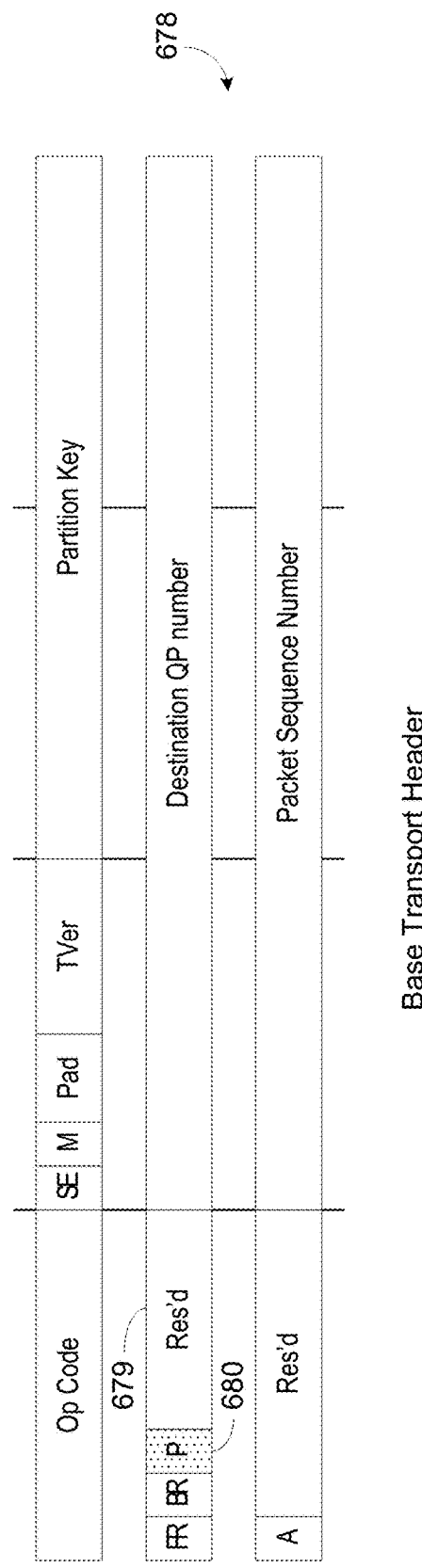
FIG. 6C is an example illustration of a base transport header used in RDMA communications according to the present invention.

FIG. 6C illustrates an example base transport RDMA header of the Ethernet packet according to the present invention. Because in RoCEv2 protocol the primary keys can be refreshed and the derived key $K_d$ exchange happens asynchronously with the actual transfer of encrypted packets, it is necessary to indicate to the remote device when to start decrypting the packets using the new key. A reserved bit has been taken from the second word reserved locations 679 and turned into a phase bit 680. The phase bit changes state the first time a new key has been used to encrypt the packet and remains in that state until the next key change. Therefore, the bit will stay at a given state for all packets on a single key and in the alternate state after the new key is used until the next new key is used.

Figure 6D:
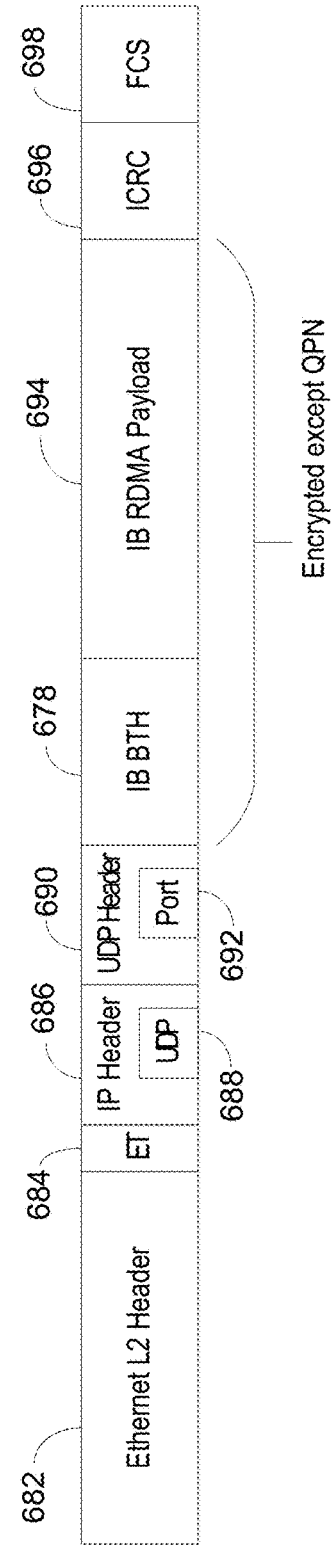
FIG. 6D is an example diagram of an RDMA packet according to the present invention.

FIG. 6D illustrates a full overlay RoCEv2 packet according to the present invention. The RoCEv2 packet includes a conventional Ethernet header 682, a Ethertype field 684 indicating IP, an IP header 686 including a UDP indication 688, a UDP header 690 including a destination port number 692, the UDP destination port number set to 4791, the encrypted base transport header 678 except for the QPN, the encrypted RDMA payload 694, an end-to-end CRC value (ICRC) 696 and the Ethernet Frame Checksum (FCS) 698.

FIGS. 6A2 and 6B2 are examples where the VM performs the encryption setup operations and the NIC is primarily for data encryption operations in the processor board 300' and NIC 302' combination. In step 609 the local VM creates the $K_p$ key, the queue pair, the QP number and develops the $K_d$ key. In step 613, the local VM provides the NIC with the local $K_p$ key, local QP number, local QP context with remote QP number and QP $K_d$ and local nonce. In step 657, the local VM creates the $K_p$ key, the queue pair, the QP number and develops the $K_d$ key. In step 661, the local VM provides the NIC with the local $K_p$ key, local QP number, local QP context with remote QP number and QP $K_d$ and local nonce.

Figure 7A:
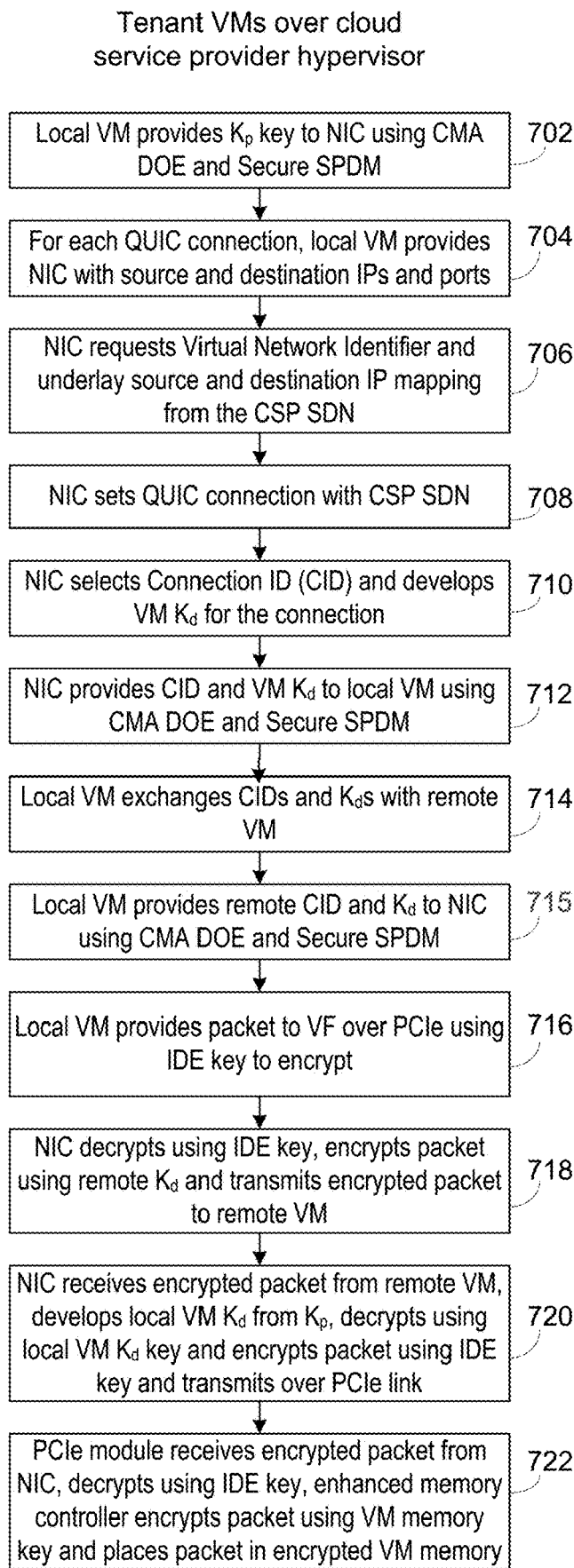
FIGS. 7A and 7B are example flowcharts of operations in a shared server environment for a virtual machine to offload encryption keys and encryption processing to a NIC in a QUIC encryption protocol but maintain privacy of the keys according to the present invention.

A newer communication protocol for transporting encrypted data is called QUIC. QUIC operation is described in RFC 9000 and RFC 9001 from the Internet Engineering Task Force (IETF). FIG. 7A illustrates the tenant VMs over cloud service hypervisor offloaded implementation of QUIC deployed using derived keys and the NIC for hardware encryption acceleration as performed by examples according to the present invention. QUIC connections start with a TLS phase to determine initial keys. This operation has been omitted for clarity and is assumed to be successful. For further clarity, the initial steps of determining NIC certification and IDE key exchange, as done in steps 450 and 452, have been omitted, but it is understood that those steps will have been performed before step 702 and the encryption key exchanges in the remaining examples.

In step 702, the local VM provides the primary key $K_p$ to the NIC 302 using CMA DOE and Secure SPDM. In step 704, which is repeated for each QUIC connection, the local VM provides the NIC 302 with the source and destination IP addresses and UDP ports for the local and remote VMs that were determined out-of-band during setup of the QUIC connection. In step 706, the NIC 302 requests the VNI and underlay source and destination IP mapping from the CSP SDN domain 250. This information is known by the CSP SDN domain 250 as that is the information used to develop the header tables for developing the outer header. In step 708, the QUIC connection is set with the CSP SDN. In step 710, the NIC 302 selects a connection ID (CID) to be used in the QUIC connection and develops the derived key $K_d$ for the particular connection with that connection ID by using the connection ID value and the primary key $K_p$. In some examples, the source and destination ports are also used in developing the derived key $K_d$. In step 712, the NIC 302 provides the CID and derived key $K_d$ to the local VM using CMA DOE and Secure SPDM.

In step 714, the local VM exchanges CIDs and derived keys $K_d$ with the remote VM using the TLS handshake defined in the QUIC specifications. The remote VM will have performed steps 702 to 712 with its NIC and will be at the point of having its own derived key $K_d$ to exchange. In step 715, the local VM provides the remote CID and $K_d$ to NIC using CMA DOE and Secure SPDM.

In step 716, the local VM provides the packet to the VF over PCIe using the IDE key for encryption. The packet includes the overlay header, CID, remaining QUIC header portions and the payload. In step 718, the NIC 302 decrypts the packet from the PCIe link using the IDE key. The CSP SDN domain 250 utilizes the overlay header and providing PF or VF to determine the underlay header and VNI. The full packet with underlay header, overlay header, CID, remaining QUIC header portions and the payload, are provided for encryption, using the remote VM derived key $K_d$, though only the remaining QUIC header portions and payload are encrypted, and transmitted to the remote VM.

In step 720, the NIC 302 receives an encrypted packet from the remote VM and develops the local VM derived key $K_d$ using the primary key $K_p$ and the CID contained in the packet, decrypts the packet using the local VM derived key $K_d$ and in encrypts the packet using the IDE key for transmission over the PCIe link. In step 722, the PCIe module 304 receives the encrypted packet from the NIC 302 and decrypts the packet using the IDE key and provides the decrypted packet to the enhanced memory controller 308, which, in turn, encrypts of the packet using the appropriate VM memory key and places the encrypted packet in the encrypted VM memory.

Figure 7B:
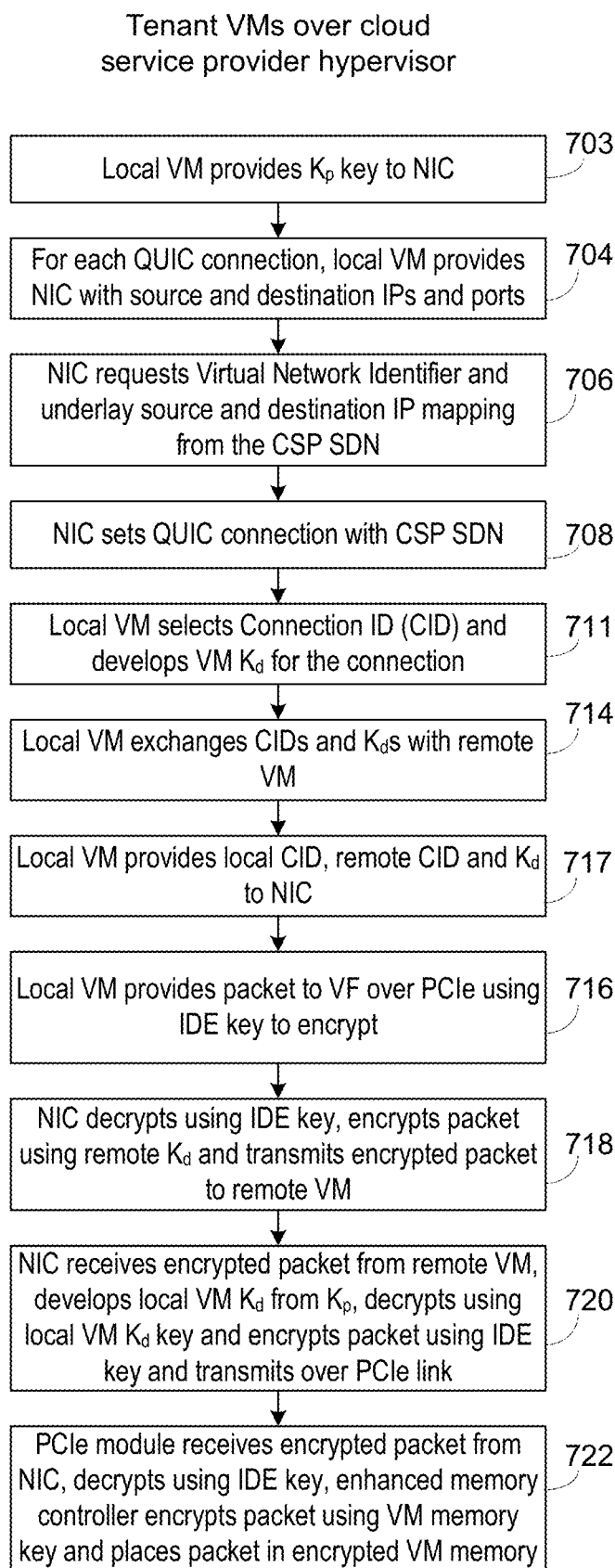

FIG. 7B illustrates operation where the local VM performs the encryption setup operations and the processer board 300' and NIC 302' combination is used. In step 703, the local VM provides the $K_p$ key to the NIC by providing TDI management commands over the PCIe link. In step 711, the local VM selects the CID and develops the $K_d$ key for the connection. In step 717, the local VM provides the local CID and the $K_d$ key to the NIC. With this, the NIC has all of the information needed to encrypt packets on egress and decrypt packets on ingress.

Therefore, the QUIC protocol has been offloaded to the NIC 302, with the encryption keys being securely provided to the NIC 302 and the data securely transferred from the VM secured to the NIC 302, which then encrypts the data for transmission to a remote endpoint or VM.

Figure 10A:
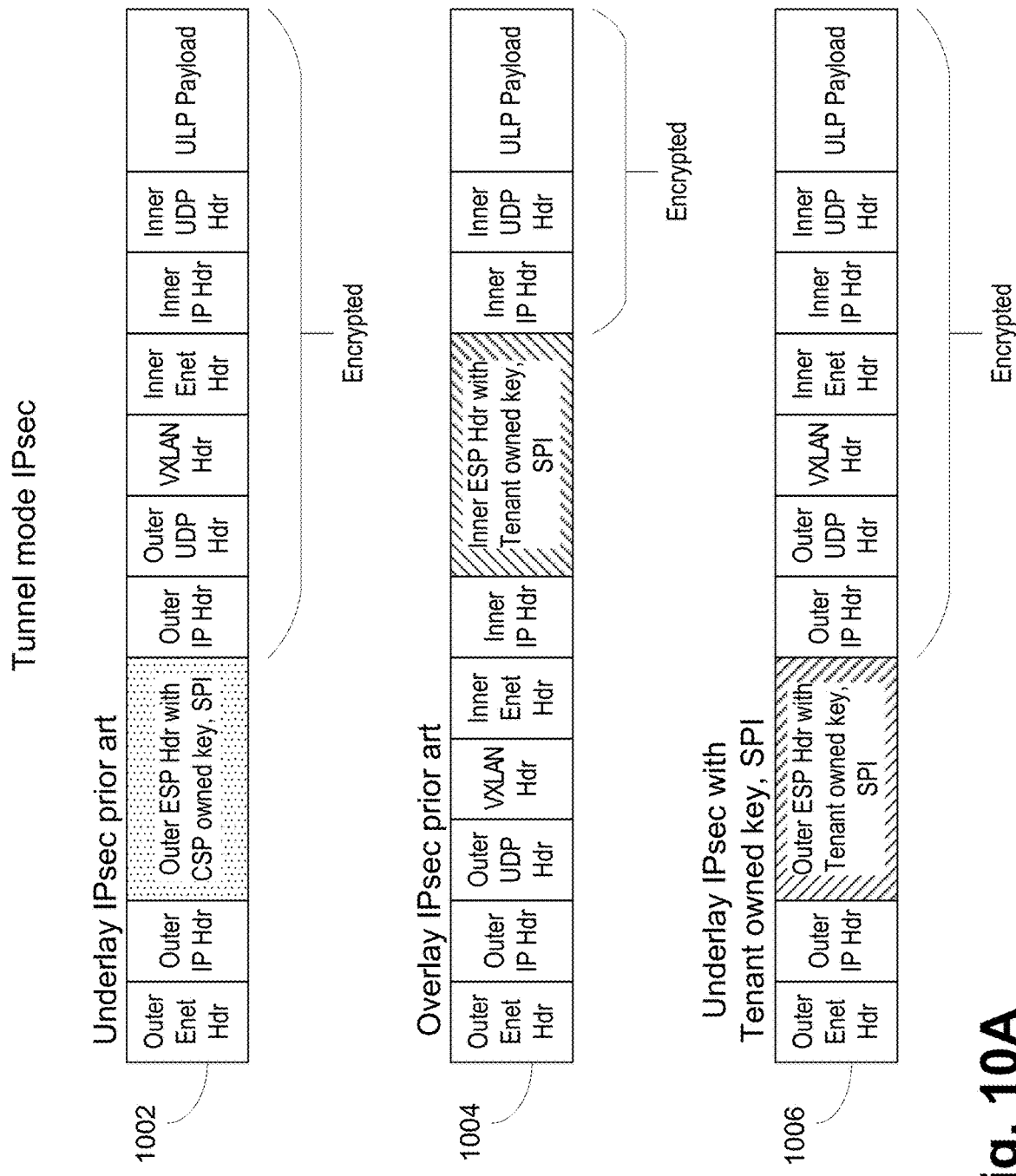
FIG. 10A is an illustration of tunnel mode IPsec packets according to the prior art and according to the present invention.
Figure 10B:
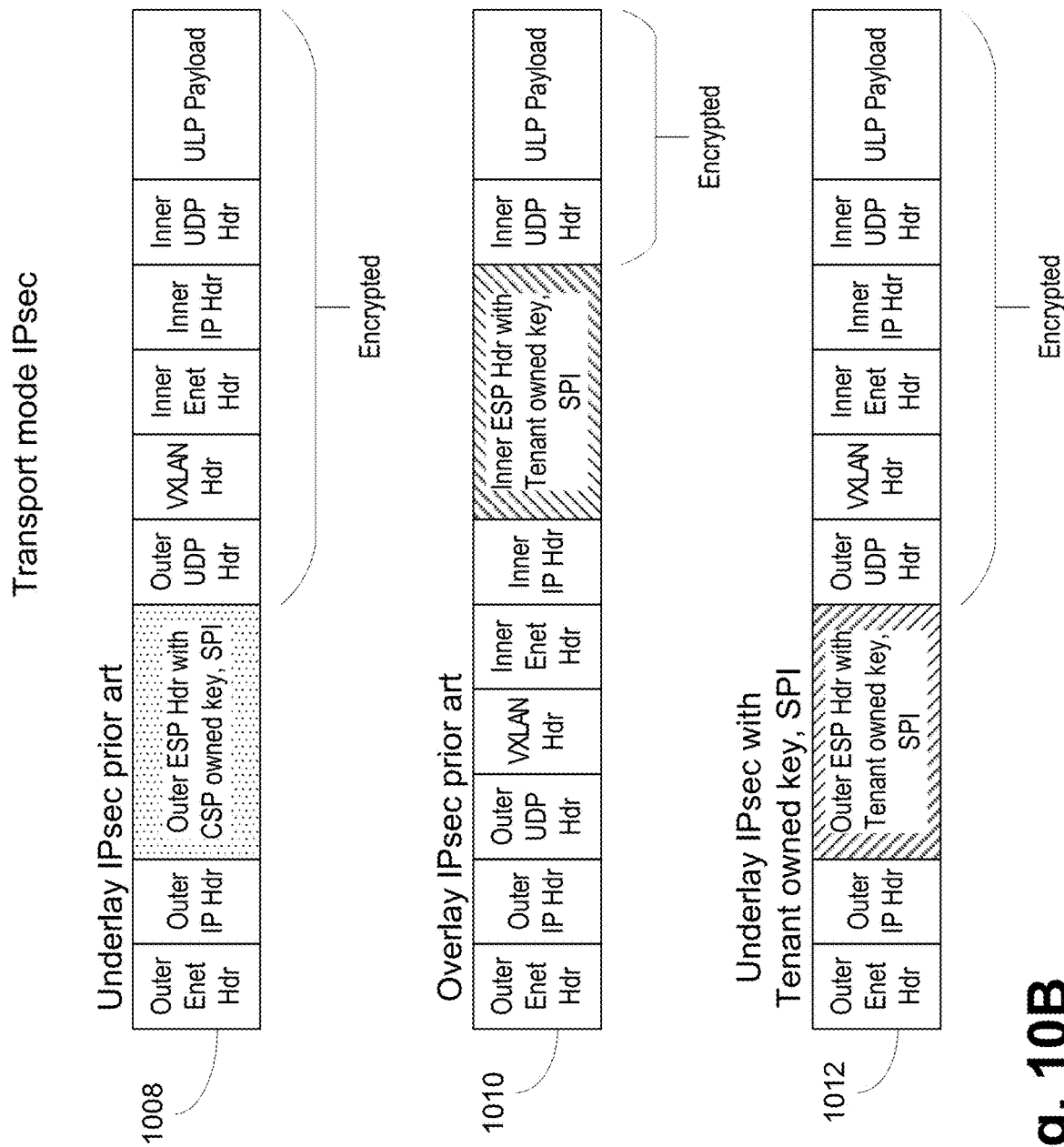
FIG. 10B is an illustration of transport mode IPsec packets according to the prior art and according to the present invention.

Internet Protocol Security (IPsec) is a widely used encryption protocol for IP traffic. There are a number of problems with IPsec in the cloud environment. IPsec can be used as an overlay or an underlay. For overlay, the tenant VM will own the keys and the local and remote nonce but must perform the encryption in software and has key scaling problems. A single local VM connecting to m total remote VMs and communicating all-to-all using IPsec on the overlay will require 2*m keys, one for Tx and one for Rx per remote VM. A physical server hosting n such local VMs will require n*2*m total keys. So e.g. for n=200, m=500, the total keys are 100K Tx keys+100K Rx keys for 200K total keys on 100K unique IPsec tunnels. For underlay, the CSP implements and owns the keys so that all overlay headers are encrypted, has a simple M scaling of keys, or even simpler 1 key for all servers and can be offloaded to encryption hardware in a NIC, but again the problem is primarily that the CSP owns the keys. Using scalable keys, a single local VM connecting to m total remote VMs and communicating all-to-all using IPsec on the underlay will require m $K_d$ (Tx) keys plus one $K_p$ (Rx) key. A physical server hosting n such local VMs will require n*(m+1) total keys. So e.g. for n=200, m=500, the total keys are 100K $K_d$ (Tx) keys+200 $K_p$ (Rx) keys for 100.2K total keys on 100K unique IPsec tunnels where each remote VM is on a unique physical node. Examples of IPsec according to the present invention provide for tenant control of the keys in an underlay implementation. The examples, both prior art and those according to the present invention, are illustrated in FIGS. 10A and 10B. FIG. 10A illustrates tunnel mode, while FIG. 10B illustrates transport mode.

FIG. 10A includes three packets, underlay IPsec prior art 1002, overlay IPsec prior art 1004 and underlay IPsec with tenant owned key and SPI 1006 according to the present invention. FIG. 10B includes three packets, underlay IPsec prior art 1008, overlay IPsec prior art 1010 and underlay IPsec with tenant owned key and SPI 1012 according to the present invention. The packets illustrate a further advantage of underlay versus overlay, namely that all of the overlay or inner Ethernet and IP headers are encrypted, making determination of the packet source and destination much more difficult.

There are two main examples according to the present invention, a first using simple key storage for each IPsec connection, which is useful for a limited number of connections, and a second using scalable or derived keys when there will be a very large number of keys. Referring to FIG. 8A1, a simple key embodiment for the processor board 300, the NIC 302 creates the security parameter index (SPI) and sequence numbers and handles anti-replay checking, while the VM creates the key, the key lifetime, the rekeying window, the anti-replay check window size, the nonce and the shared secret Diffie Hellman key. The CSP can read the key lifetime, rekeying window, packet statistics and anti-replay window size while the VM can read the SPI and sequence numbers. In the scalable key example, the NIC 302 further develops the derived keys $K_d$. The VM is able to read the derived keys $K_d$.

In FIG. 8A2, the local VM is handling the encryption setup operations, the local VM creates the SPI in addition to the operations of FIG. 8A1.

Referring to FIG. 8B1, the phase 2 IKE (Internet Key Exchange) ladder for a single key VM-controlled or owned underlay variation is illustrated. It is noted that the certification of the NIC 302 and secure transfer of IDE keys as described above have also been omitted here for clarity. IKE is the protocol used by IPsec to develop the security association (SA), which includes the encryption keys, for each connection or tunnel. IKE phase 1 is performed according to conventional IKE phase 1 operations between the two VMs and is omitted for clarity. In step 802, the initiator VM requests an SA from the initiator NIC 302 for the desired source and destination IP addresses using CMA DOE and Secure SPDM. In step 804, the initiator NIC 302 requests the VNI and underlay or outer source and destination IP mapping for the overlay or inner source and destination IP of the initiator and responder from the CSP SDN domain 250. This information is known by the CSP SDN domain 250 as that is the information used to develop the header tables for developing the outer header. The NIC 302 sets the IPsec session with the CSP SDN domain 250. In step 806, the initiator NIC 302 creates the SA, including selecting a Security Parameter Index (SPI) for the VM, and passes the SA to the VM through CMA DOE and Secure SPDM. At the same time, in step 81o the responder endpoint VM similarly requests an SA from the responder NIC 302 for the source and destination IP address. In step 812, the responder NIC 302 requests the VNI and underlay source and destination IP mapping for the overlay source and destination IP of the initiator and responder from the CSP SDN domain 250 and sets the IPsec session with the CSP SDN domain 250. In step 814, the responder NIC 302 creates the SA, including selecting a Security Parameter Index (SPI), and provides the SA to the responder VM through CMA DOE and Secure SPDM. At this time both VM's have obtained their respective SAs. In step 820, the initiator VM sends a CREATE_CHILD_SA request to the responder VM. In step 822 the responder VM processes the initiator CREATE_CHILD_SA request and responds with a CREATE_CHILD_SA response. With this exchange, the initiator and responder are able to develop the necessary encryption keys for the IPsec session according to normal IPsec operations. In step 824, the initiator VM calculates KEYMAT from the results of the CREATE_CHILD_SA exchange and passes the completed SA and KEYMAT values and responder SA, which includes the responder SPI, to the initiator NIC 302 using DOE. Similarly, the responder VM in step 826 calculates KEYMAT from the results of the CREATE_CHILD_SA exchange and passes the KEYMAT value and initiator SA, which includes the initiator SPI, to the responder NIC 302 using CMA DOE and Secure SPDM. In step 828, the initiator NIC 302 checks the received SA to confirm that the SA is associated with the initiator VM based on the particular DOE mailbox that has been utilized in the CMA DOE transfers. The initiator NIC 302 configures the active remote client encryption keys $K_p$s and $K_d$s table 356 with encryption keys from the KEYMAT value acting as $K_p$s to be used in ingress and egress operations of the underlay transmissions and receptions. The responder NIC 302 in step 830 performs a similar function at the responder end. At the end of the IKE phase 2, each NIC has the necessary keys for encryption and decryption and encrypted IPsec data transmission can begin.

FIG. 8B2 illustrates operation where the local VM performs the encryption setup operations and the processer board 300' and NIC 302' combination is used. Again, only differing operations are described. In step 803, the local VM provides the source/destination IP to the NIC and requests the IPsec transforms and additional attributes for the SA from the NIC. In step 807, the local VM creates the SA, including creating the SPI value. In step 811, the local VM provides the source/destination IP to the NIC and requests the IPsec transforms and additional attributes for SA from the NIC. Step 825 is the same as step 824, except that DOE and SPDM operations are not used. Similarly, step 827 is the same as step 826, except that DOE and SPDM operations are not used. Steps 829 and 831 are similar to steps 828 and 830, respectively, except that the specific manner of the NIC confirming the SA is associated with the VM is not necessarily based on the DOE mailbox, as the DOE mailbox may not be used by the VM.

Figure 8C:
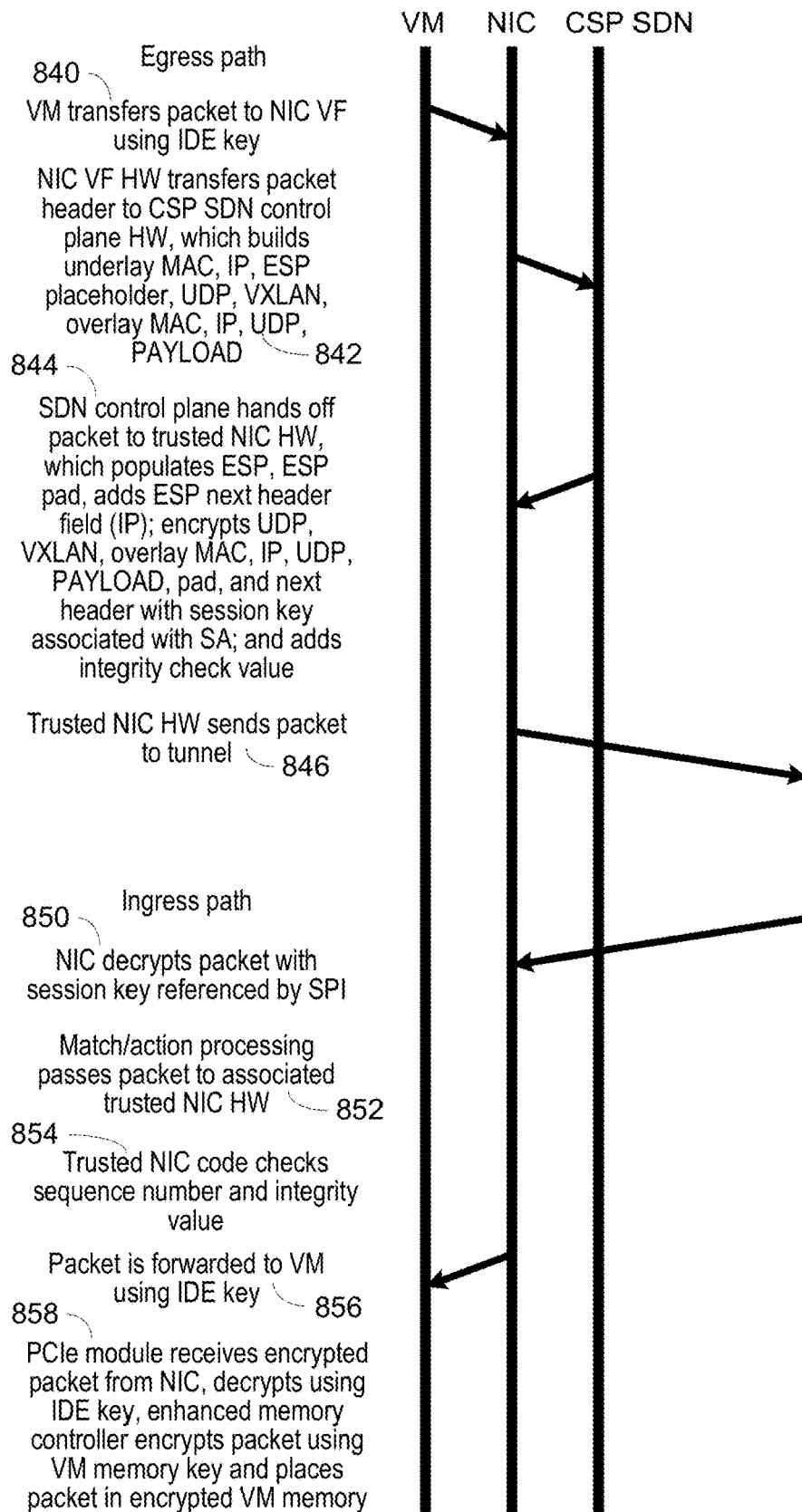
FIG. 8C is an example ladder diagram of ingress and egress operations for the tenant owned underlay IPsec environment of FIG. 8B according to the present invention.

FIG. 8C illustrates egress and ingress operations after the completion of IKE phase 2 as illustrated in FIG. 8B for tunnel mode operation. Transport mode operation is similar. The egress path commences in step 840 where the initiator VM transfers a packet to the initiator NIC 302 VF using the IDE key. In step 842, the initiator NIC 302 VF hardware transfers the packet header to the CSP SDN domain 250 and header hardware 255, which performs a table lookup based on the VXLAN VNI associated with the VF. The VNI and overlay or inner destination IP address are then used to look up the underlay destination IP address. The header hardware 255 then builds a packet containing an underlay or outer MAC header, an underlay IP header, an ESP header placeholder, an underlay UDP header, a VXLAN header, an overlay or inner MAC header, an overlay IP header, an overlay UDP header and the payload. If the overlay destination IP address is not present in the header tables 262 when the header hardware 255 performs the lookup, then the overlay Ethernet header, overlay IP header, overlay transport header and VXLAN headers are transferred to the CSP SDN module 260 to create the needed entry in the header tables 262. Reference to FIG. 10A, packet 1006 is helpful to put the various headers into the context of the packet. Note, VXLAN is used as an example virtual network encapsulation protocol and use of VXLAN or similar is considered part of the underlay header and is presumed in each underlay header. Geneve or NVGRE are other virtual network overlays that can be used instead. In step 844, the CSP SDN domain 250 header hardware 255 hands off the developed packet to the trusted initiator NIC 302 hardware, such as the egress packet building hardware 359 and Ethernet module 366, which then populates the ESP header; adds any ESP pad; adds the ESP next header field; encrypts the underlay UDP header, VXLAN header, overlay MAC header, overlay IP header, overlay UDP header, payload, padding and ESP next header with the encryption key associated with the SA for use with the responder and adds an integrity check value. In some examples, the CSP SDN domain 250 header hardware 255 does not include an ESP header placeholder. Instead, the trusted initiator NIC 302 hardware builds and populates the ESP header. In step 846, the trusted initiator NIC 302 hardware, particularly the Ethernet module 366, sends the packet through the IPsec tunnel to the responder.

The ingress path commences at step 850, where the initiator NIC 302 decrypts the received packet using the session key in the SA referenced by the SPI in the received packet. In step 852, overlay match/action processing of the initiator NIC 302 passes the packet to the trusted initiator NIC 302 hardware, such as done by the ingress packet processing and routing hardware 357. The NIC's overlay match/action unit is responsible for associating a VXLAN/Geneve VNI or NVGRE VSID to the PCIe function (VF or PF) associated with that VNI; and then using the destination address to determine which virtual NIC is associated with the incoming packet. In step 854, trusted initiator NIC 302 firmware checks the sequence number and integrity value of the packet. In this example, the ingress packet processing and routing hardware 357 further includes operation of firmware, such as function 1 396 or function 2 398, on the microprocessor 386 to perform the sequence number and packet integrity checks. In step 856, the packet is forwarded to the initiator VM using the IDE encryption key. In step 858, the PCIe module 304 decrypts the packet using the IDE key, and the IOMMU has the enhanced memory controller 308 encrypt the packet using the VM memory key and place the encrypted packet in the encrypted VM memory.

As in the previous ROCEv2 example, in this IPsec underlay example the packet is never in unencrypted form when it is accessible by the CSP and the encryption keys are maintained in the NIC 302, again not accessible by the CSP.

FIG. 8D1 illustrates an IKE phase 2 equivalent utilized when derived keys are used. A slightly different phase two must be utilized with derived keys as normal IKE phase 2 does not allow transfer of the derived keys, only single keys developed using normal IKE processes. In step 860, the initiator VM passes the initiator primary key $K_{pi}$ to the initiator NIC 302 through CMA DOE using Secure SPDM. In step 862, the initiator VM requests an SA from the initiator NIC 302 for the source and destination IP. In step 864, the initiator NIC 302 requests the VNI and underlay source and destination IP mapping for the overlay source and destination from the CSP SDN domain 250 and the initiator NIC 302 sets the IPsec session with the CSP SDN domain 250. In step 866, the initiator NIC 302 creates the initiator derived key $K_{di}$ using the initiator primary key $K_{pi}$, the SPI and the source and destination IP addresses. The initiator NIC will use the $K_{pi}$, the SPI and the source and destination IP addresses to create the $K_{di}$ used to decrypt ingress packets. In step 868, the initiator NIC 302 creates the SA, including selecting a Security Parameter Index (SPI), and passes the initiator derived key $K_{di}$ and the SA to the initiator VM using DOE.

Similarly, in step 870 the responder VM passes the responder primary key $K_{pr}$ to the responder NIC 302 through DOE. The responder VM in step 872 requests an SA from the responder NIC 302 for the source and destination IP addresses. In step 874, the responder NIC 302 requests the VNI and underlay source and destination IP mapping for overlay source and destination from the CSP SDN domain 250 and sets the IPsec session with the CSP SDN domain 250. In step 876, the responder NIC 302 develops the responder derived key $K_{dr}$ using the responder primary key $K_{pr}$, the SPI and the source and destination IPs. The responder NIC will use the $K_{pr}$, the SPI and the source and destination IP addresses to create the $K_{dr}$ used to decrypt ingress packets. In step 878, the responder NIC 302 passes the responder derived key $K_{dr}$ to the responder VM using CMA DOE.

In step 880, the initiator VM sends a CREATE_CHILD_SA message to the responder VM, with the message including the initiator SPI and the initiator derived key $K_{di}$. In step 882, the responder VM responds with a CREATE_CHILD_SA message that includes the responder SPI and responder derived key $K_{dr}$. At step 883 the initiator VM now has both SAs, with SPIs, and both $K_{di}$ and $K_{dr}$ and the initiator VM passes the responder SA with the SPI and the responder $K_{dr}$ to NIC. At this time, both the initiator VM and the responder VM have the SPI and derived keys of the other endpoint.

FIG. 8D2 illustrates operation where the local VM performs the encryption setup operations and the processer board 300' and NIC 302' combination is used. Again, only differing operations are described. In steps 863 and 873, the respective VM provides the source/destination IP addresses to the NIC and requests the IPsec transforms and additional attributes for the SA from NIC. In step 867, initiator VM creates the SPI, the initiator VM creates $K_{di}$=f($K_{pi}$, SPI, source/destination IPs), and the initiator VM creates the SA. In step 877, the responder VM creates the SPI, the responder VM creates $K_{dr}$=f($K_{pr}$, SPI, source/destination IPs), and the responder VM creates the SA. In step 881, the initiator VM passes the initiator SA with the SPI and the responder SA with the SPI and the responder $K_{dr}$ to the NIC. In step 885, the responder VM passes the responder SA and the initiator SA with the initiator $K_{di}$ to the NIC. With that, each NIC has the necessary information for ingress and egress encryption operations.

Figure 8E:
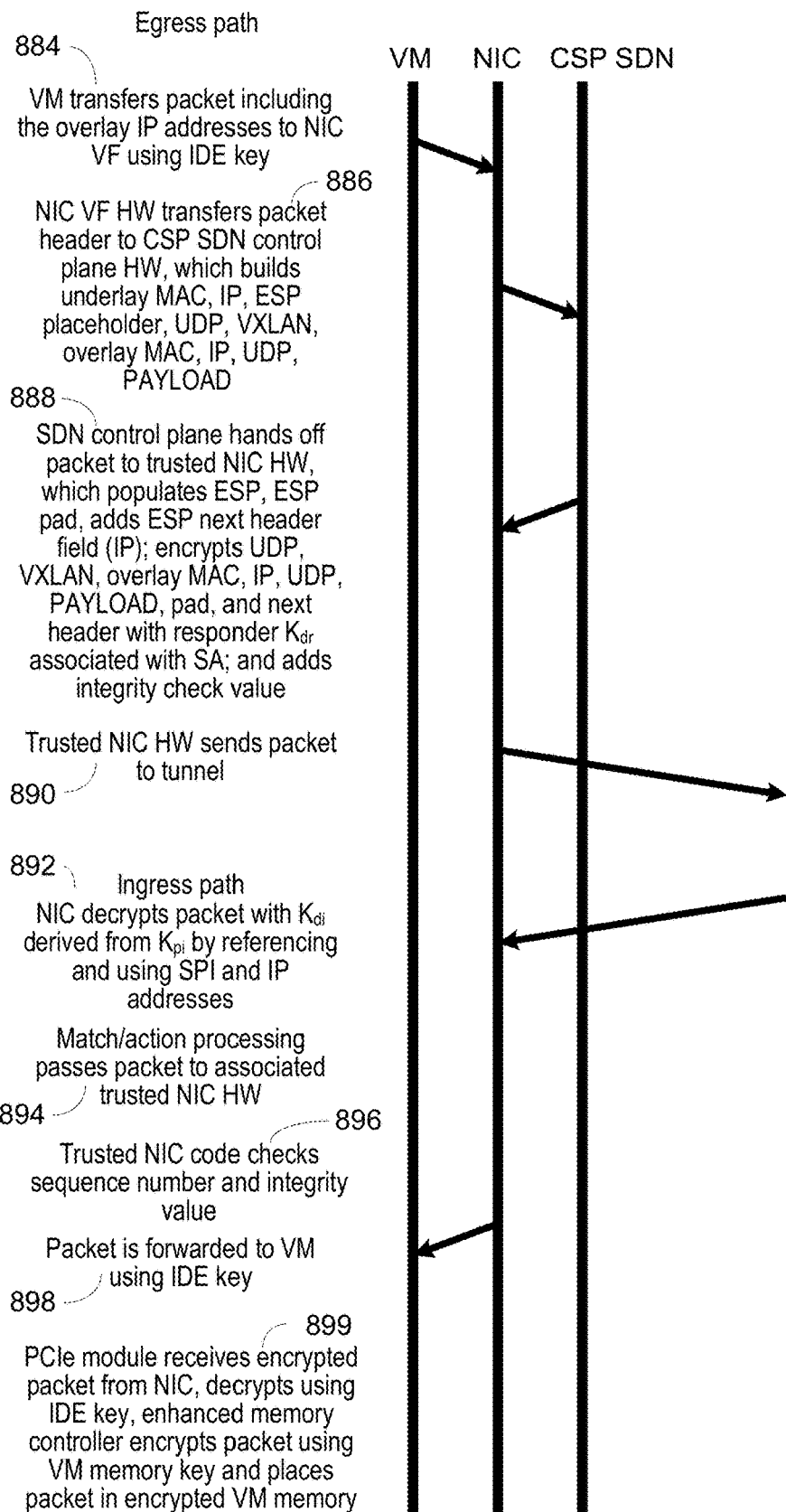
FIG. 8E is an example ladder diagram illustrating ingress and egress operations of tenant owned underlay IPsec environment using scalable keys of FIG. 8D according to the present invention.

In FIG. 8E, the egress and ingress operations with scalable keys are illustrated for tunnel mode operation. Transport mode operation is similar. In step 884, in egress operation, the sending VM, here described as the initiator VM, transfers the packet including the overlay IP addresses to the initiator NIC 302 using the appropriate IDE key. In step 886, the initiator NIC 302 VF hardware transfers the packet header to the CSP SDN domain 250 and header hardware 255 performs a table lookup based on the VXLAN VNI associated with the VF. The VNI and overlay or inner destination IP address are then used to look up the underlay destination IP address. The header hardware 255 then build a packet containing an underlay MAC header, an underlay IP header, an ESP header placeholder, an underlay UDP header, a VXLAN header, an overlay MAC header, an overlay IP header, an overlay UDP header, and the payload as received from the initiator VM. If the overlay destination IP address is not present in the header tables 262 when the header hardware 255 performs the lookup, then the overlay Ethernet header, overlay IP header, overlay transport header and VXLAN headers are transferred to the CSP SDN module 260 to create the needed entry in the header tables 262. In step 888, the CSP SDN domain 250 header hardware 255 hands the packet back to trusted initiator NIC 302 hardware, which then populates the ESP header and ESP pads; adds the ESP next header field; encrypts the underlay UDP header, VXLAN header, overlay MAC header, overlay IP header, overlay UDP header, payload and padding and next header with the responder derived key $K_{dr}$ associated with the responder SA handle that was passed to the NIC 302 by the sending VM and adds an integrity check value. In step 890, the trusted NIC hardware, particularly the Ethernet module 366, sends the packet to the tunnel.

For the ingress path, in step 892 the receiving NIC 302, here described as the initiator NIC 302, decrypts the packet with the derived key developed by utilizing the primary key, determined by reference using the received SPI value in a lookup table, and the SPI and IP addresses. In step 894, match/action processing passes the packet to the associated trusted NIC 302 hardware. In step 896, the trusted NIC firmware confirms the sequence number and integrity value and in step 898 the packet is forwarded to the initiator VM using the desired IDE key. In step 899, PCIe module 304 decrypts the packet using the IDE key, and the IOMMU 318 has the enhanced memory controller 308 encrypt the packet using the VM memory key and place the encrypted packet in the encrypted VM memory.

This description has primarily used VXLAN as the exemplary network virtualization technology and VNI as the exemplary identifier. Other network virtualization technologies include NVGRE, which uses a virtual subnet ID (VSID) as the identifier, and Geneve, which also uses VNI terminology. The packet formats of each network virtualization technology, VXLAN, NVGRE and Geneve, are different, with different headers, but each includes some form of identifier. The use of VXLAN and VNI is exemplary for NVGRE and VSID and Geneve and VNI and any of the network virtualization technologies can be used, based on the exemplary VXLAN and VNI descriptions.

This illustrates that IPsec operation can be securely offloaded to the NIC 302, with the encryption keys and data secure from the CSP or other parties at all times.

Figure 9B:
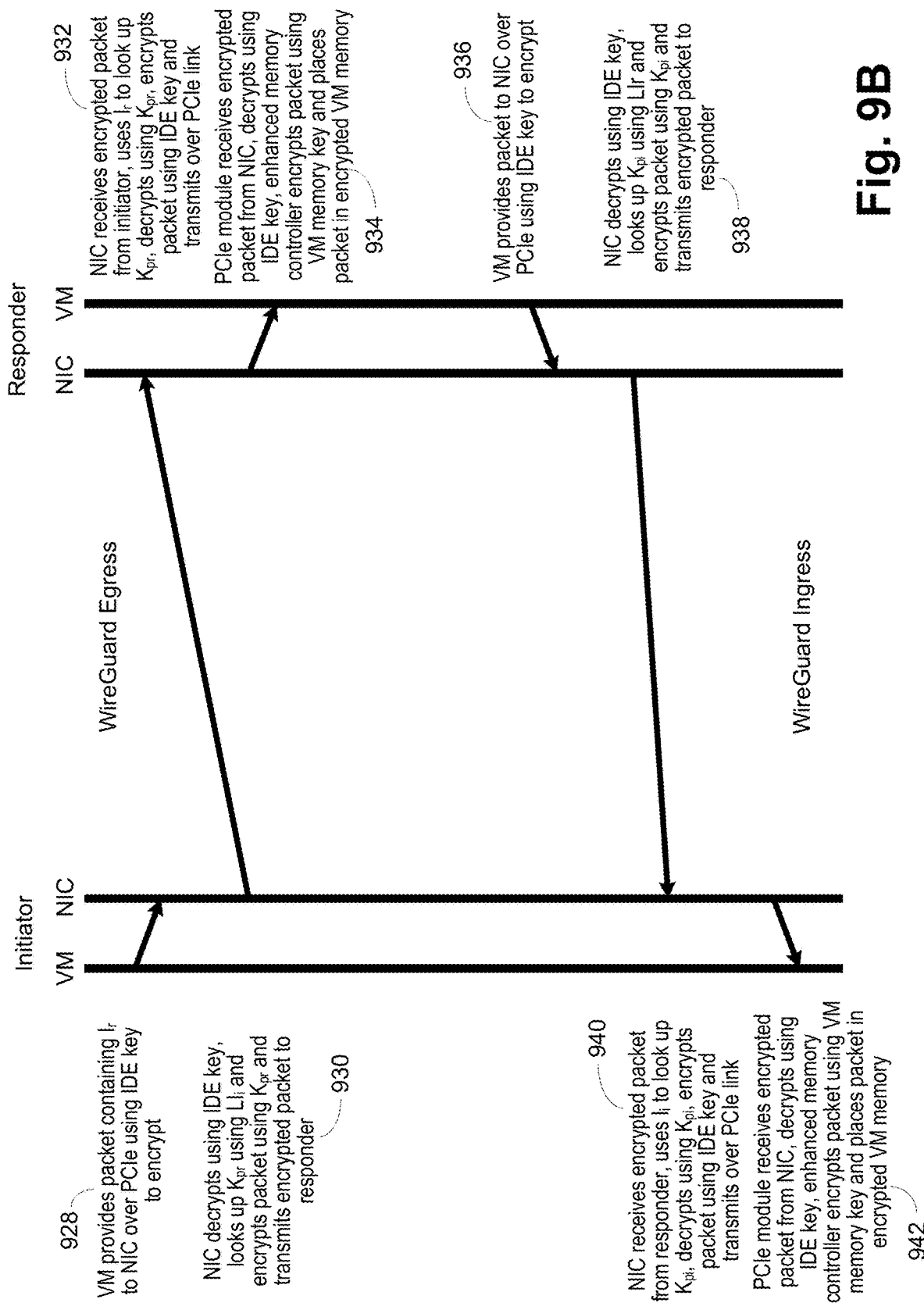
FIG. 9B is an example ladder diagram illustrating WireGuard ingress and egress operations for the offloaded WireGuard operations of FIG. 9A according to the present invention.
Figure 9D:
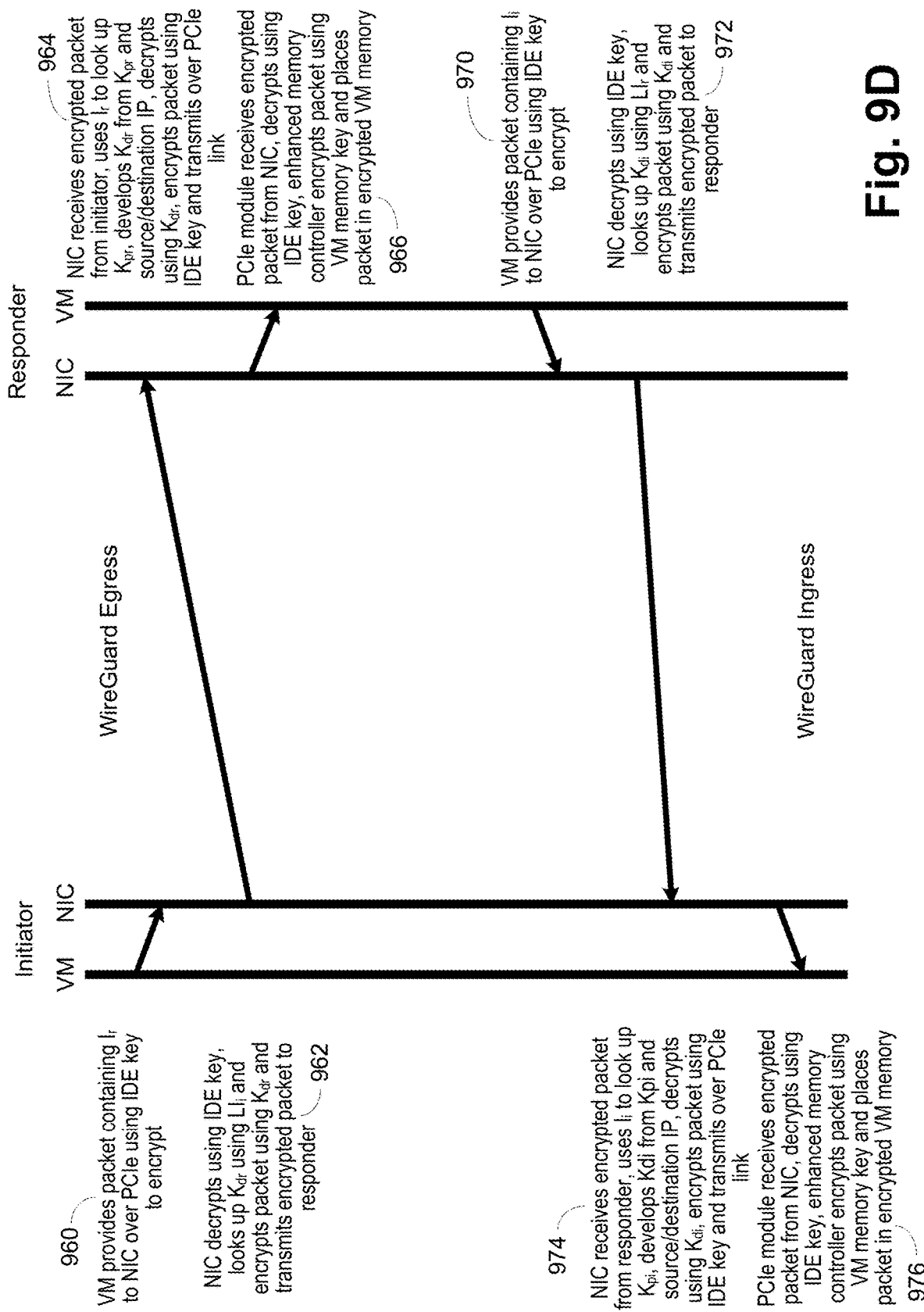
FIG. 9D is an example ladder diagram illustrating ingress and egress operations for offloaded WireGuard operations with scalable keys of FIG. 9C which maintains privacy of the keys according to the present invention.

WireGuard is a new encryption protocol utilized primarily in Linux implementations to date. Offloading of WireGuard encryption would improve performance greatly as currently Linux implementations perform WireGuard encryption in software. One characteristic of WireGuard is that encryption key exchange of the initiator primary key $K_{pi}$ and responder primary key $K_{pr}$ is performed out-of-band by an unspecified technique. For purposes of this description, it is assumed that the encryption key exchange has already occurred. It is also assumed that the NIC certification and IDE key exchanges have also occurred before FIGS. 9A and 9C. FIGS. 9A and 9B cover an example where single keys are exchanged between each end. FIGS. 9C and 9D cover an example where derived keys are provided by the initiator to the responder to limit the need for key storage in the NIC.

FIG. 9A1 illustrates one example of an offloaded initiation handshake according to the present invention. In step 908, the initiator VM passes the initiator primary key $K_{pi}$ to the initiator NIC 302 through CMA DOE using Secure SPDM messaging. In step 910, the initiator NIC 302 assigns an initiator index value $I_i$ and passes that value to the initiator VM through DOE. In step 912, the initiator VM builds and sends a WireGuard handshake initiation message including the initiator index value $I_i$. In step 914, the responder VM receives the handshake initiation message. In step 916, the responder VM passes the initiator primary key $K_{pi}$ and the responder primary key $K_{pr}$ to the responder NIC 302 through DOE. In step 918, the responder NIC 302 assigns the responder index value $I_r$ and places the initiator primary key $I_{pi}$ in a local index $LI_r$. In step 920, the responder NIC 302 passes the responder index value $I_r$ and the local index $LI_r$ to the responder VM through DOE. In step 922, the responder VM builds and sends a handshake response message, including the initiator index value $I_i$ and the responder index value $I_r$. In step 924, the initiator VM passes the responder primary key $K_{pr}$ and the responder index value $I_r$ to the initiator NIC 302 through DOE. In step 926, the initiator NIC 302 places the responder primary key $K_{pr}$ in a local index $LI_i$ and passes the local index $LI_i$ to the initiator VM through DOE.

With this simple handshake, the initiator and responder NICs 302 and initiator and responder VMs have passed all materials needed to exchange encrypted WireGuard data packets.

FIG. 9A2 illustrates operation where the local VM performs the encryption setup operations and the processer board 300' and NIC 302' combination is used. Again, only differing operations are described. In step 909, the initiator VM assigns the initiator index value $I_i$ and passes the initiator index value $I_i$ and the initiator primary key $K_{pi}$ to the NIC. Similarly, in step 917 the responder VM assigns the responder index value $I_r$ and passes the responder index value $I_r$, the responder primary key $K_{pr}$ and the initiator primary key $K_{pi}$ to the NIC. In step 919, the NIC places the initiator primary key $K_{pi}$ in the local index $LI_r$. In step 921, the NIC sends the local index $LI_r$ to the responder VM. In step 925, the initiator VM passes the responder index value $I_r$ and the responder primary key $K_{pr}$ to the NIC. In step 927, the NIC places the responder primary key $K_{pr}$ in the local index $I_i$ and passes the local index $I_i$ to the initiator VM. With that, each NIC contains all of the necessary information for egress and ingress encryption operations.

FIG. 9B illustrates WireGuard egress and ingress in an offloaded single key example. In step 928, egress operation begins and the initiator VM provides a packet containing the responder index value $I_r$, the counter value, the overlay headers, and the payload to the initiator NIC 302 over PCIe using the IDE key to encrypt the packet. In step 930, the initiator NIC 302 decrypts the packet using the IDE key. The CSP SDN domain 250 utilizes the overlay header and providing PF or VF to determine the underlay header and VNI. The full packet with underlay header, overlay header, responder index value $I_r$, counter value and the payload, are provided for encryption. The NIC 302 looks up the responder primary key $K_{pr}$ using the local index $LI_i$, encrypts the packet using the responder primary key $K_{pr}$ and then transmits the encrypted packet to the responder VM.

In step 932, the responder NIC 302 receives the encrypted packet from the initiator NIC 302, uses the responder index value $I_r$ to look up the responder primary key $K_{pr}$ used in the encryption and then decrypts the packet using this primary key $K_{pr}$. The packet is encrypted using the IDE key and transmitted over the PCIe link. In step 934, the PCIe module 304 receives the encrypted packet from the NIC 302 and decrypts the packet using the IDE key and provides the decrypted packet to the enhanced memory controller 308, which, in turn, encrypts of the packet using the appropriate VM memory key and places the encrypted packet in the encrypted VM memory.

In step 936, the ingress example, the responder VM provides the packet to the responder NIC 302 over PCIe using the IDE key to encrypt the packet. In step 938, the responder NIC 302 decrypts the packet using the IDE key. The CSP SDN domain 250 utilizes the overlay header and providing PF or VF to determine the underlay header and VNI. The full packet with underlay header, overlay header, responder index value $I_r$, counter value and the payload, are provided for encryption. The NIC 302 looks up the initiator primary key $K_{pi}$ using the responder local index $LI_r$, encrypts the packet using the initiator primary key $K_{pi}$ and transmits the encrypted packet to the initiator VM.

In step 940, the initiator NIC 302 receives the encrypted packet from the responder NIC 302, uses the initiator index value $I_i$ in the packet to lookup the initiator primary key $K_{pi}$ that was used, decrypts the packet using the initiator primary key $K_{pi}$, encrypts the packet using the IDE key and transmits the packet over the PCIe link. In step 942, the PCIe module 304 receives the encrypted packet from the NIC 302 and decrypts the packet using the IDE key and provides the decrypted packet to the enhanced memory controller 308, which, in turn, encrypts of the packet using the appropriate VM memory key and places the encrypted packet in the encrypted VM memory.

FIG. 9C1 illustrates the WireGuard handshake initiation handshake for a scalable key example. In step 939, the initiator VM passes the initiator primary key $K_{pi}$ to the initiator NIC 302 through CMA DOE using Secure SPDM messaging. In step 941, the initiator VM passes the source and destination IP to the initiator NIC 302 through DOE. In step 942, the initiator NIC 302 assigns initiator index $I_i$ and develops an initiator derived key $K_{di}$ from the initiator primary key $K_{pi}$ and the source and destination IP addresses. The initiator NIC 302 assigns an initiator local index $LI_i$ to store the destination and source IP addresses and passes the initiator index $I_i$, the initiator local index $LI_i$ and the initiator derived key $K_{di}$ to the initiator VM through DOE. In step 944, the initiator VM builds and sends a handshake initiation message, including the initiator index value $I_i$ and the initiator derived key $K_{di}$, which is the ephemeral value in the message, to the responder VM.

In step 946, the responder VM passes the responder primary key $K_{pr}$, the received initiator derived key $K_{di}$, the source and destination IP address and the initiator index value $I_i$ to the responder NIC 302 through DOE. In step 948, the responder NIC 302 calculates a derived responder key $K_{dr}$ from the responder primary key $K_{pr}$ and the source and destination IP addresses and assigns a responder index value $I_r$. The initiator derived key $K_{di}$ is stored in a responder local index $LI_r$ and the responder primary key $K_{pr}$ and responder index value $I_r$ are transferred to responder NIC hardware for use in ingress operations and the local index $LI_r$ and initiator derived key $K_{di}$ are provided to the responder NIC hardware for egress operations. In step 950, the responder NIC 302 passes the responder derived key $K_{dr}$, the responder index value $I_r$ and the responder local index $LI_r$ to the responder VM through DOE. In step 952, the responder VM builds and sends a handshake response message, including the initiator and responder index values $I_i$ and $I_r$ and the responder derived key $K_{dr}$, which is the ephemeral value in the message, to the initiator VM.

In step 954, the initiator VM passes the responder derived key $K_{dr}$ and the responder index value $I_r$ to the initiator NIC 302 through DOE. In step 956, the initiator NIC 302 places the responder derived key $K_{dr}$ in an initiator local index $LI_i$ and transfers the initiator primary key $K_{pi}$ and the initiator index value $I_i$ to NIC hardware for ingress operations and the initiator local index $LI_i$ and responder derived key $K_{dr}$ to IC hardware for egress operations.

FIG. 9C2 illustrates operation where the local VM performs the encryption setup operations and the processer board 300' and NIC 302' combination is used. Again, only differing operations are described. In step 943, the initiator VM assigns the initiator index $I_i$, determines derived key $K_{di}$ and the passes source/destination IP, initiator index $I_i$, and initiator primary key $K_{pi}$ to the NIC. In step 945, the NIC assigns the local index $LI_i$, stores the source/destination IP with the local index $LI_i$ and passes the local $LI_i$ to the initiator VM. In step 947, the responder VM assigns the responder index $I_r$, determines derived key $K_{dr}$ and passes the response primary key $K_{pr}$, the initiator derived key $K_{di}$, the source/destination Ips, the responder index $I_r$ and the initiator index $I_i$ to the NIC. In step 949, the NIC stores the initiator primary key $K_{di}$ in the local index $LI_r$ and transfers the responder primary key $K_{pr}$ and responder index $I_r$ to hardware for ingress and the local index $LI_r$ and initiator derived $K_{di}$ to hardware for egress. In step 951, the NIC passes the local index $LI_r$ to the responder VM. In step 955, initiator VM passes the responder primary key $K_{dr}$ and responder index $I_r$ to the NIC. After step 956, each NIC has all of the information needed for ingress and egress encryption operations.

This completes encryption key exchange for the derived key WireGuard example.

FIG. 9D illustrates WireGuard ingress and egress operations with derived keys. In step 960, the initiator VM provides a packet containing the responder index value $I_r$ to the initiator NIC over PCIe using the IDE key to encrypt. The packet includes the overlay header, responder index value $I_r$, counter value and the payload. In step 962, the initiator NIC 302 decrypts the packet using the IDE key. The CSP SDN domain 250 utilizes the overlay header and providing PF or VF to determine the underlay header and VNI. The full packet with underlay header, overlay header, responder index value $I_r$, counter value and the payload, are provided for encryption. The NIC 302 looks up the responder derived key $K_{dr}$ using the initiator local index $Li_i$ and encrypts the packet using the determined responder derived key $K_{dr}$. The encrypted packet is transmitted to the responder NIC 302.

In step 964, the responder NIC 302 receives the encrypted packet from the initiator NIC 302, uses the responder index value $I_r$ to lookup the initiator to lookup the responder primary key $K_{pr}$ and then uses the source and destination IP addresses to develop the responder derived key $K_{dr}$. The responder derived key $K_{dr}$ is used to decrypt the packet, which is encrypted with the IDE key and transmitted over the PCIe link. In step 966, the PCIe module 304 receives the encrypted packet from the NIC 302 and decrypts the packet using the IDE key and provides the decrypted packet to the enhanced memory controller 308, which, in turn, encrypts of the packet using the appropriate VM memory key and places the encrypted packet in the encrypted VM memory.

In step 970, the beginning of an ingress operation for the initiator, the responder VM provides the packet to the responder NIC 302 over the PCIe link using the IDE key to encrypt the packet. The packet includes the overlay header, responder index value $I_r$, counter value and the payload. In step 972, the responder NIC decrypts the packet using the IDE key. The CSP SDN domain 250 utilizes the overlay header and providing PF or VF to determine the underlay header and VNI. The full packet with underlay header, overlay header, responder index value $I_r$, counter value and the payload, are provided for encryption. The NIC 302 uses the responder local index $LI_r$ to lookup the initiator derived key $K_{di}$ and encrypts the packet using the initiator derived key $K_{di}$. The encrypted packet is provided to the initiator NIC 302.

In step 974, the initiator NIC 302 receives the encrypted packet from the responder NIC 302. The initiator NIC 302 uses the initiator index value $I_i$ to lookup the initiator primary key value $K_{pi}$ and combines that with the source and destination IP address values to develop the initiator derived key $K_{di}$ that was used by the responder NIC 302. The initiator NIC 302 decrypts the packet using the initiator derived key $K_{di}$, encrypts the packet using the IDE key and transmits the packet over the PCIe link. In step 976, the PCIe module 304 receives the encrypted packet from the NIC 302 and decrypts the packet using the IDE key and provides the decrypted packet to the enhanced memory controller 308, which, in turn, encrypts of the packet using the appropriate VM memory key and places the encrypted packet in the encrypted VM memory.

In these examples WireGuard encryption has been securely offloaded to the NIC 302 to greatly increase encryption speed, without the CSP or other parties having access to the encryption keys or unencrypted data.

The above descriptions have been for a single VM communicating with a single VM. It is understood numerous of these offloaded encryption sessions are being performed in parallel by the VMs and the NIC 302 for each VM and VF, well into the thousands to hundreds of thousands as needed for very large environments, greatly increasing the secure encryption rate in the cloud server environment.

While the above description has used communication between two VMs in cloud server environments as the examples, it is also understood that one of the endpoints could be a lesser computer, such as a desktop or laptop computer, not having multiple VMs in operation or could be a server not in a cloud environment.

While the above description has used examples including VMs, it is understood that in bare metal cases, the hypervisor and VM can be omitted, and the communication program executed directly by the host operating system.

While the above description of examples using derived keys is done using derived keys at both the local and remote endpoints, the remote endpoint can operate without using derived keys if desired. If the remote endpoint is a lesser computer, such as a desktop or laptop computer or is performing encryption in software, the number of connections will likely be small enough that derived keys are not necessary or even particularly helpful. In such a case, the remote endpoint will simply provide a primary key and not be aware that the key received from the local endpoint is a derived key. In the case of IPsec underlay operation, the remote endpoint will utilize the derived key IKE2 equivalent process but provide a primary key instead of a derived key. The use of derived keys is most helpful in a computer that has thousands or more of connections and need not be used in computers having small numbers of connections.

While the above description has focused on operations in a CSP environment, it is understood that similar configurations and operations can occur in enterprise environments and any references to CSP thus can also refer to similarly operated enterprise environments. For example, the CSP SDN domain 250 would be an enterprise SDN domain 250 in an enterprise environment situation. References to an environment can mean either a CSP environment or an enterprise environment, such as an environment SDN domain 250 meaning either a CSP SDM domain 250 or an enterprise SDN domain 250.

The above description has described secure offloading as performing at the local and remote or initiator and responder endpoints. This symmetry is not required and one endpoint can be operating using normal protocol techniques, as the offloading is not readily apparent to the remote endpoint, the protocol appearing normal in most cases. Where the protocol has changed slightly, the relevant portions of the modified protocol can operate in software on the remote endpoint. There may be a great difference in encryption performance between the two endpoints, but the increased performance allows the cloud server to maintain connections with ever more devices.

While various programs and operations of those programs have been described, it is understood that other configurations of programs can be used to provide the same results according to the present invention. Further, while a specific hardware configuration for the processor board 300 and NIC 302 have been illustrated and described, it is understood that other hardware configurations can be used to provide the same capabilities as those described herein according to the present invention.

The above description is intended to be illustrative, and not restrictive. For example, the above-described examples may be used in combination with each other. Many other examples will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A secure computer system comprising:
  a computer including:
   a computer processor;
   a memory controller coupled to the computer processor;
   computer memory coupled to the computer processor and the memory controller;
   a computer peripheral device interface coupled to the computer processor and to the computer memory;
   a computer encryption engine coupled to the computer memory, the memory controller and the computer peripheral device interface; and
   computer non-transitory storage for programs to execute from computer memory on the computer processor,
   wherein the computer processor and the memory controller are configured to provide secure memory areas within the computer memory, encrypted memory areas within the secure memory areas, and session encryption key secure storage for encryption keys used for communications between a local program and a remote program over a network within the secure memory areas;
   wherein the computer processor is configured to execute programs from secure memory areas;
   wherein the computer non-transitory storage includes a local program to be executed from a secure memory area, wherein the local program is configured to operate with data stored in an encrypted memory area within the secure memory area, wherein the local program is configured for communicating data contained in the encrypted memory area to a remote computer over a network according to a protocol; and
  a network interface controller (NIC) for connection to the computer and the network, the NIC including:
   a NIC peripheral device interface for connection to the computer;
   a network interface for connection to the network;
   a NIC processor coupled to the NIC peripheral device interface and the network interface;
   NIC memory coupled to the NIC processor, the NIC peripheral device interface and the network interface, the NIC memory including:
    session encryption key secure storage for encryption keys used for the communications between the local program and the remote program over the network; and
    secure buffer storage of holding communication data in transit;
   NIC non-transitory storage for programs to execute from the NIC memory on the NIC processor, the NIC non-transitory storage including a NIC communication protocol program for use with the communications between the local program and the remote program; and
   a NIC encryption engine coupled to the NIC peripheral device interface, the network interface, the session encryption key secure storage, and the secure buffer storage to encrypt and decrypt communications over the network interface using keys stored in the session encryption key secure storage, wherein the NIC encryption engine is configured to encrypt data leaving the NIC through the network interface and decrypt data entering the NIC through the network interface;
  wherein the computer peripheral device interface and the NIC peripheral device interface are configured to provide a secure peripheral device communication path between the local program and the NIC; and
  wherein the local program and the NIC communication protocol program are configured to securely exchange session encryption keys over the secure peripheral device communication path.

2. The secure computer system of claim 1,
  wherein the computer processor is configured to provide computer link encryption key secure storage for encryption keys used for data transferred over the computer peripheral device interface;
  wherein the computer encryption engine is configured to encrypt data entering an encrypted memory area, decrypt data leaving an encrypted memory area, encrypt data leaving the computer through the computer peripheral device interface and decrypt data entering the computer through the computer peripheral device interface without having data leaving the encrypted memory area and leaving through the computer peripheral device interface or entering through the computer peripheral device interface and entering the encrypted memory area being available externally in unencrypted form;

wherein the NIC memory includes NIC link encryption key secure storage for encryption keys used for data transferred over the NIC peripheral device interface;

wherein the NIC encryption engine is configured to encrypt and decrypt communications over the NIC peripheral interface using keys stored in the NIC link encryption key secure storage, wherein the NIC encryption engine is configured to encrypt data leaving the NIC through the NIC peripheral device interface and decrypt data entering the NIC through the NIC peripheral device interface;

wherein communication data entering the NIC through the NIC peripheral interface or the network interface and leaving the NIC through the NIC peripheral interface or the network interface is stored in the secure buffer storage;

wherein communication data entering the NIC through the NIC peripheral interface and leaving through the network interface or entering the NIC through the network interface and leaving through the NIC peripheral interface is encrypted and decrypted without the communication data being available externally in unencrypted form; and wherein the computer non-transitory storage and the NIC non-transitory storage each include a secure link program configured to perform secure communications over the secure peripheral device communication path, wherein the secure link programs are configured to exchange NIC link encryption keys.

3. The secure computer system of claim 2,
wherein the NIC further includes a security certificate; and
wherein the computer non-transitory storage includes a program configured to obtain the security certificate over the secure peripheral device communication path from the NIC and evaluate the security certificate.

4. The secure computer system of claim 1,
wherein the NIC further includes a security certificate; and
wherein the computer non-transitory storage includes a program configured to obtain the security certificate over the secure peripheral device communication path from the NIC and evaluate the security certificate.

5. The secure computer system of claim 1, wherein the computer peripheral device interface and the NIC peripheral interface utilize data object exchange mailboxes to form the secure peripheral device communication path.

6. The secure computer system of claim 1, wherein communication over the secure peripheral device communication path is encrypted.

7. A network interface controller (NIC) for connection to a computer, the computer including:
a computer processor;
a memory controller coupled to the computer processor;
computer memory coupled to the computer processor and the memory controller;
a computer peripheral device interface coupled to the computer processor and to the computer memory;
a computer encryption engine coupled to the computer memory, the memory controller and the computer peripheral device interface; and
computer non-transitory storage for programs to execute from computer memory on the computer processor,
wherein the computer processor and the memory controller are configured to provide secure memory areas within the computer memory, encrypted memory areas within the secure memory areas, and session encryption key secure storage for encryption keys used for communications between a local program and a remote program over a network within the secure memory areas;
wherein the computer processor is configured to execute programs from secure memory areas;
wherein the computer non-transitory storage includes a local program to be executed from a secure memory area, wherein the local program is configured to operate with data stored in an encrypted memory area within the secure memory area, wherein the local program is configured for communicating data contained in the encrypted memory area to a remote computer over a network according to a protocol, the NIC comprising:
a NIC peripheral device interface for connection to the computer;
a network interface for connection to the network;
a NIC processor coupled to the NIC peripheral device interface and the network interface;
NIC memory coupled to the NIC processor, the NIC peripheral device interface and the network interface, the NIC memory including:
session encryption key secure storage for encryption keys used for the communications between the local program and the remote program over the network; and
secure buffer storage of holding communication data in transit;
NIC non-transitory storage for programs to execute from the NIC memory on the NIC processor, the NIC non-transitory storage including a NIC communication protocol program configured for use with the communications between the local program and the remote program; and
a NIC encryption engine coupled to the NIC peripheral device interface, the network interface, the session encryption key secure storage, and the secure buffer storage to encrypt and decrypt communications over the network interface using keys stored in the session encryption key secure storage, wherein the NIC encryption engine is configured to encrypt data leaving the NIC through the network interface and decrypt data entering the NIC through the network interface;
wherein the computer peripheral device interface and the NIC peripheral device interface are configured to provide a secure peripheral device communication path between the local program and the NIC; and
wherein the local program and the NIC communication protocol program are configured to securely exchange session encryption keys over the secure peripheral device communication path.

8. The NIC of claim 7,
wherein the computer processor is configured to provide computer link encryption key secure storage for encryption keys used for data transferred over the computer peripheral device interface;
wherein the computer encryption engine is configured to encrypt data entering an encrypted memory area, decrypt data leaving an encrypted memory area, encrypt data leaving the computer through the computer peripheral device interface and decrypt data entering the computer through the computer peripheral device interface without having data leaving the encrypted memory area and leaving through the computer peripheral device interface or entering through the computer peripheral device interface and entering the encrypted memory area being available externally in unencrypted form;

wherein the NIC memory includes NIC link encryption key secure storage for encryption keys used for data transferred over the NIC peripheral device interface;

wherein the NIC encryption engine is configured to encrypt and decrypt communications over the NIC peripheral interface using keys stored in the NIC link encryption key secure storage, wherein the NIC encryption engine is configured to encrypt data leaving the NIC through the NIC peripheral device interface and decrypt data entering the NIC through the NIC peripheral device interface;

wherein communication data entering the NIC through the NIC peripheral interface or the network interface and leaving the NIC through the NIC peripheral interface or the network interface is stored in the secure buffer storage;

wherein communication data entering the NIC through the NIC peripheral interface and leaving through the network interface or entering the NIC through the network interface and leaving through the NIC peripheral interface is encrypted and decrypted without the communication data being available externally in unencrypted form; and wherein the computer non-transitory storage and the NIC non-transitory storage each include a secure link program configured to perform secure communications over the secure peripheral device communication path, wherein the secure link programs are configured to exchange NIC link encryption keys.

9. The NIC of claim 8, the NIC further comprising a security certificate, and wherein the computer non-transitory storage includes a program configured to obtain the security certificate over the secure peripheral device communication path from the NIC and evaluate the security certificate.

10. The NIC of claim 7, the NIC further comprising a security certificate; and wherein the computer non-transitory storage includes a program configured to obtain the security certificate over the secure peripheral device communication path from the NIC and evaluate the security certificate.

11. The NIC of claim 7, wherein the computer peripheral device interface and the NIC peripheral interface utilize data object exchange mailboxes to form the secure peripheral device communication path.

12. The NIC of claim 7, wherein communication over the secure peripheral device communication path is encrypted.

13. A computer non-transitory machine readable storage medium for use in a computer cooperating with a network interface controller (NIC), the computer including:

a computer processor;

a memory controller coupled to the computer processor;

computer memory coupled to the computer processor and the memory controller;

a computer peripheral device interface coupled to the computer processor and to the computer memory;

a computer encryption engine coupled to the computer memory, the memory controller and the computer peripheral device interface; and the computer non-transitory machine readable storage medium for programs to execute from computer memory on the computer processor, wherein the computer processor and the memory controller are configured to provide secure memory areas within the computer memory, encrypted memory areas within the secure memory areas, and session encryption key secure storage for encryption keys used for communications according to a protocol between the computer and a remote program over a network within the secure memory areas;

wherein the computer processor is configured to execute programs from secure memory areas; and the NIC including:

a NIC peripheral device interface for connection to the computer;

a network interface for connection to the network;

a NIC processor coupled to the NIC peripheral device interface and the network interface;

NIC memory coupled to the NIC processor, the NIC peripheral device interface and the network interface, the NIC memory including:

session encryption key secure storage for encryption keys used for the communications between computer and the remote program over the network; and secure buffer storage of holding communication data in transit;

NIC non-transitory storage for programs to execute from the NIC memory on the NIC processor, the NIC non-transitory storage including a NIC communication protocol program for use with the communications between the computer and the remote program; and a NIC encryption engine coupled to the NIC peripheral device interface, the network interface, the session encryption key secure storage, and the secure buffer storage to encrypt and decrypt communications over the network interface using keys stored in the session encryption key secure storage, wherein the NIC encryption engine is configured to encrypt data leaving the NIC through the network interface and decrypt data entering the NIC through the network interface; and wherein the computer peripheral device interface and the NIC peripheral device interface are configured to provide a secure peripheral device communication path between a secure memory area and the NIC;

the computer non-transitory machine readable storage medium having stored thereon instructions for providing session encryption keys to a network interface controller (NIC), which when executed by the computer from a secure memory area, causes the computer to perform operations comprising:

operating with data stored in an encrypted memory area within the secure memory area and communicating data contained in the encrypted memory area to a remote computer over a network using a protocol; and securely exchange session encryption keys over the secure peripheral device communication path with the NIC communication protocol program.

14. The computer non-transitory machine readable storage medium of claim 13, wherein the computer processor and the memory controller are configured to provide computer link encryption key secure storage for encryption keys used for data transferred over the computer peripheral device interface;

wherein the computer encryption engine is configured to encrypt data entering an encrypted memory area, decrypt data leaving an encrypted memory area, encrypt data leaving the computer through the computer peripheral device interface and decrypt data entering the computer through the computer peripheral device interface without having data leaving the encrypted memory area and leaving through the computer peripheral device interface or entering through the computer peripheral device interface and entering the encrypted memory area being available externally in unencrypted form;

wherein the NIC memory includes NIC link encryption key secure storage for encryption keys used for data transferred over the NIC peripheral device interface;

wherein the NIC encryption engine is configured to encrypt and decrypt communications over the NIC peripheral interface using keys stored in the NIC link encryption key secure storage, wherein the NIC encryption engine is configured to encrypt data leaving the NIC through the NIC peripheral device interface and decrypt data entering the NIC through the NIC peripheral device interface;

wherein communication data entering the NIC through the NIC peripheral interface or the network interface and leaving the NIC through the NIC peripheral interface or the network interface is stored in the secure buffer storage;

wherein communication data entering the NIC through the NIC peripheral interface and leaving through the network interface or entering the NIC through the network interface and leaving through the NIC peripheral interface is encrypted and decrypted without the communication data being available externally in unencrypted form; and wherein the NIC non-transitory storage includes a NIC secure link program configured to perform secure communications over the secure peripheral device communication path and configured to exchange NIC link encryption keys, the computer non-transitory machine readable storage medium further having stored thereon instructions for exchanging link encryption keys with a network interface controller (NIC), which when executed by the computer from a secure memory area, causes the computer to perform operations comprising:

performing secure communications over the secure peripheral device communication path; and exchanging NIC link encryption keys with the NIC secure link program over the secure peripheral device communication path.

15. The computer non-transitory machine readable storage medium of claim 14, wherein the NIC further includes a security certificate, the computer non-transitory machine readable storage medium having stored thereon instructions which cause the computer to perform operations comprising:

obtaining the security certificate over the secure peripheral device communication path from the NIC; and evaluating the security certificate.

16. The computer non-transitory machine readable storage medium of claim 13, wherein the NIC further includes a security certificate, the computer non-transitory machine readable storage medium having stored thereon instructions which cause the computer to perform operations comprising:

obtaining the security certificate over the secure peripheral device communication path from the NIC; and evaluating the security certificate.

17. The computer non-transitory machine readable storage medium of claim 13, wherein the computer peripheral device interface and the NIC peripheral interface utilize data object exchange mailboxes to form the secure peripheral device communication path.

18. The computer non-transitory machine readable storage medium of claim 13, having stored thereon instructions which cause the computer to perform operations comprising:

encrypting and decrypting communication over the secure peripheral device communication path.

* * * * *